(12) United States Patent
Naito et al.

(10) Patent No.: US 7,196,811 B2
(45) Date of Patent: *Mar. 27, 2007

(54) PRINTING CONTROL DEVICE AND PRINTING CONTROL METHOD, PRINTING CONTROL SYSTEM, AND RECORDING MEDIUM

(75) Inventors: Kikuo Naito, Kanagawa (JP); Akihiro Masukawa, Kanagawa (JP); Kenji Kasai, Tokyo (JP); Toshiyuki Noguchi, Tokyo (JP); Shinji Fukunaga, Kanagawa (JP); Atsushi Furuta, Tokyo (JP); Kosuke Ito, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/418,006

(22) Filed: May 5, 2006

(65) Prior Publication Data

US 2006/0203276 A1 Sep. 14, 2006

Related U.S. Application Data

(63) Continuation of application No. 09/875,989, filed on Jun. 8, 2001.

(30) Foreign Application Priority Data

Jun. 21, 2000 (JP) .............................. 2000-186144
Apr. 2, 2001 (JP) .............................. 2001-103685

(51) Int. Cl.
*G06F 15/00* (2006.01)
*G06K 1/00* (2006.01)

(52) U.S. Cl. .................. 358/1.15; 358/1.14; 358/1.16; 358/1.18; 705/26; 705/27; 355/39; 355/40; 396/429; 396/639; 399/8; 709/217; 713/193

(58) Field of Classification Search ................ 358/1.15
See application file for complete search history.

(56) References Cited

U.S. PATENT DOCUMENTS

| 6,017,157 A | 1/2000 | Garfinkle et al. ............ 396/639 |
| 6,209,097 B1 | 3/2001 | Nakayama et al. ......... 713/193 |
| 6,324,521 B1 | 11/2001 | Shiota et al. ................. 705/27 |
| 6,417,913 B2 | 7/2002 | Tanaka ......................... 355/39 |
| 6,429,923 B1 | 8/2002 | Ueda et al. ................... 355/40 |
| 6,516,157 B1 | 2/2003 | Maruta et al. ................. 399/8 |

(Continued)

FOREIGN PATENT DOCUMENTS

| EP | 0 867 832 | 9/1998 |
| JP | 10-171609 | 6/1998 |
| JP | 11-237968 | 8/1999 |

(Continued)

*Primary Examiner*—Kimberly Williams
*Assistant Examiner*—Satwant Singh
(74) *Attorney, Agent, or Firm*—Fitzpatrick, Cella, Harper & Scinto

(57) ABSTRACT

A printing control system has a contents provider and a printout service provider connected via a network. The contents provider comprises a device for generating viewing screens, a device for generating a conditions settings screen from printout information and service information obtained from a printout service provider, a device for generating a confirmation screen for setting the conditions, and a device for transmitting the contents selected with the viewing screen, and the printout service provider comprises a device for transmitting the service information, and a device for generating printing data from the contents provided from the contents provider. This provides contents providers with contents providing means other than downloading data, and users with services for various printing forms other than home-use printers.

5 Claims, 41 Drawing Sheets

U.S. PATENT DOCUMENTS

| | | | |
|---|---|---|---|
| 6,578,072 B2 | 6/2003 | Watanabe et al. | 709/217 |
| 6,636,837 B1 | 10/2003 | Nardozzi et al. | 705/27 |
| 6,714,314 B1 | 3/2004 | Ueda | 358/1.15 |
| 2001/0012096 A1 | 8/2001 | Haraguchi et al. | 355/40 |
| 2001/0016829 A1 | 8/2001 | Toshikage et al. | 705/26 |
| 2001/0041072 A1 | 11/2001 | Takano | 396/429 |
| 2001/0052997 A1 | 12/2001 | Satake et al. | 358/1.15 |
| 2002/0051191 A1* | 5/2002 | Naito et al. | 358/1.15 |

FOREIGN PATENT DOCUMENTS

| | | |
|---|---|---|
| JP | 2000-235466 | 8/2000 |
| KR | 1999-0084058 | 12/1999 |

* cited by examiner

FIG. 7

```
[CONTENTS]
CONTENTSCODE=ABC0001
TYPE=IMAGE
ADDRESS=http://www.sellpc/PRINTDATA/abc0001.jpg
PREVIEW=/THMB/abc0001_pre.jpg
PRICE=3000

[OVERLAY]
STRING="COPY RIGHT"
HORIZONTAL=CENTER
VERTICAL=UNDERBOTTOM

[PRINT LIMIT]
MAXSIZE=400*290
MAXPAPER=A3
MAXVOLUME=100

[ETC]
PAYMENT=FINISHED
```

MODEL DIAGRAM OF CONTENTS PRINTOUT INFORMATION

FIG. 8

| CONTENTS PROVIDER CODE | BASE ADDRESS | CONTENTS PRINTOUT INFORMATION PATH | |
|---|---|---|---|
| 0001 | http://www.sellpc | /info/printinfo | ←811 |
| 0002 | http://www.hanbai_Stock | /printinfo | ←812 |
| | | | |
| | | | |

CONTENTS PROVIDER MANAGEMENT TABLE

FIG. 9

| ORDER CODE 901 | CONTENTS PROVIDER CODE 902 | CONTENTS ADDRESS 903 | STATUS 904 |
|---|---|---|---|
| 1 | 0001 | http://www.sellpc/PRINTDATA/2/AAA0001.jpg | PRINTING COMPLETED — 911 |
| 2 | 0002 | http://www.hanbai_Stock/print/BSD0002.jpg | STANDBY FOR PRINTING — 912 |
| 3 | 0002 | http://www.hanbai_Stock/print/CDA0999.jpg | GATHERING IMAGE — 913 |
| 4 | 0001 | http://www.sellpc/PRINTDATA/abc0001.jpg | ORDERING — 914 |

CONTENTS VIEWING SCREEN
(CONTENTS HOLDER SCREEN)

PRINTOUT CONDITIONS SPECIFYING SCREEN

PRINTOUT CONFIRMING SCREEN

FIG. 17

```
1700
[DATACENTER]
CONTENTSCODE=DEF0001
ADDRESS=http://www.hanbai_Stock/printinfo/DEF0001.inf
```

MODEL DIAGRAM OF CONTENTS PRINTOUT
INFORMATION IN CONTENTS PROVIDER COMPUTER 121

FIG. 18

| CONTENTS PROVIDER CODE 1801 | BASE ADDRESS 1802 | |
|---|---|---|
| 0001 | http://www.sellpc | 811 |
| 0002 | http://www.hanbai | 812 |
|  |  |  |
|  |  |  |

CONTENTS PROVIDER MANAGEMENT TABLE

MODEL DIAGRAM OF PRINTOUT ORDER INFORMATION

CONTENTS VIEWING SCREEN
(CONTENTS HOLDER SCREEN)

MODEL DIAGRAM OF CONTENTS PRINTOUT INFORMATION

FIG. 30

CONTENTS PROVIDER MANAGEMENT TABLE

| CONTENTS PROVIDER CODE 3001 | BASE ADDRESS 3002 | CONTENTS PRINTOUT INFORMATION PATH 3003 |
|---|---|---|
| 0001 | http://wwww.sellpc | /info/printinfo — 3011 |
| 0002 | http://www.hanbai_Stock | /printinfo — 3012 |
|  |  |  |
|  |  |  |

FIG. 31

| ORDER CODE 3101 | CONTENTS PROVIDER CODE 3102 | CONTENTS ADDRESS 3103 | STATUS 3104 | PRINTOUT DESTINATION 3105 | |
|---|---|---|---|---|---|
| 1 | 0001 | http://www.sellpc/PRINTDATA/2/AAA0001.jpg | PRINTING COMPLETED | 150 | ~3111 |
| 2 | 0002 | http://www.hanbai_Stock/print/BSD0002.jpg | STANDBY FOR PRINTING | 150 | ~3112 |
| 3 | 0002 | http://www.hanbai_Stock/print/CDA0999.jpg | GATHERING IMAGE | 151 | ~3113 |
| 4 | 0001 | http://www.sellpc/PRINTDATA/abc0001.jpg | ORDERING | 150 | ~3114 |

CONTENTS VIEWING SCREEN (CONTENTS HOLDER SCREEN)

PRINTOUT CONFIRMING SCREEN

MODEL DIAGRAM OF PRINT ORDER DATA

FIG. 41

```
┌─────────────────────────────────────────────────┐
│ ─4100                                            │
│ [DATACENTER]                                    │
│ CONTENTSCODE=DEF0001                            │
│ ADDRESS=http://www.hanbai_Stock/printinfo/DEF0001.inf │
└─────────────────────────────────────────────────┘
```

MODEL DIAGRAM OF CONTENTS PRINTOUT
INFORMATION IN CONTENTS PROVIDER COMPUTER 2320

FIG. 42

| CONTENTS PROVIDER CODE /4201 | BASE ADDRESS /4202 | |
|---|---|---|
| 0001 | http://www.sellpc | ~4211 |
| 0002 | http://www.hanbai | ~4212 |
|  |  | |
|  |  | |

CONTENTS PROVIDER MANAGEMENT TABLE

MODEL DIAGRAM OF PRINTOUT ORDER INFORMATION

CONTENTS VIEWING SCREEN
(CONTENTS HOLDER SCREEN)

PRINTING CONTROL DEVICE AND PRINTING CONTROL METHOD, PRINTING CONTROL SYSTEM, AND RECORDING MEDIUM

This application is a continuation application of co-pending application Ser. No. 09/875,989, filed Jun. 8, 2001, which is incorporated herein by reference.

BACKGROUND OF THE INVENTION

1. Field of the Invention

The present invention relates to a printing control device and printing control method, and a printing control system, for performing printing processing via network.

2. Description of the Related Art

In recent years, communication infrastructures being built and developments in information communication technology has enabled information providing services using the Internet. Particularly, technology for providing image information providing services extremely easily using the Internet has been established, so that image information can be transferred to the user, and exchange of image information between users is becoming commonplace, as well.

Though the technology whereby image information on the Internet can be obtained has been established and propagated, technology protecting the rights of the image information is still immature, and so information is constantly being provided in an illegal manner infringing on such rights.

Hitherto, contents providers having the rights to the image information have not aggressively pursued image information providing services as a form of business. Also, though the contents providers have used printed materials as means to provide image information to users, but high prices have been unavoidable for such services to users, taking into consideration the investments and upkeep for the facilities necessary, and daily operational efficiency.

On the other hand, even in the event that the user desires to pay for image information and print out the image information, there are limits to the output size and image quality of individually-owned printers, and accordingly, it has been difficult for such users to obtain varied printouts.

Further, the provider providing the printout service must obtain a license for the contents to print out which it obtains, meaning that the size of the business is affected by the contents gathered therein.

SUMMARY OF THE INVENTION

Accordingly, it is an object of the present invention to provide contents providers with means for providing contents other than downloading data, without the contents providers having own printing solutions, and to provide users with services for various printing forms other than home-use printers.

It is another object of the present invention to do away with the necessity to have capital to possess contents and to pay for licenses, and to eliminate situations wherein businesses are affected by the quality of the contents.

To this end, according to a first aspect, the present invention provides a printing control device comprising generating means for generating a printing conditions setting screen from contents printout information containing information relating to contents and printout service information containing information relating to printing, and display control means for performing control so as to display a printing conditions setting screen generated by the generating means.

Further objects, features and advantages of the present invention will become apparent from the following description of the preferred embodiments with reference to the attached drawings.

BRIEF DESCRIPTION OF THE DRAWINGS

FIG. 7 is a diagram illustrating an example of contents printout information according to the first and second embodiments, and contents printout information stored in contents printout information storing means 1502 in the data center 140 and contents provider computer 120 according to third and fourth embodiments;

FIG. 8 is a schematic diagram of a contents provider management table according to the first and second embodiments;

FIG. 9 is a part of a schematic diagram of an order management table according to the first through fourth embodiments;

FIG. 17 is a diagram illustrating an example of contents printout information position data within the contents provider computer 121 according to the third and fourth embodiments;

FIG. 18 is a schematic diagram of a contents provider management table according to the third and fourth embodiments;

FIG. 30 is a schematic diagram of a contents provider management table according to the fifth through eighth embodiments;

FIG. 31 is a part of a schematic diagram of an order management table according to the fifth through eighth embodiments;

FIG. 41 is a diagram illustrating an example of contents printout information position data within the contents provider computer 2321 according to the seventh and eighth embodiments;

FIG. 42 is a schematic diagram of a contents provider management table according to the seventh and eighth embodiments;

DESCRIPTION OF THE PREFERRED EMBODIMENTS

Embodiments of the present invention will now be described in detail.

First Embodiment

<System Configuration>

Figure 1:
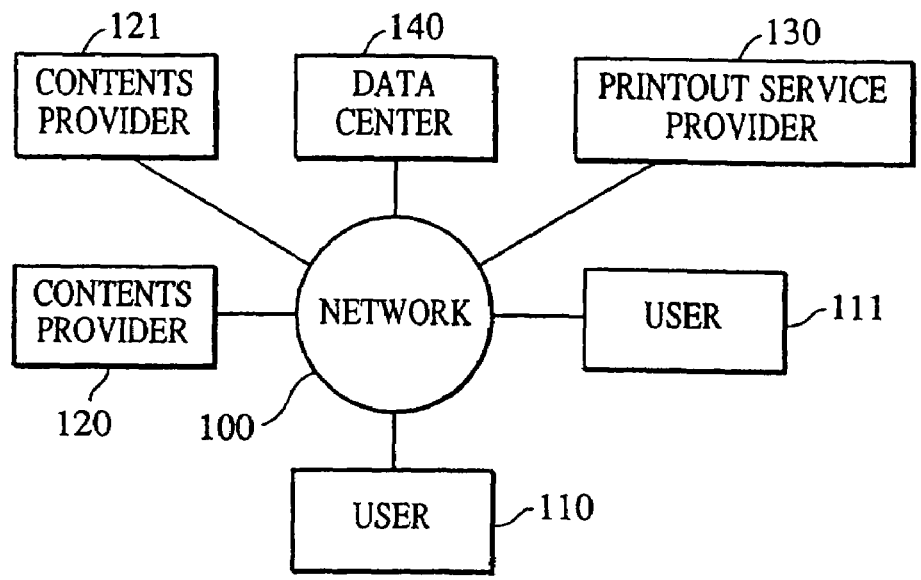
FIG. 1 is a configuration diagram of the overall system of an embodiment of the present invention.

FIG. 1 is a configuration diagram of the overall system of a first embodiment of the present invention.

In FIG. 1, reference numerals 110 and 111 denote information processing devices (computer system comprising CPU, ROM, RAM, HDD, etc., as described later with reference to FIG. 2) for customers, which are users of the system according to the present embodiment, to perform direct operation from their homes, for example, and will hereafter be referred to as "user computers".

The user computers 110 and 111 have functions for viewing documents including contents of images and the like, and catalogs of contents, stored in later-described contents provider computers 120 and 121 via a network 100, and also have functions for placing orders for printing orders to a printout service provider 130 by using a printing order button contained in the document. Note that though the number of user computers connected in the present embodiment is two, with the present invention the number of user computers connected is not restricted in any way as long as one or more user computers are connected. Also, ordering image printing may be referred to as "printout order" or simply "order".

Reference numerals 120 and 121 denote information processing devices for contents providers which provide contents such as images and documents to carry out various services, and will hereafter be referred to as "contents provider computers" or simply "contents providers".

The contents provider computers 120 and 121 have the functions for providing user computers with documents including contents of images, documents, and the like, and catalogs of contents (hereafter may be referred to as "contents viewing screen") via the network 100, and functions for supplying a later-described printout service provider 130 with contents (hereafter may be referred to as "merchandise" or "actual contents") and accompanying information. Note that though the number of contents provider computers connected in the present embodiment is two, with the present invention the number of contents provider computers connected is not restricted in any way as long as one or more contents provider computers are connected. Also, though in the present embodiment each contents provider operating entity is described as operating one contents provider computer for the sake of description of the invention, there are no restrictions whatsoever on this number; rather, the contents provider operating entities may operate two or more contents provider computers for the purpose of dispersing loads or handling different contents.

Reference numeral 130 denotes an information processing device which performs printing processing based on requests from the user computer 101, and is referred to as a "printout service provider computer", or simply as a "printout service provider".

The printout service provider 130 has the functions of supplying documents for realizing printout order screens based on requests from the user computers 110 or 111, receiving printout settings with the screen and configuring printout orders, obtaining contents from the contents provider computer 120 or 121 or a later-described data center computer 140 according to the printout orders, and carrying out the printing processing.

Note that though in the present embodiment each printout service provider operating entity is described as operating one printout service provider computer for the sake of description of the invention, there are no restrictions whatsoever on this number; rather, the printout service provider operating entities may operate two or more printout service provider computers for the purpose of dispersing loads or the like.

Reference numeral 140 denotes an information processing device holding actual contents described in a document containing contents catalog pages to be disclosed by the contents provider computers 120 or 121, and will be referred to as a "data center computer" or "data center".

In the event that the user views a contents viewing screen, which is a contents catalog, at the contents provider computer 120 or 121 and executes a printout order to the printout service provider computer 130 for the actual contents in the viewing screen, the data center computer 140 transmits, to the printout service provider computer 130, data necessary for the printout or printout order such as the actual contents requested by the printout service provider computer 130 and the later-described contents printout information.

Now, though the present embodiment is described with the number of data centers connected as one, the present invention does not restrict the number of data centers connected in any way.

Also, note that though in the present embodiment each data center operating entity is described as operating one data center computer for the sake of description of the invention, there are no restrictions whatsoever on this number; rather, the data center operating entities may operate two or more data center computers for the purpose of dispersing loads or the like.

Reference numeral 100 denotes a connecting device for connecting the user computers 110 and 111, the contents provider computers 120 and 121, the printout service provider computer 130, and the data center computer 140, the connecting device representing a network system such as the Internet or a Local Area Network (LAN), hereafter described simply as "network". Also, with the present embodiment, the Internet which is commonly used is employed as the network 100, but the present invention can be realized using other network systems, as well.

Also, with the present embodiment, description will be made under the assumption that actual contents to be printed out exist in the contents provider computer 120. As for the contents provider computer 121, a contents catalog screen is held therein, and the contents printout information which is actual contents and accompanying information to the contents as described later, and the information necessary for printouts and printout orders, are stored in the data center 140.

Also, printout orders from the contents viewing screen of the contents provider 121 will be described later in the second embodiment.

<Block Diagram of User Computer, Contents Provider Computer, and Data Center>

Figure 2:
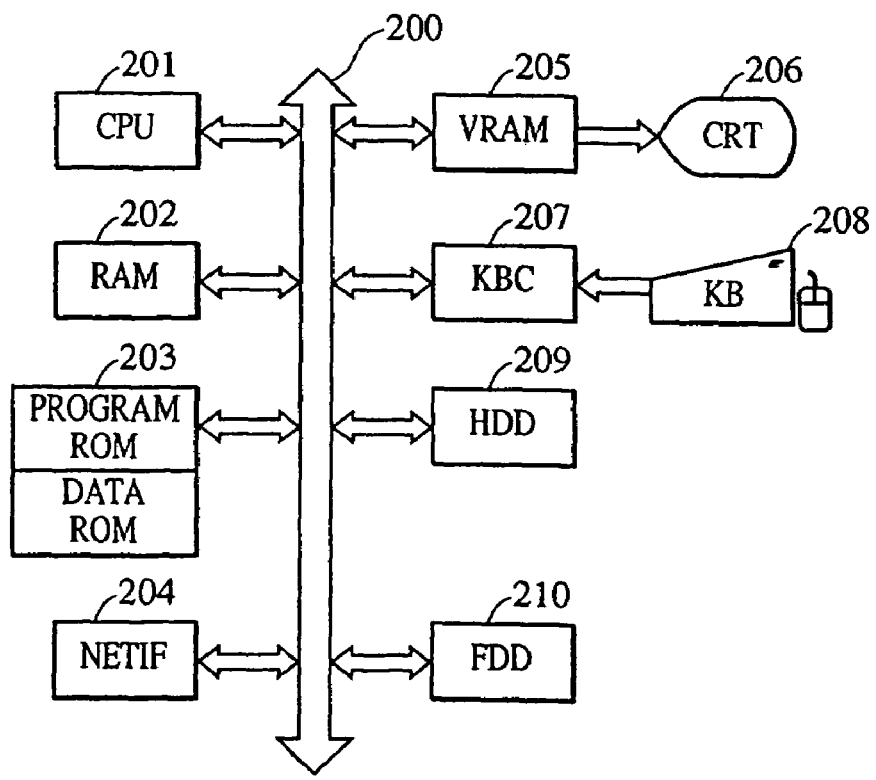
FIG. 2 is a block diagram illustrating the hardware configuration of user computers, contents provider computers, and data center, in an embodiment of the present invention.

FIG. 2 is a block diagram illustrating the hardware configuration of the information processing devices listed in the present embodiment. Incidentally, with the present embodiment, there is no difference between the user computers 110 and 111, contents provider computers 120 and 121, and the data center 140 regarding internal configuration, so description thereof will be made regarding all in FIG. 2.

In FIG. 2, reference numeral 201 is a Central Processing Unit (hereafter referred to as "CPU") for governing the control of the information processing device. Reference numeral 202 denotes Random Access Memory (hereafter referred to as "RAM"), functioning as the primary memory of the CPU 201 and as area for programs being executed, area for executing the programs, and as data area. Reference numeral 203 denotes Read Only Memory (hereafter referred to as "ROM") storing the action processing procedures for the CPU 201. There are two types of ROM 203; program ROM which has recorded therein operating software which is the system program which performs device control of the information processing device, and data ROM which has recorded there information and the like necessary for running the system. There are cases wherein a later-described HDD 209 is used instead of the ROM 203.

Reference numeral 204 denotes a network interface (NE-TIF), which performs control for performing data transfer via network with other information processing devices, and diagnosis of the connection state. Reference numeral 205 denotes Video RAM (VRAM) which renders images to be displayed on a later-described CRT 206 screen indicating the operating state of the information processing device, and performs control of the display thereof. Reference numeral 206 denotes a display device, such as a dedicated display, hereafter referred to as "CRT". Reference numeral 207 denotes a controller for controlling input signals from a later-described external input device 208. Reference numeral 208 denotes an external input device, such as a keyboard, a mouse or other like pointing device, and so forth, for the user of the information processing device to input operations to the information processing device. The external input device will hereafter be denoted simply as "KB". Reference numeral 209 denotes a hard disk drive (HDD), used for saving application programs, data such as image information, and the like. In the present embodiment, application programs are software programs executing the processing means making up the present embodiment. Reference numeral 210 denotes an external input/output device, for performing input and output of removable disks such as floppy disks or CD-ROMs for example, for reading the above application programs from the medium. The external input/output device will hereafter be denoted by "FDD". Note that the application programs and data stored in the HDD 209 can also be stored in the FDD 201 and thus used. Reference numeral 200 denotes an input/output bus (address bus, data bus, and control bus) for connecting the above-described units.

<Block Diagram of Printout Service Provider Computer>

Figure 3:
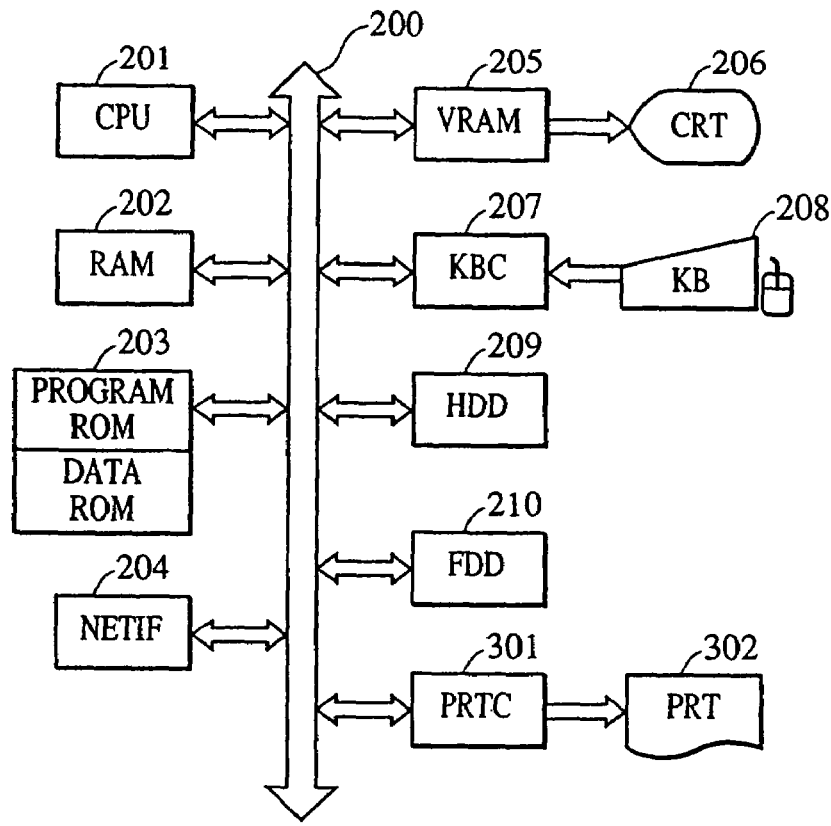
FIG. 3 is a block diagram illustrating the hardware configuration of a printout service provider computer in an embodiment of the present invention.

FIG. 3 is a block diagram illustrating the hardware configuration of the printout service provider computer 130 according to the present embodiment.

The printout service provider computer 130 has the same hardware configuration as that of the user computers 110 and 111, contents provider computers 120 and 121, and the data center computer 140, described with reference to FIG. 2, with several additions thereto. Accordingly, in FIG. 3, the components which are equivalent to those in FIG. 2 will be denoted with the same reference numerals.

In FIG. 3, reference numeral 201 denotes a CPU for governing the control of the information processing device which is the service provider computer 130. Reference numeral 202 denotes RAM functioning as the primary memory of the CPU 201 and as area for programs being executed, area for executing the programs, and as data area. Reference numeral 203 denotes ROM storing the action processing procedures for the CPU 201. There are two types of the ROM 203; program ROM which has recorded therein operating software which is the system program which performs device control of the printout server, and data ROM which has recorded there information and the like necessary for running the system. There are cases wherein a later-described HDD 209 is used instead of the ROM 203. Reference numeral 204 denotes a network interface (NE-TIF), which performs control for performing data transfer via network with other information processing devices such as the user computer 110 connected via the network and diagnosis of the connection state. Reference numeral 205 denotes VRAM which renders images to be displayed on a later-described CRT 206 screen indicating the operating state of the information processing device, and performs control of the display thereof. Reference numeral 206 denotes a display device, such as a dedicated display, hereafter referred to as "CRT".

Reference numeral 207 denotes a controller for controlling input signals from a later-described external input device 208. Reference numeral 208 denotes an external input device, such as a keyboard, a mouse or other like pointing device, and so forth, for the user of the information processing device to input operations to the information processing device. The external input device will hereafter be denoted simply as "KB". Reference numeral 209 denotes a hard disk drive (HDD), used for saving application programs for controlling printing, data such as image information, and the like. Reference numeral 210 denotes an external input/output device, for performing input and output of removable disks such as floppy disks or CD-ROMs for example, for reading the above application programs from the medium. The external input/output device will hereafter be denoted by "FDD". Note that the application programs and data stored in the HDD 209 can also be stored in the FDD 210 and thus used. Reference numeral 301 denotes a printer control device, which performs control of a later-described external output device 302 and control of images to be output. The printer control device will hereafter be denoted by "PRTC". Reference numeral 302 is an external output device, such as a printer for example, and will hereafter be denoted by "PRT". Reference numeral 200 denotes an input/output bus (address bus, data bus, and control bus) for connecting the above-described units.

Now, the printout service provider computer 130 in the present embodiment as described above will be described with reference to an arrangement wherein the printout service provider computer 130 is connected to a printer. With the present invention, a printer or another computer for connecting a printer is connected to the network 100, and in the event that this printer can be used for printing a printout order received at the printout service provider computer 130, the configuration of the printout service provider computer 130 can be realized with an arrangement the having same configuration as that of the user computers 110 and 111 or contents provider computers 120 and 121, without having a printer.

<Configuration of User Computer>

Figure 4:
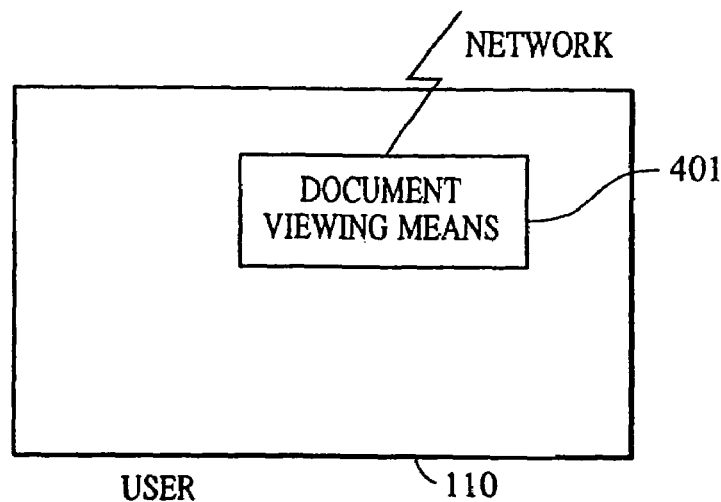
FIG. 4 is a diagram illustrating the software configuration of a user computer in an embodiment of the present invention.

FIG. 4 is an explanatory diagram representing the software configuration of the user computer 110 which is the information processing device which the user actually uses. The user computer 111 is also of the same configuration.

The user computer 110 comprises document viewing means 401 which is an application program read in from the ROM 203, HDD 209, or FDD 210, rendered to the RAM 202, and used. The document viewing means 401 is an application program which enables receiving of services from external sources, such as the Internet, via network (i.e., a common application program such as a so-called Internet browser). Services normally received by the document viewing means 401 normally are documents described in HyperText Markup Language (HTML), and in addition to viewing documents, document transmission request can be made to the contents providers 120 and 121 and the printout service provider 130 by operating buttons and the like embedded in the HTML, and transmitting printout commissions and various settings for commissioning printouts made at the user computer such as paper size for example can be performed, as well.

<Configuration of Contents Provider Computer and Data Center Computer>

Figure 5:
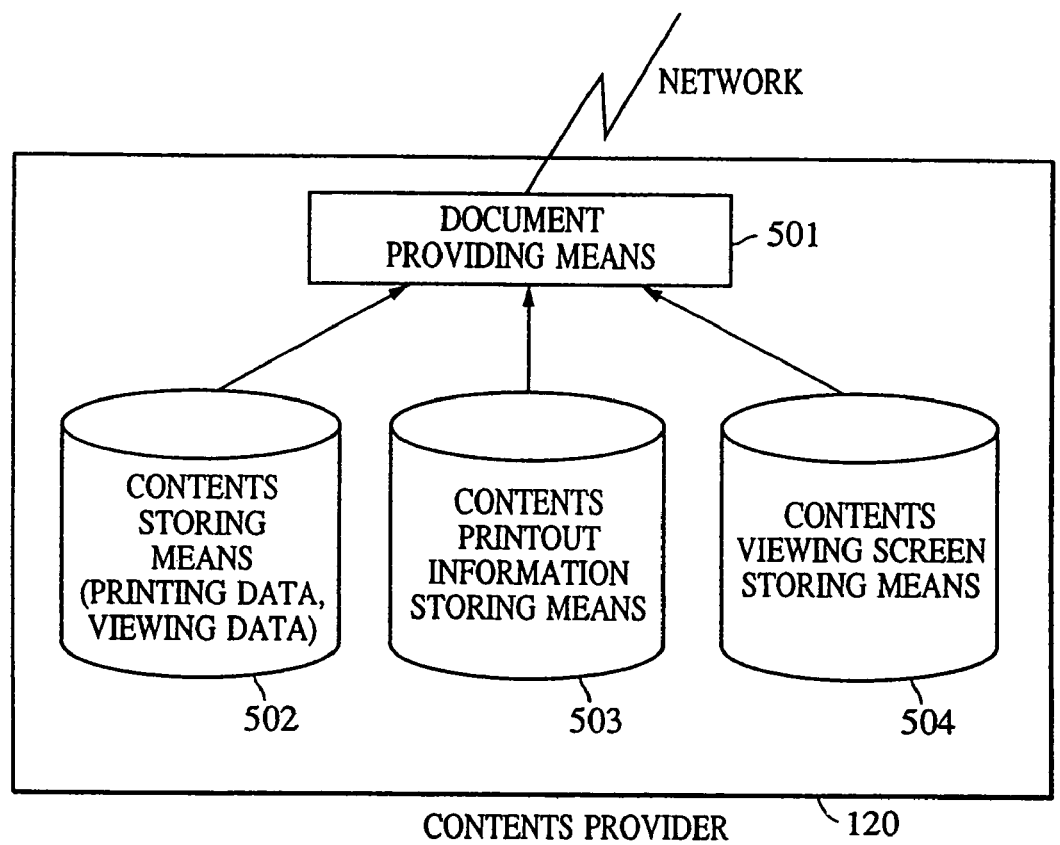
FIG. 5 is a diagram illustrating the software configuration of the contents provider computer and data center according to first and second embodiments.

FIG. 5 is a configuration diagram illustrating the processing means and management data within the contents provider computer 120. The contents provider computer 121 and data center 140 are of approximately the same configuration, and accordingly, description thereof will be made from FIG. 5 as well.

In FIG. 5, reference numeral 501 denotes an application program, which is read in from the ROM 203, HDD 209, or FDD 210, rendered at the RAM 202, and thus used. Reference numerals 502, 503, and 504 denote data stored within the HDD 209. The document providing means 501 is an application program enabling searching HTML documents, text, images, etc., from the data stored in the HDD 209 as described later, upon requests therefor from an external computer such as the user computers 110 and 111 or the printout service provider computer 130 via a network such as the Internet, and transmitting the file that has been found. The document providing means 501 is generally called an Internet server program or WWW server program, and is an application program which enables, in addition to the above transmitting of documents, applications programs stored within the HDD 209 to be rendered at the RAM 202 and used upon request from external computers, and performing user ID certification of users making external requests and restricting data to be transmitted, as necessary.

Reference numeral 502 denotes contents storing means for storing actual contents such as images and documents to be printed at the printout service provider 130, and viewing data to be displayed on the computer of the user as a preview of the contents. The viewing data is, in the case of an image for example, an image wherein the resolution has been reduced to the extent that screen display can be made. In the case of a document, a summarized text or an image whereby the first page can be displayed, is used. The present invention does not particularly restrict viewing data.

The data in the present means is stored in the HDD 209, with the document providing means 501 performing searches upon requests from external computers such as the user computers 110 and 111 or the printout service provider computer 130, and transmitting the data thereto.

Reference numeral 503 denotes contents printout information storing means for storing contents printout information describing, for example, various restrictions regarding contents such as printing size and number of copies to be printed, various restrictions regarding printout conditions such as sheet size for printing out and printing quality, and other information necessary for printout ordering and printing processing, at the time of printing out the actual contents stored in the contents storing means 502. Details of the contents printout information will be described later with reference to FIG. 7. The data in the present means is stored in the HDD 209, with the document providing means 501 performing searches upon requests from external computers such as the printout service provider computer 130, and transmitting the data thereto.

Reference numeral 504 denotes contents viewing screen storing means for storing HTML documents for displaying screens (contents viewing screens) for the users to view contents viewing data stored in the contents storing means 502 on the user computers 110 and 111, and perform printout commissioning. The data in the present means is stored in the HDD 209, with the document providing means 501 performing searches of the means upon requests from external computers such as the user computers 110 and 111 and so forth, and transmitting the data thereto.

The above has been a description of the configuration of the contents provider computer 120. Note that with the contents provider computer 121 according to the present embodiment, contents printout information and actual contents are handled as existing on the data center computer 140, and accordingly, the contents printout information storing means 503 and the contents storing means 502 are not indispensable components. In this case, the contents viewing data may be the contents viewing screen storing means 504. Also, with regard to the data center computer 140, the document providing means 501 does not necessarily have to be a so-called WWW server; a File Transfer Protocol (FTP) server or the like may be used so long as the computer is capable of transmitting files to the printout service provider computer 130. Further, the contents viewing screen storing means 504 within the data center computer 140 is not necessary for realizing the present invention, either.

<Configuration of Printout Service Provider Computer>

Figure 6:
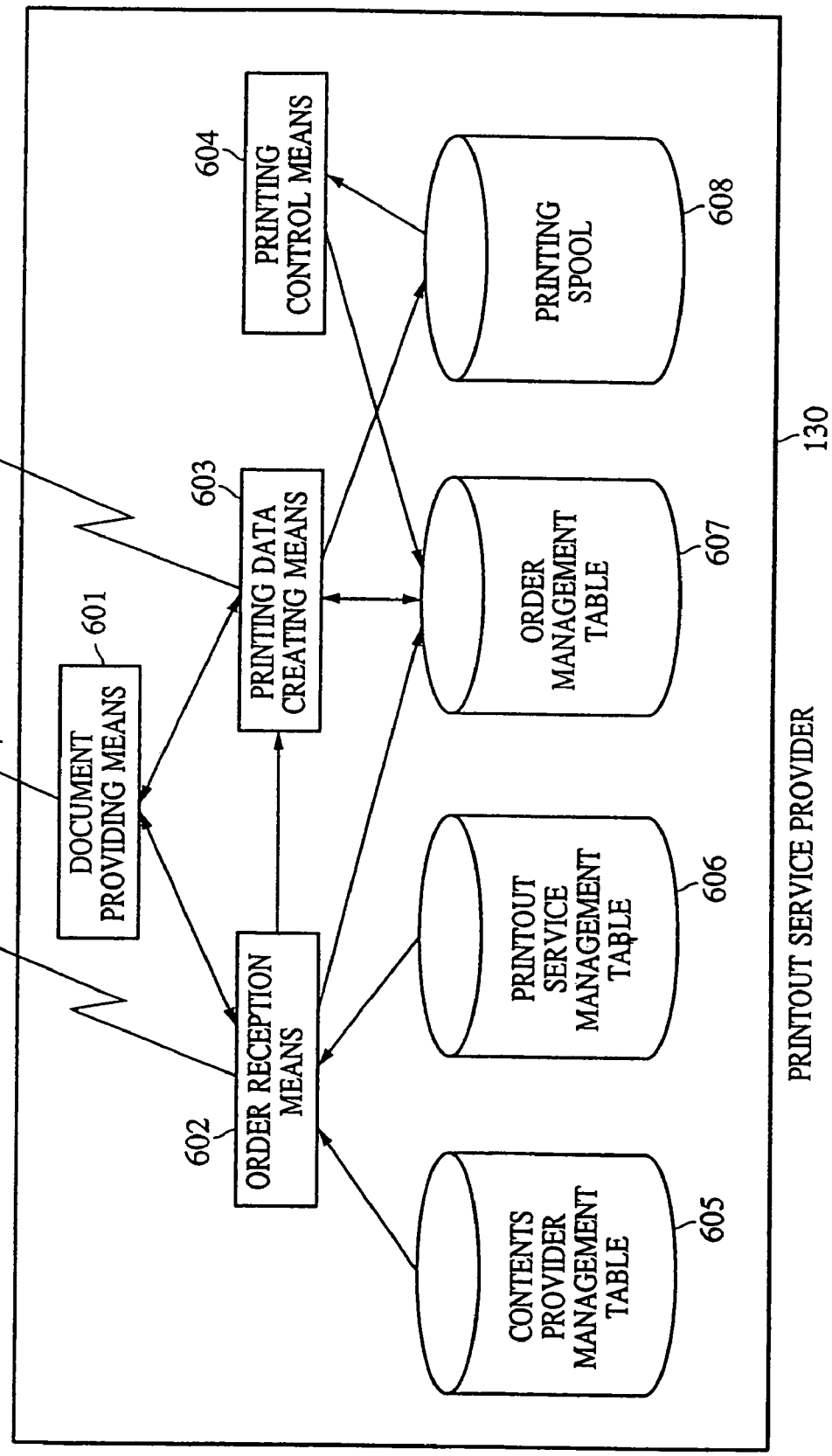
FIG. 6 is a diagram illustrating the software configuration of the printout service provider computer according to the first and second embodiments.

FIG. 6 is a configuration diagram illustrating the processing means and management data within the printout service provider computer 130. In FIG. 6, the processing means 601, 602, 603, and 604 are application programs, read in from the ROM 203, HDD 209, or FDD 210, rendered at the RAM 202, and thus used. Reference numerals 605, 606, 607, and 608 denote data stored within the HDD 209.

The document providing means 601 is equal to the document providing means 501, and is an application program enabling searching HTML documents, text, images, etc., from the data stored in the HDD 209 as described later, upon requests therefor from the external computers such as the user computers 110 and 111 or contents provider computers 120 and 121 via a network such as the Internet, and transmitting the file that has been found. The document providing means 601 is generally called an Internet server program or WWW server program, and is an application program which enables, in addition to transmission of documents, applications programs stored within the HDD 209 to be rendered at the RAM 202 and used upon request from external computers, and performing user ID certification of users making external requests and restricting data to be transmitted, as necessary.

The order reception means 602 is an application program group for performing reception of contents printout orders. The functions of the order reception means 602 can be generally divided into three stages.

As the first stage, the order reception means 602 is activated by a printout order request issued by the user computers 110 or 111, determines the contents and the contents provider having the contents regarding which a printout request has been made, obtains contents printout information of the contents necessary for reception of the order, from the contents provider computer 120 or the data center computer 140, and further obtains necessary information from a later-described printout service management table 606, thereby generating order information in a later-described order management table 607 and generating an HTML document for displaying a printout conditions specifying screen whereby settings for printing out are made, which are transmitted to the user computers 110 or 111 issuing the printout order request.

The second stage is a function for being activated by printout conditions settings requests issued along with the various printout conditions settings, according to the printout conditions screen displayed on the user computer 110 or 111 which is the transmission destination of the HTML document, generating printout orders, and transmitting an HTML document to the user computer for displaying a printout confirmation screen.

The third stage is a function for being activated by receiving a printout order completion notification issued from the user computers 110 or 111 by performing confirmation operation with the printout confirmation screen, and the later-described printing data creating means 603 for performing printing preparation work is activated.

As described above, the order reception means 602 is an application program which is rendered to the RAM 202 from within the HDD 209 or the like by the document providing means 601 based on requests from external computers, and is generally called a CGI program.

The printing data creating means 603 is an application program which is rendered to the RAM 202 from the HDD 209 or the like by the order reception means 602, and thus used. After being activated by the order reception means 602, the printing data creating means 603 extracts records for creating printing data from the order management table 607, obtains the actual contents to be printed out from the contents provider computer 120 or the data center computer 140 following the record, creates other data necessary for printing, and saves this to a later-described printing spool 608.

Reference numeral 604 denotes printing control means for controlling the printing processing of printing data within the printing spool 608, following the order management table 607. The printing control means 604 is an application program which is rendered to the RAM 202 from within the HDD 209 or the like, and thus used. Activation of the printing control means 604 occurs at the time of activation of the printing data creating means 603, or at an arbitrary timing set by the operator of the printout service provider computer 130 or automatically at set intervals by a timer.

The contents provider management table 605 has the data structure described later with reference to FIG. 8, and stores the address of the contents provider computer or data center, the location of contents printout information, and so forth.

The printout service management table 606 is a table storing all printout service settings provided by the printout service provider computer 130, and stores type of printer, printing conditions (sheet size, number of copies, paper quality, print quality, position, enlargement/reduction, two-side printing, binding direction and other layout information, post-printing work such as binding, laminating, covering, etc.), information regarding printing prices, and so forth.

Note that the printers registered in the printout service management table 606 must be printers capable of performing printing processing according to printout orders received by the printout service provider computer 130. With regard to the connection of the printers, it is needless to say that printers connected to the PTRC 301 of the printout service provider computer 130 may be used, and further printers directly connected to the network 100, and printers connected to computers other than the printout service provider computer 130 which are connected to the network 100, may be used as well.

The order management table 607, described in detail later with reference to FIG. 9, stores the printout order and accompanying information, and the state of progress of the order. The printing spool 608 stores actual contents for realizing the printing of the printout order and other data necessary for printing.

<Contents Printout Information>

Next, a description will be given regarding the contents printout information stored in the contents printout information storing means 503 of the contents provider computer 120 and data center computer 140.

As described earlier, contents printout information is data describing information necessary for printout ordering and printing processing at the time of printing the contents which the contents provider has. Though the present invention does not particularly specify a particular data format or description format for the data, contents stored in the contents storing means 502 that can be printed by the present invention must have contents printout information corresponding to the contents. Also, the present invention does not particularly stipulate the transfer method of contents printout information to the printout service provider. In order to describe the present invention in an even clearer manner, the present embodiment will be described as having one text file describing contents printout information corresponding to each of the printable contents, and the files are stored in the contents printout information storing means 503.

Information described in the contents printout information will be listed next.

The following, and possibly others, are described as information relating to contents, as necessary:

① A contents code uniquely specifying contents within at least the range of the contents provider;
② Contents type, such as document, image, etc.;
③ The location of the actual contents;
④ The location of the viewing data;
⑤ Price information;
⑥ Overlay information, which is information to be overlaid at the time of printing the contents, e.g., copyright display, serial No., etc.; and
⑦ Overlay position information representing the overlay position of the overlay information.

The following, and possibly others, are described as restriction information relating to printing out of the contents, as necessary:

① Size restriction information restricting the minimum and maximum size of the contents at the time of printing;
② Sheet size restriction information restricting the size of the printing sheet;
③ Sheet quality restricting information restricting the quality of the printing sheet;
④ Restriction information for the number of copies, restricting the maximum number of copies which can be printed; and
⑤ Printer restriction information restricting the type of printer to print out the contents.

The following, and possibly others, are described as other contents printout information, as necessary:

① Default specified for printout settings;
② Settlement information for contents;
③ Settlement information for material printed out;
④ Identification information of users; and
⑤ Identification information of printout ordering managed by the contents provider.

FIG. 7 is a diagram illustrating an example of contents printout information according to the present embodiment.

In FIG. 7, reference numeral 700 denotes contents printout information, and with the present embodiment, is supplied as a text data file. The contents printout information 700 starts with an index item between the parentheses [ ] as shown in the figure, and is listed in "settings name=settings value" fashion following the index item.

Reference numeral 701 denotes a contents information space listing information relating to the contents. There are two index items with the present embodiment indicating the contents information space 701. The first index item "[CONTENTS]" lists contents code and the like, and the second index item "[OVERLAY]" lists overlay text strings which are printed along with the contents by overlaying at the time of printing contents, and the positions thereof. In FIG. 7, there are five settings under the first index item.

"CONTENTSCODE=ABC0001" indicates that the object of the contents printout information 700 is the contents specified by the contents code "ABC0001"

"TYPE=IMAGE" indicates the type of contents, such as image or document, and in this case indicates that "ABC0001" is an image.

"ADDRESS=http://www.sellpc/PRINTDATA/abc0001.jpg" indicates that the location of the file "abc0001.jpg" which is the actual contents is "http://www.sellpc/PRINTDATA/abc0001.jpg".

"PREVIEW=/THMB/abc0001_pre.jpg" indicates that the location of the viewing data "abc0001_pre.jpg" used for previewing and so forth is "/THMB/abc0001_pre.jpg".

In the event that, unlike the actual contents, there is no information indicating the computer name in the location of the viewing data, as in this case, this means that the viewing data exists on the same computer where the contents printout information 700 is stored.

The last settings item belonging to the index item "[CONTENTS]", which is "PRICE=3000", means that the price of the contents is 3,000 Yen. Note that though the present embodiment omits currency units, currency units may be included to handle cases wherein multiple currencies exist.

The other index item "[OVERLAY]" of the contents information space 701 lists the added data to be printed out along with the contents at the time of making the contents printout, and the position thereof.

"STRING="COPYRIGHT"" indicates added data. The text string in the quotes " " for the setting value is the text string that will be printed out along with the contents. "HORIZONTAL=CENTER", "VERTICAL=UNDERBOTTOM" define the position for the added data, and in the case in FIG. 7 means that the horizontal position is at the center and the vertical position is at the bottommost position.

Reference numeral 702 denotes a printout information space listing restriction information for printing out contents.

The printout information space 702 according to the present embodiment is indicated by "[PRINT LIMIT]".

In FIG. 7, there are the following three setting items in "[PRINT LIMIT]". Though items other than these three shown in FIG. 7 can be set with the contents printout information, with the present embodiment, information regarding which settings have been omitted is handled as having no restrictions or default values set to the printout service provider computer 130 beforehand are applied.

"MAXSIZE=400*290" indicates that the actual printing size of the contents is to be restricted to 400 (mm) wide and 290 (mm) high.

"MAXPAPER=A3" indicates that the largest sheet size used for printing is to be restricted to A3.

"MAXVOLUME=100" indicates that the number of printouts that can be made with one printout order is to be restricted to 100.

Reference numeral 703 denotes a miscellaneous information space for other contents printout information according to the present embodiment that does not belong to either contents-related information or contents printout-related restriction information. With the present embodiment, the miscellaneous information space 703 is indicated by the index item "[ETC ]".

In FIG. 7, "PAYMENT=FINISHED" means that the bill for the contents has already been settled.

The above has been a description of the contents printout information according to the present embodiment, with reference to FIG. 7.

Of course, information in the printout information space 702 is not the only information which might be omitted; information in the contents information space 701 and miscellaneous information space 703 can also be omitted as long as this does not interfere with printout ordering and printing out.

<Contents Provider Management Table>

Next, description will be made regarding a contents provider management table 605 which the printout service provider computer 130 has.

The contents provider management table 605 stores and manages the position where the contents provider computer 120 and data center computer 140 exist and the position where the contents printout information is stored within the computer. This table is stored in the HDD 209. Using a database system or the like can realize a suitable configuration.

The contents provider management table 605 is searched at the time of the order reception means 602 at the time of performing order reception processing, and reception processing of printout orders for contents existing in external computers is realized by making reference to the search results.

FIG. 8 is a schematic diagram of a contents provider management table according to the present embodiment.

The contents provider management table 605 manages three items, denoted by reference numerals 801, 802, and 803, as a single record (hereafter referred to as "contents provider management record").

Reference numeral 801 denotes a contents provider code issued beforehand for each contents provider, and stored, for identifying contents providers.

Reference numeral 802 denotes a base address representing the position of the contents provider computers 120 and 121 on the network. With the present embodiment, description is made with reference to an example wherein the network connection is made with the Internet, so the base address 802 describes the locations thereof with Uniform Resource Locators (URLs) commonly used in Internet environments.

Reference numeral 803 denotes a contents printout information path, for storing the position of the contents printout information storing means 503. The contents printout information path 803 is described as a relative path from the base address 802.

Thus, the contents provider code is determined by the parameters provided at the time of activating the order reception means, and further a file name is provided to the contents printout information such that the uniqueness of the contents code is guaranteed, thereby synthesizing the base address 802 in the record detected by the contents provider code 801 and the contents printout information path 803, and further synthesizing the contents printout information file name, consequently enabling the location of the contents printout information for performing printout ordering to be determined. Then, the contents printout information is obtained based on the location of the contents printout information within the contents provider computer 120 or the data center computer 140.

Next, description will be made regarding an example of data in the contents provider management table, according to the present embodiment.

Reference numeral 811 denotes a contents provider management record corresponding to the contents provider computer 120, in the present embodiment. The contents provider management record 811 indicates that the contents provider code 801 issued beforehand is "0001", that the base address 802 is "http://www.sellpc", and that the contents printout information path 803 is "/info/printinfo".

Reference numeral 812 denotes a contents provider management record corresponding to the contents provider computer 121, in the present embodiment. The contents provider management record 812 indicates that the contents provider code 801 issued beforehand is "0002", that the base address 802 is "http://www.hanbai_Stock", and that the contents printout information path 803 is "/printinfo".

The following is a description of a specific example of the procedures for generating contents printout information location with the order reception means 602, in the printout service provider computer 130 having the contents provider management tables 811 and 812.

Activating the order reception means 602 analyzes the parameters to be handed to the means upon activation. For example, in the event that the analysis results of the parameters to be handed upon activation indicate that the contents provider code is "0001" and the contents code is "ABC0001", searching a contents provider record wherein the contents provider code 801 in the contents provider management table 605 matches "0001" determines the contents provider management record 811. Next, the contents provider management record 811 is obtained, and the path, for the contents printout information corresponding to the contents for which printing out is to be ordered, is synthesized from the base address 802, contents printout information path 803, and the contents code. For example, in the event that ".inf", which is a file suffix is attached to the contents code for the contents printout information file name, the location of the contents printout information of the contents specified by the contents code "ABC0001" is "http://www.sellpc/info/printinfo/ABC0001.inf".

<Order Management Table>

Next, description will be given regarding the order management table 607 in the printout service provider computer 130.

The order management table 607 manages the location of contents to be printed out for the printout order, information necessary for printing out, the state of progression of the printout order, and so forth. This table is stored in the HDD 209. Using a database system or the like can realize a suitable configuration.

FIG. 9 is a part of a schematic diagram of the order management table 607. With the order management table 607, each order makes one record.

Reference numeral 901 denotes an order code capable of uniquely identifying each printout order to the printout service provider computer 130. The order code 901 is issued at the time of activating the order reception means 602, and is used for identifying orders at the time of processing with the order reception means 602, printing data creating means 603, and printing control means 604.

Reference numeral 902 denotes a contents provider code for the code of the contents provider storing the contents to be printed by the printout order. The contents provider code 902 is obtained by analyzing the parameters to be handed over at the time of activating the order reception means 602, and is stored with the order code at the time of issuing the order code.

Reference numeral 903 denotes a contents address storing the location of the actual contents in an external computer, such as the contents provider computer 120 which is where the actual contents to be printed out by the printout order are collected, or the data center 140. The contents address 903 is extracted from the contents printout information at the time of the order reception means obtaining the contents printout information from the contents provider computer 120 or the data center 140, and is stored.

Reference numeral 904 denotes a status managing the state of progression of the printout order. In the present embodiment, the status 904 contains one of the following statuses as the state of progression:

① "Ordering", meaning that the printout order is in the reception stage;

② "Gathering image", meaning that the printout data is being created by the printing data creating means 603;

③ "Standby for printing", meaning that all contents and other information necessary for the printout have been stored in the printing spool 608 and that preparations for printing have been completed; and ④ "Printing completed", meaning that printing has been executed by the printing control means 604.

The above has been a description of the configuration of the necessary records as a description of the order management table 607 according to the present embodiment. Note that information other than 901 through 904 are stored in a record in the order management table 607, such as output printer, sheet size, sheet quality, number of copies to be printed, and further the ordering party, settlement information, etc., i.e., information relating to printing out the printout order. Also note that the present invention does not restrict in any way separating the components making up single records in the order management table 607 according to the present embodiment into multiple tables, such as separating information which is not directly related to the printout, e.g., the ordering party, from information relating to the printout data, e.g., the contents address 903, and making these into separate tables, or further separating the order progression state, as well. In the event that the table is to be separated and managed thus, the present invention can be realized by managing using multiple tables with order codes as keys, for example.

Now, returning to FIG. 9, reference numerals 911, 912, 913, and 914 illustrate examples of records in the order management table. These will be referred to in the following description of the embodiment as, for example, "order management record example 911", and so forth.

<Flow of the Present System>

Next, the flow of processing with the present embodiment will be described with reference to FIG. 10 and other drawings.

Figure 10:
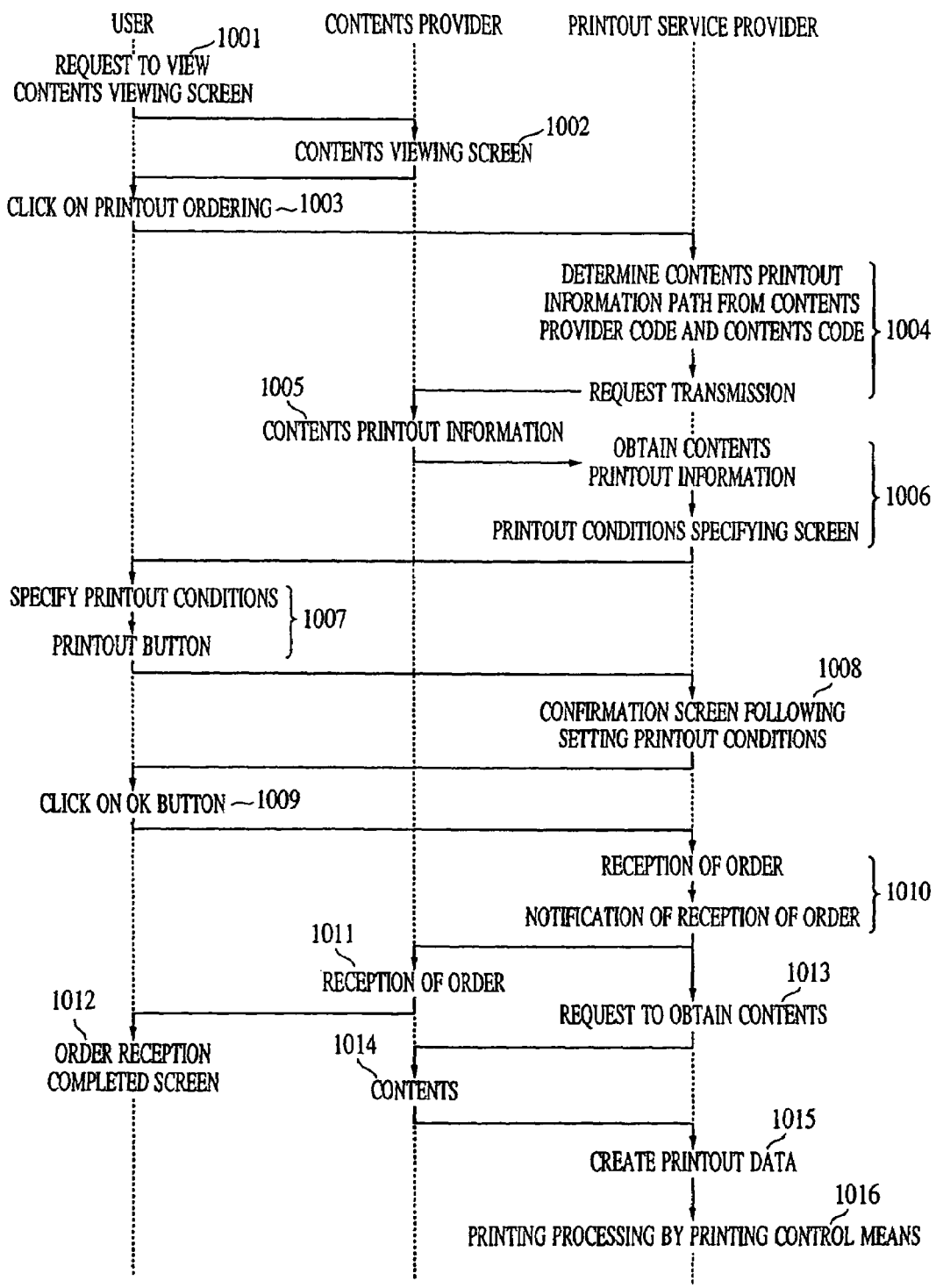
FIG. 10 is a flowchart of the processing occurring between the user computer, contents provider computer, and printout service provider, according to the first embodiment.

FIG. 10 is a processing flowchart for describing the flow occurring between the user computer 110, contents provider computer 120, and the printout service provider 130, according to the present invention. In the following description, the user uses the user computer 110 to view the viewing screen within the contents provider 120, and makes printout orders to the printout service provider 130.

First, the user uses the document viewing means 401 in the user computer 110 to make a contents viewing screen display request to the contents provider computer 120. The contents viewing screen display request specifies the URL of a contents viewing screen that the user desires to view, based on HTTP protocol. The URL is specified by the user using the KB 208 to directly make input to the document viewing means 401, or using some other means to this end such as selecting a link on the screen which is displayed by the document viewing means 401 based on the HTML document. This processing is denoted by reference numeral 1001 in the figure.

The contents viewing screen display request issued by the user computer 110 is received over the network 100 by the document providing means 501 in the contents provider computer 120 via the NETIF 204. Upon receiving the contents viewing screen display request, the document providing means 501 transmits to the requesting user computer 110 an HTML document stored in the contents viewing screen storing means 504 corresponding to the specified URL, as well as viewing data stored in the contents storing means 502 which is linked to in the HTML document. This processing is denoted by reference numeral 1002 in the figure.

The document viewing means 401 within the user computer 110, upon receiving the HTML document and the viewing data, performs display of the contents viewing screen based on the HTML document.

Now, a description will be given of the contents viewing screen, with reference to FIGS. 11A and 11B.

Figure 11A:
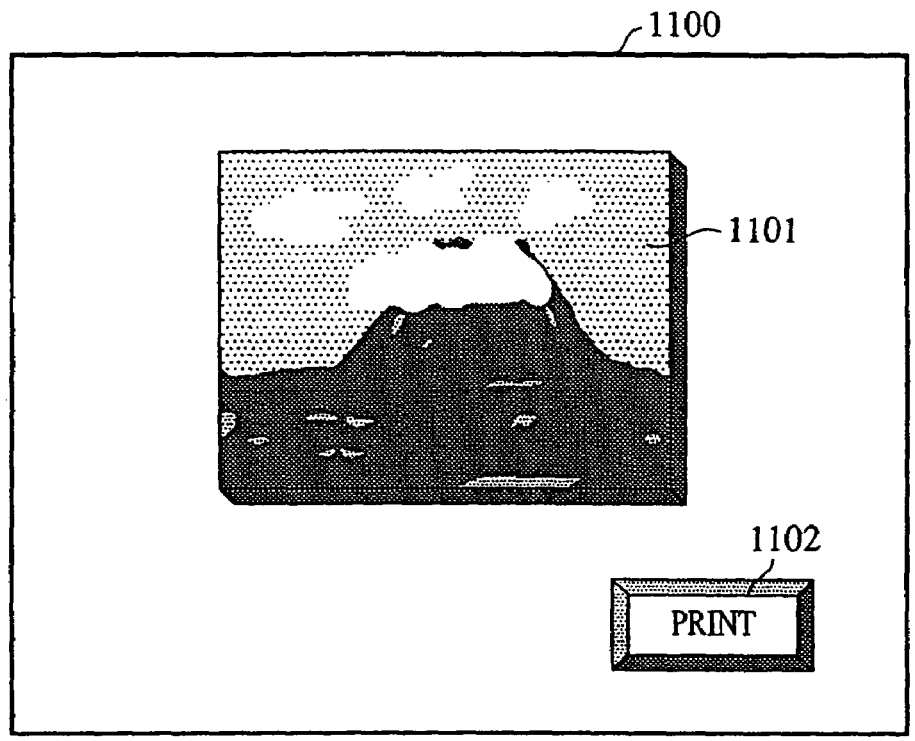
FIG. 11A is an example of a contents viewing screen according to the first embodiment.
Figure 11B:
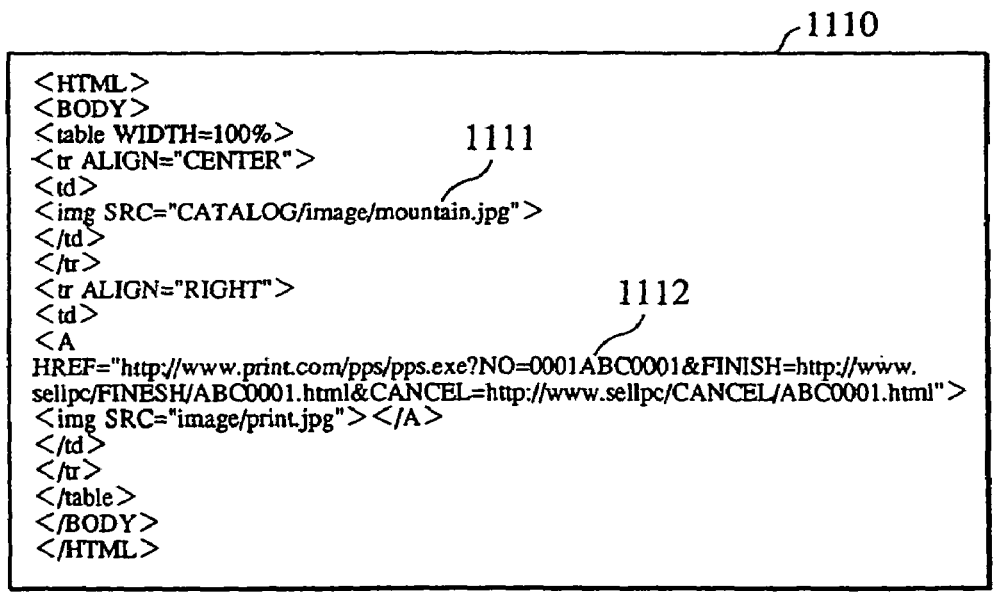
FIG. 11B is an example of an HTML document described so as to display the viewing screen, transmitted from the contents provider computer.

FIG. 11A is an example of a contents viewing screen, and FIG. 11B is an example of an HTML document described so as to display this contents viewing screen, transmitted from the contents provider computer 120.

In FIG. 11A, reference numeral 1100 denotes a contents viewing screen to be displayed on the user computer 110 in the preset embodiment. Reference numeral 1101 denotes a viewing screen using the contents viewing data displayed on the screen, with the contents viewing data being transmitted from the contents storing means 502 within the contents provider computer 120, and the document viewing device 401 performing display on the main screen.

Reference numeral 1102 denotes a printout commissioning button for commissioning a printout of the contents displayed on this screen to the printout service provider computer 130.

In FIG. 11B, reference numeral 1110 denotes an HTML document describing the display form of the contents viewing screen 1100, links, etc., and reference numeral 1111 denotes a viewing display instruction statement described so as to display images, which has described therein the location of the viewing data according to the present embodiment and the image file name.

Reference numeral 1112 denotes a print button display instruction statement describing displaying of the print button and action instructions given to the document viewing means 401 in the event that an action instruction such as clicking the print button has been performed. The description "http://www.print.com/pps/pps.exe" in the print button display/action instruction statement is the activation instruction part for the CGI program which is the order reception means 602, instructing the printout service provider computer 130, and "NO=0001ABC0001" is the first parameter for activating the order reception means 502. Multiple parameters can be specified using "&", and the second parameter is "FINISH=http://www.sellpc/FINISH/ABC0001.html". In the same manner, the third parameter is "CANCEL=http://www.sellpc/CANCEL/ABC0001.html". The first parameter of the present embodiment is configured of the contents provider code stored in the contents provider code 801 in the contents provider management table 605 and the contents code stored in the contents printout information 700. The second and third parameters are the returning designations to the screen provided by the contents provided following completion of the order reception, with the second parameter being for cases wherein the order reception has been completed successfully, and the third parameter being a return destination in the event that the order reception is not completed due to the user canceling or other causes such as communication problems or the like, which causes an HTML document retrieval by HTTP protocol in the present embodiment.

The second and third parameters will be used in later-described processing, and accordingly are kept for later reference by, for example, saving in the work area of the HDD 209 as a text file, or the like.

Returning to FIG. 10, in the state that the contents viewing screen 1100 is displayed, in the event that the user desires a printout of the actual contents of the viewing screen 1101 displayed on the screen, the user makes instructions to the printout commissioning button on the screen from the KB 208. In response to the instructions to the printout commissioning button 1102, the document viewing means 401 transmits an activation request for the order reception means to the printout service provider computer 130 as described in the print button display/action instruction statement 1112. This processing is denoted by reference numeral 1003 in the figure.

The document providing means 601 within the printout service provider 130 activates the order reception means 602 in the event that the order reception means activating instructions and parameters have been received, and hands the parameters to the order reception means 602.

The order reception means 605 analyzes the parameters, determines the contents provider code and contents code from the first parameter, performs a search of the contents provider management table 605 with the contents provider code determined by the parameters, and generates a contents printout information path using the contents code determined by the search results recording and the parameters. The second and third parameters are stored in the work area of the HDD 209 as a text file. Next, the generated contents printout information path is used to make an obtaining request of the contents printout information 700 to the contents provider computer 120. This processing is denoted by reference numeral 1004 in the figure.

Upon receiving the obtaining request for the contents printout information, the document providing device 501 within the contents provider computer 120 searches within the contents printout information storing means 503 and transmits the contents printout information which is the search results to the printout service provider computer 130. This processing is denoted by reference numeral 1005 in the figure.

The order reception means 602 within the printout service provider computer 130 issues an order code, and creates a new record for the order management table 607 with the order code 901, the contents provider code 902, the contents address 903 obtained from the received contents printout information, and the status 904 as "Ordering", as with the order management record example 914.

Next, the print information 702 within the contents printout information 700 is obtained, settings items matching the range of restriction listed in the information are obtained from the printout service management table 606, and these are described in an HTML document for performing display of the printout conditions specifying screen which is the output of the order information.

Next, viewing data is obtained with the viewing data address listed in the contents information space 701, and in the event that information relating to overlays exists therein, synthesizing is performed according to the information, and this is saved in the work area of the HDD 209 as a preview image for display on a later-described print conditions specifying screen, along with adding the saved location thereof in a predetermined position in the HTML document for displaying the printout conditions specifying screen. Also, the overlay information is provided with an order code or a file name which would allow it to be searched from the order management table 607, and saved in the printing spool 608.

Then, the HTML document described so as to display the printout conditions specifying screen on the user computer 110 is transmitted to the user computer 110 via the document providing means 601. This processing is denoted by reference numeral 1006 in the figure.

The document viewing means 401 in the user computer 110 displays the printout conditions specifying screen based on the received HTML document.

Figure 12:
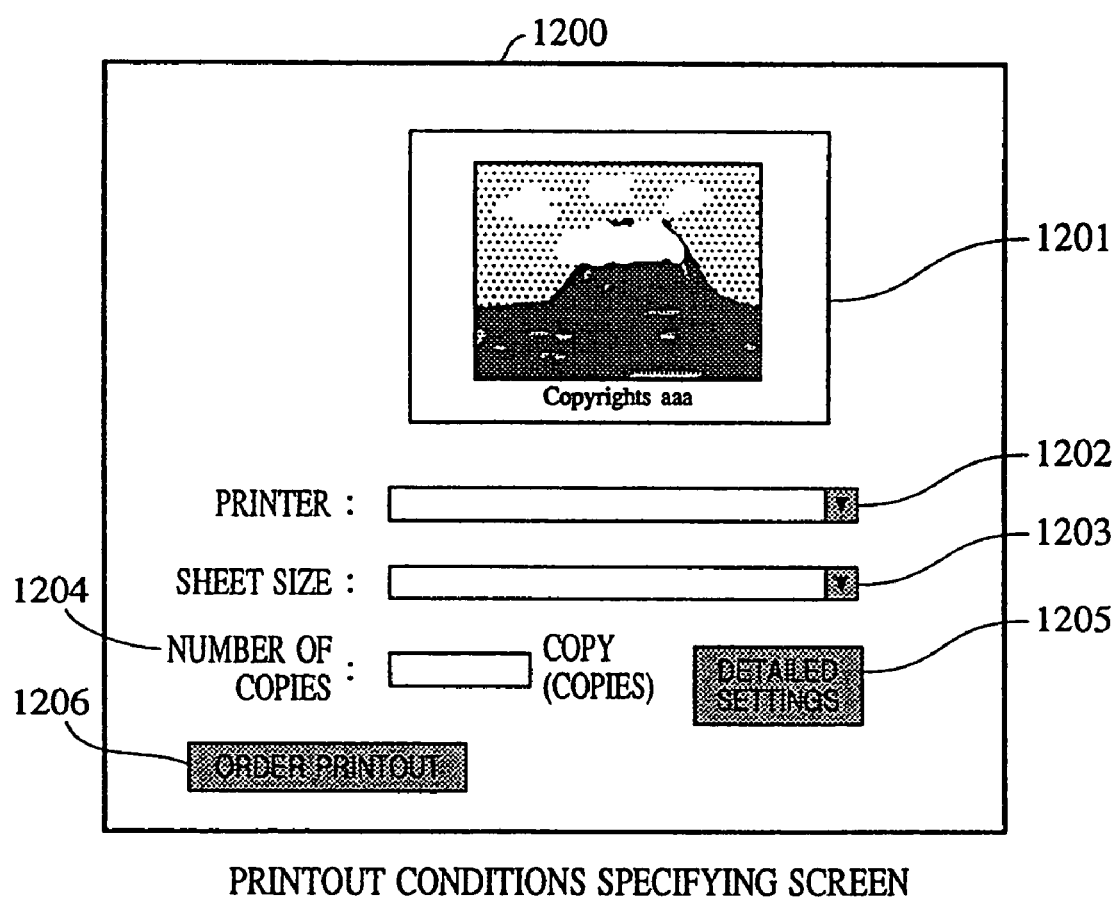
FIG. 12 is an example of a printout conditions specifying screen which document viewing means 401 of a user computer 110 displays in the first embodiment.

FIG. 12 illustrates the printout conditions specifying screen which the document viewing means 401 in the user computer 110 displays. In FIG. 12, reference numeral 1200 denotes the printout conditions specifying screen displayed according to the present embodiment.

Reference numeral 1201 denotes the preview image of the contents to be displayed in this screen. The preview image 1201 is an image in a state of reflecting overlay information and the like with the order reception means 602. That is to say, the printout results are displayed as a preview.

Reference numeral 1202 denotes a printer selection space for selecting the printer to perform the printout of the contents. The printer selection space 1202 is configured such that the user can only select printers capable of performing the printout, by the order reception means 602 selecting printers capable of performing the printout from the contents printout information 700 and the printout service management table 606 and assembling a list of the printers capable of performing the printout into the HTML document.

Reference numeral 1203 denotes a sheet selection space for selecting the printing sheet for performing the printout of the contents upon. The sheet selection space 1203 is configured such that the user can only select sheets on which the printout can be made, by the order reception means 602 selecting printing sheets for performing the printout from the contents printout information 700 and the printout service management table 606 and assembling a list of the printing sheets for performing the printout into the HTML document.

Reference numeral 1204 denotes a printout copy number specifying space.

Reference numeral 1205 denotes a detailed settings link button 1205 which calls up a detailed settings screen capable of performing detailed settings other than those which can be set by the printout conditions specifying screen 1200, such as enlarging or reducing, setting the printout sheet quality, etc. Details of the detailed settings link button 1205 will be omitted in the description the present embodiment.

Reference numeral 1206 denotes a printout ordering button for ordering printouts.

Now, let us return to FIG. 10 and continue with the description of the state transition.

The user uses the printout conditions specifying screen 1200 which the document viewing means 401 in the user computer 110 displays to set the output destination printer, sheet size, and number of copies. Also, if necessary, the user uses the detailed settings link button 1205 to call up the detailed settings screen and makes detailed settings thereby, and then returns to the main screen to make printout conditions settings.

Once the user has confirmed the settings, clicking on the printout ordering button causes the document viewing means 401 to transmit an activation instruction to the order reception means 602 within the printout service provider computer 130 which is the link destination listed in the HTML document. The printout conditions set at the printout conditions specifying screen 1200 and the detailed settings screen at the time of transmitting the activation instructions, and the order code assembled into the printout conditions specifying screen 1200 beforehand, are transmitted together. This processing is denoted by reference numeral 1007 in the figure.

The document providing means 601 within the printout service provider computer 130 activates the order reception means 602 again. The order reception means 602 searches the order management table 607 for a record having the order code within the parameters, and sets the printout conditions within the record obtained by the search. Then, a confirmation screen HTML document, for displaying a confirmation screen whereby the user confirms the intent to execute the printout under the printout conditions which the user has set, is transmitted to the user computer 110 via the document providing means 601. This processing is denoted by reference numeral 1008 in the figure.

The document viewing means 401 within the user computer 110, upon receiving the confirmation screen HTML document, displays the confirmation screen.

Figure 13:
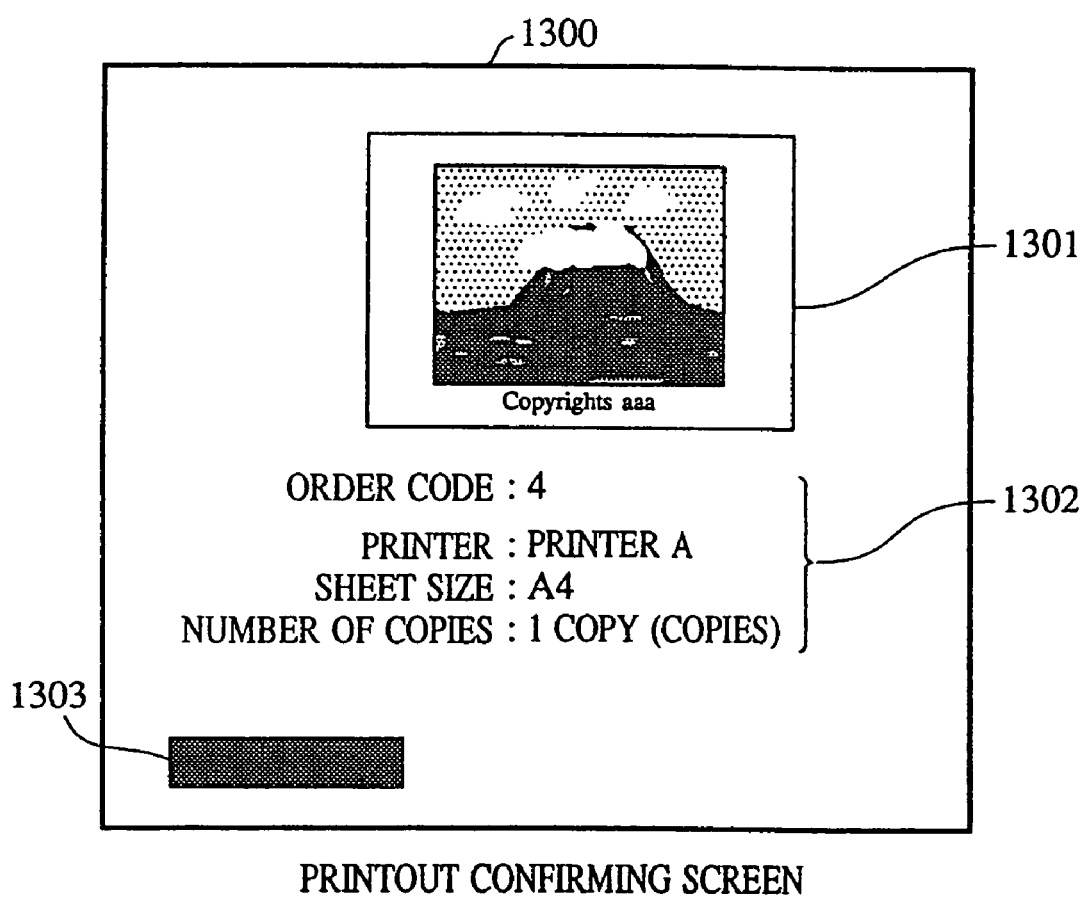
FIG. 13 is an example of a confirmation screen display according to the first embodiment.

FIG. 13 illustrates an example of a confirmation screen display. In FIG. 13, reference numeral 1300 denotes the confirmation screen.

Reference numeral 1301 denotes a preview image, the same as the preview image 1201 displayed in the printout conditions settings screen 1200. The preview image 1301 more suitably serves as a preview display by making a preview display under the conditions written to the order management table 607 whereby the actual printout will be made, at the point of the order reception means 602 receiving the printout conditions.

Reference numeral 1302 denotes a printout conditions confirmation space, displaying printing conditions set by the order reception means 602 to the order management table 607, order code whereby the order can be uniquely identified, and so forth.

Reference numeral 1303 denotes a confirmation button.

Returning to FIG. 10, following making confirmation of the preview image 1301 and the printout conditions 1302, the user clicks this button so as to confirm the printout order, thereby giving order confirming instructions to execute printing out, to the printout order reception means 602. This processing is denoted by reference numeral 1009 in the figure.

Based on the order confirmation instructions, the document providing means 601 within the printout service provider 130 searches within the order management table 607 for records having the order code received as a parameter, and sets "gathering image" for the status 904 of the record once it has been found.

Then, the order reception means 602 calls up the second parameter stored in the HDD 209 in 1004 as described above, and makes a request to the contents provider computer 120 so as to display the HTML document at the URL listed in the second parameter on the user computer 110. In the event that a direct request to the contents provider computer 120 is difficult due to restrictions in HTTP protocol or HTML document format, an arrangement may be made wherein, for example, an HTML document embedded with a link to the second parameter is transmitted to the user computer 110. Describing the document so as to automatically perform a transmission request for the page of the second parameter enables the screen stored in the contents provider computer 120 to be displayed. Next, the order reception means 602 activates the printing data creating means 603, and finishes processing. This processing is denoted by reference numeral 1010 in the figure.

The document providing means 501 of the contents provider computer 120 searches, from the contents viewing screen storing means 504, the HTML document regarding which a transmission request has been made in 1010 from the printout service provider computer 130 to the user computer 110, and transmits the HTML document found as a result of the search to the user computer 110. This processing is denoted by reference numeral 1011 in the figure.

The document viewing means 401 of the user computer 110 displays the order reception completion screen based on the HTML document received from the contents provider computer 120. The order reception completion screen displays a message to the effect that the printout order has been received, a link for continuing viewing contents with the contents provider computer 120, and so forth. This processing is denoted by reference numeral 1012 in the figure.

On the other hand, at the printout service provider computer 130, the printing data creating means 603 activated in the processing in 1010 receives the order code as a parameter at the time of activation, and accordingly searches the order management table 607 by order code, and obtains the contents address 903 from the record found as the result of the search. Next, a request is made with the contents address to the contents provider computer 120 for obtaining contents. This processing is denoted by reference numeral 1013 in the figure.

Upon receiving the request for obtaining the actual contents from the printout service provider computer 130, the document providing device 501 of the contents provider computer 120 obtains the contents regarding which a request for obtaining has been made from the contents storing means 502, and transmits the contents to the printout service provider computer 130. This processing is denoted by reference numeral 1014 in the figure.

Upon receiving the contents, the printing data creating means 603 of the printout service provider computer 130 stores to the printing spool 608, in a manner identifiable by order code, the contents data, the various settings for the printout, and data necessary for printing, such as added information and so forth, based on the record in the order management table 607. Then, the status 904 of this record in the order management table 607 is set to "Standby", the printing control means 604 is activated, and the processing ends. This processing is denoted by reference numeral 1015 in the figure.

The printing control means 604 first searches for records wherein the status 904 in the order management table 607 is set to "Standby", and obtains the order code string as the results of the search. Next, one order code is extracted from the order code string according to predetermined rules, data necessary for performing a printout corresponding to the code is obtained from the printing spool 608, the printout data is transmitted to the printer which is the output destination, and accordingly the printout is made. This processing is denoted by reference numeral 1016 in the figure.

Once the printout is completed, the order management table 607 is searched with the order code whereby the printout has been executed, and the status 904 of the found record in the order management table 607 is set to "Printing completed".

Thus, a printout of the actual contents within the contents provider computer 120 is realized by printout instructions from a contents viewing screen stored in the contents provider computer 120.

Second Embodiment

The system configuration will be described with reference to FIG. 1 used in the description of the first embodiment.

As the second embodiment, a description will be made regarding the procedures for the user computer 111 described with reference to FIG. 1 in the first embodiment to display a contents viewing screen stored in the contents provider computer 121, and issuing a printout order from this contents viewing screen. A major difference between the present embodiment and the first embodiment is that the actual contents and the contents printout information is not stored in the contents provider computer but in a data center 140, and is distributed to a printout service provider. The following is a description thereof with reference to FIG. 14 and other drawings.

<Processing Flow in the Second Embodiment>

Figure 14:
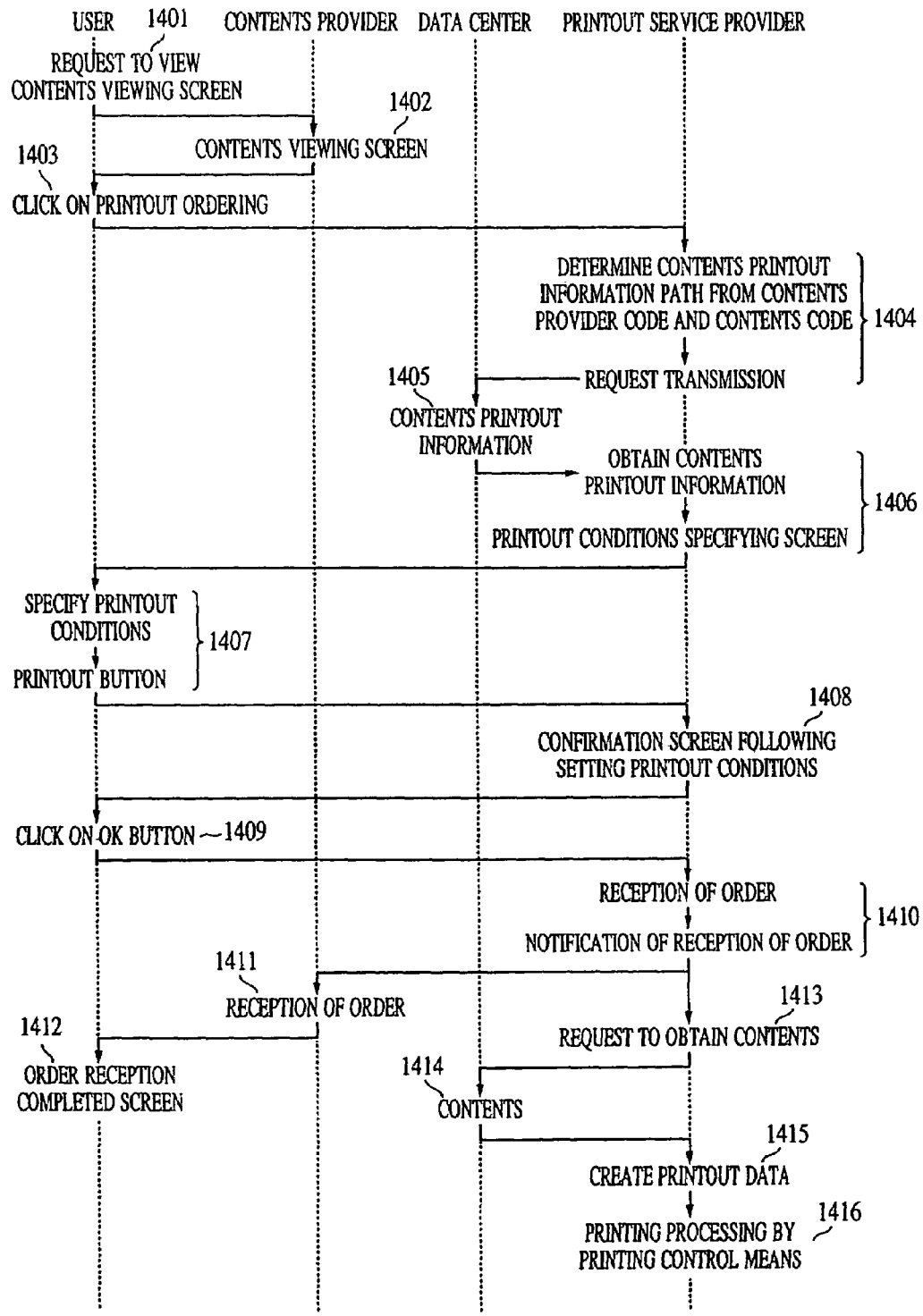
FIG. 14 is a flowchart of the processing occurring between the user computer, contents provider computer, data center, and printout service provider, according to the second embodiment.

FIG. 14 is a processing flowchart for describing the flow occurring between the user computer 111, the contents provider computer 121, the data center 140, and the printout service provider 130, according to the present embodiment. In the following description, the user uses the user computer 111 to view the contents viewing screen within the contents provider 121, and makes printout orders to the printout service provider 130.

First, the user uses the document viewing means 401 in the user computer 111 to make a contents viewing screen display request to the contents provider computer 121. The contents viewing screen display request specifies the URL of a contents viewing screen that the user desires to view, based on HTTP protocol. The URL is specified by the user using the KB 208 to directly make input to the document viewing means 401, or using some other means to this end such as selecting a link on the screen which is displayed by the document viewing means 401 based on the HTML document. This processing is denoted by reference numeral 1401 in the figure.

The contents viewing screen display request issued by the user computer 111 is received over the network 100 by the document providing means 501 in the contents provider computer 121 via the NETIF 204. Upon receiving the contents viewing screen display request, the document providing means 501 transmits to the requesting user computer 111 an HTML document stored in the contents viewing screen storing means 504 corresponding to the specified URL, as well as viewing data which is linked to in the HTML document. This processing is denoted by reference numeral 1402 in the figure.

The document viewing means 401 within the user computer 111, upon receiving the HTML document and the viewing data, performs display of the contents viewing screen based on the HTML document, as described in the first embodiment with reference to FIGS. 11A and 11B.

In the state that the contents viewing screen is displayed, in the event that the user desires a printout of the actual contents of the viewing image displayed on the screen, the user clicks the printout commissioning button on the screen. In response to clicking the printout commissioning button, the document viewing means 401 transmits an activation request for the order reception means to the printout service provider computer 130 as described in the print button display/action instruction statement. This processing is denoted by reference numeral 1403 in the figure.

The document providing means 601 within the printout service provider 130 activates the order reception means 602 in the event that the order reception means activating instructions and parameters have been received, and hands the parameters to the order reception means 602.

The order reception means 602 analyzes the parameters, determines the contents provider code and contents code from the first parameter, performs a search of the contents provider management table 605 with the contents provider code determined by the parameters, and generates a contents printout information path using the contents code determined by the search results recording and the parameters. The present embodiment differs from the first embodiment here in that the base address of the data center 140 is stored in the base address 802 in the contents provider management table 605, so the contents printout information is obtained from the data center 140. The second and third parameters are stored in the work area of the HDD 209 as a text file. Next, the generated contents printout information path is used to make an obtaining request of the contents printout information to the data center 140. This processing is denoted by reference numeral 1404 in the figure.

Upon receiving the obtaining request for the contents printout information, the document providing device 501 within the data center 140 searches within the contents printout information storing means 503 for the corresponding contents print information and transmits the contents printout information which is the search results to the printout service provider computer 130. This processing is denoted by reference numeral 1405 in the figure.

The order reception means 602 within the printout service provider 130 which has obtained the contents printout information from the data center 140 issues an order code, and creates a new record for the order management table 607 with the order code 901, the contents provider code 902, the contents address 903 obtained from the contents printout information, and the status 904 as "Ordering".

Next, the print information 702 within the contents printout information 700 is obtained, settings items matching the range of restriction listed in the information are obtained from the printout service management table 606, and these are described in an HTML document for performing display of the printout conditions specifying screen which is the output of the order information.

Next, viewing data is obtained with the viewing data address listed in the contents information space 701, and in the event that information relating to overlay exists there, synthesizing is performed according to this information, and the synthesized data is saved in the work area of the HDD 209 as a preview image to be displayed on a later-described printout conditions specifying screen, while the position where this has been saved is added to a predetermined position in the HTML document for displaying the printout conditions specifying screen. Also, the overlay information is provided with an order code or a file name which would allow it to be searched from the order management table 607, and saved in the printing spool 608.

Then, the HTML document described so as to display the printout conditions specifying screen on the user computer 111 is transmitted to the user computer 111 via the document providing means 601. This processing is denoted by reference numeral 1406 in the figure.

The document viewing means 401 in the user computer 111 displays the printout conditions specifying screen based on the received HTML document, as shown in FIG. 12 described in reference to the first embodiment.

The user uses the printout conditions specifying screen which the document viewing means 401 in the user computer 111 displays to set the output destination printer, sheet size, and number of copies. Also, if necessary, the user calls up the detailed settings screen and makes detailed settings thereby, and then returns to the main screen to make printout conditions settings. Once the user has confirmed the settings, instructing the printout ordering button causes the document viewing means 401 to transmit an activation instruction to the order reception means 602 within the printout service provider computer 130 which is the link destination listed in the HTML document. The printout conditions set at the printout conditions specifying screen and the detailed settings screen at the time of transmitting the activation instructions, and the order code assembled into the printout conditions specifying screen beforehand, are transmitted together. This processing is denoted by reference numeral 1407 in the figure.

The document providing means 601 within the printout service provider computer 130 activates the order reception means 602 again. The order reception means 602 searches the order management table 607 for a record having the order code within the parameters, and sets the printout conditions within the record obtained by the search. Then, a confirmation screen HTML document, for displaying a confirmation screen whereby the user confirms the intent to execute the printout under the printout conditions which the user has set, is transmitted to the user computer 111 via the document providing means 601. This processing is denoted by reference numeral 1408 in the figure.

The document viewing means 401 within the user computer 111, upon receiving the confirmation screen HTML document, displays the confirmation screen such as shown in FIG. 13, described with regard to the first embodiment. Following making confirmation of the preview 1301 and the printout conditions 1302, the user clicks on this button, so as to confirm the printout order, thereby giving order confirming instructions to the printout order reception means 602. This processing is denoted by reference numeral 1409 in the figure.

Based on the order confirming instructions, the document providing means 601 within the printout service provider 130 searches the order management table 607 for records having the order code received as a parameter, and sets "gathering image" for the status 904 of the record once it has been found.

Then, the order reception means 602 calls up the second parameter stored in the HDD 209 in 1404 as described above, and makes a request to the contents provider computer 121 so as to display the HTML document at the URL listed in the second parameter on the user computer 111. In the event that a direct request to the contents provider computer 121 is difficult due to restrictions in HTTP protocol or HTML document format, an arrangement may be made wherein, for example, an HTML document embedded with a link to the second parameter is transmitted to the user computer 110. Describing the document so as to automatically perform a transmission request for the page of the second parameter enables the screen stored in the contents provider computer 121 to be displayed. Next, the order reception means 602 activates the printing data creating means 603, and finishes processing. This processing is denoted by reference numeral 1410 in the figure.

The document providing means 501 of the contents provider computer 121 searches, from the contents viewing screen storing means 504, the HTML document regarding which a transmission request has been made in 1410 from the printout service provider 130 to the user computer 111, and transmits the HTML document found as a result of the search to the user computer 111. This processing is denoted by reference numeral 1411 in the figure.

The document viewing means 401 of the user computer 111 displays the order reception completion screen based on the HTML document received from the contents provider computer 121. The order reception completion screen displays a message to the effect that the printout order has been received, a link for continuing viewing contents with the contents provider computer 121, and so forth. This processing is denoted by reference numeral 1412 in the figure.

On the other hand, at the printout service provider computer 130, the printing data creating means 603 activated in the processing in 1410 receives the order code as a parameter at the time of activation, and accordingly searches the order management table 607 by order code, and obtains the contents address 903 from the record found as the result of the search. Next, a request is made with the contents address to the data center 140 for obtaining contents. This processing is denoted by reference numeral 1413 in the figure.

Upon receiving the request for obtaining the actual contents from the printout service provider computer 130, the document providing device 501 of the data center 140 obtains the contents regarding which a request for obtaining has been made from the contents storing means 502, and transmits the contents to the printout service provider computer 130. This processing is denoted by reference numeral 1414 in the figure.

Upon receiving the contents, the printing data creating means 603 of the printout service provider computer 130 stores to the printing spool 608, in a manner identifiable by order code, the contents data and data necessary for printing, such as the various settings for the printout, added information, and so forth, based on the record in the order management table 607, the status 904 of this record in the order management table 607 is set to "Standby", the printing control means 604 is activated, and the processing ends. This processing is denoted by reference numeral 1415 in the figure.

The printing control means 604 first searches for records wherein the status 904 in the order management table 607 is set to "Standby", obtains the order code string as the results of the search, and extracts one order code from the order code string according to predetermined rules, data necessary for performing a printout corresponding to the code is obtained from the printing spool 608, the printout data is transmitted to the printer which is the output destination, and accordingly the printout is made. This processing is denoted by reference numeral 1416 in the figure.

Once the printout is completed, the order management table 607 is searched with the order code whereby the printout has been executed, and the status 904 of the found record is set to "Printing completed".

Thus, a printout of the actual contents within the data center 140 is realized by printout instructions from a contents viewing screen stored in the contents provider computer 121.

Third Embodiment

The first and second embodiments have been described with regard to an arrangement wherein printout requests issued from user computers 110 and 111 are made to a printout service provider computer 130. This third embodiment will be described with regard to an arrangement wherein the user computers 110 and 111 issue printout requests to contents provider computers 120 or 121, instead of the printout service provider computer 130.

<System Configuration>

The system configuration will be described with reference to FIG. 1 which was used for describing the system configuration for the first and second embodiments.

FIG. 1 is a configuration diagram of the overall system according to embodiments of the present invention.

In FIG. 1, reference numerals 110 and 111 denote information processing devices (computer system comprising CPU, ROM, RAM, HDD, etc., as described later with reference to FIG. 2) for customers, which are users of the system according to the present embodiment, to perform direct operation from their homes, for example, and will hereafter be referred to as "user computers".

The user computers 110 and 111 have functions for viewing documents including contents of images and the like, and catalogs of contents, stored in later-described contents provider computers 120 and 121 via a network 100, and also have functions for placing orders for printing orders to the contents provider computers 120 and 121 by using a printing order button contained in the document. Note that though the number of user computers connected in the present embodiment is two, with the present invention the number of user computers connected is not restricted in any way as long as one or more user computers are connected.

Reference numerals 120 and 121 denote information processing devices for contents providers which provide contents such as images and documents to carry out various services, and will hereafter be referred to as "contents provider computers" or simply "contents providers".

The contents provider computers 120 and 121 have functions for providing user computers 100 or 111 with documents including contents of images, documents, and the like, and catalogs of contents (hereafter may be referred to as "contents viewing screen") via the network 100, and functions for supplying documents realizing a printout order screen based on requests from the user computers 110 or 111, receiving printout settings from the screen, creating a printout order, and making a printout commission to the printout service provider computer 130 based on the printout order. The contents provider computers 120 and 121 also have functions for supplying the printout service provider 130 with contents (hereafter may be referred to as "merchandise" or "actual contents") and the like, and functions for obtaining from the printout service provider computer 130 information relating to the printout service, making up the printout order screen. Note that though the number of contents provider computers connected in the present embodiment is two, with the present invention the number of contents provider computers connected is not restricted in any way as long as one or more contents provider computers are connected. Also, though in the present embodiment each contents provider operating entity is described as operating one contents provider computer for the sake of description of the invention, there are no restrictions whatsoever on this number; rather, the contents provider operating entities may operate two or more contents provider computers for the purpose of dispersing loads or handling different contents.

Reference numeral 130 denotes an information processing device which performs printing processing based on printout order commissions from the contents provider computers 120 and 121, and is referred to as a "printout service provider computer", or simply as a "printout service provider".

The printout service provider 130 has the functions of receiving printout orders based on requests from the contents provider computers 120 and 121, obtaining contents from the contents provider computers 120 and 121 or a later-described data center computer 140 according to the printout order and performing printing, and supplying information relating to the printout service to the contents provider computers 120 and 121.

Note that though in the present embodiment each printout service provider operating entity is described as operating one printout service provider computer for the sake of description of the invention, there are no restrictions whatsoever on this number; rather, the printout service provider operating entities may operate two or more printout service provider computers for the purpose of dispersing loads or the like.

Reference numeral 140 denotes an information processing device holding actual contents described in a document containing contents catalog pages to be disclosed by the contents provider computers 120 or 121, and will be referred to as a "data center computer" or "data center".

The data center computer 140 has the functions for, in the event that the user views a contents viewing screen, which is a contents catalog at the contents provider computer 120 or 121 and executes a printout order to the printout service provider computer 130 for the actual contents in the viewing screen, transmitting, data necessary for the printout or printout order such as the actual contents requested by the printout service provider computer 130, and functions for transmitting data necessary for printout and printout orders, such as contents printout information, to the contents provider computers 120 or 121.

Note that though in the present embodiment each data center operating entity is described as operating one data center computer for the sake of description of the invention, there are no restrictions whatsoever on this number; rather, the data center operating entities may operate two or more data center computers for the purpose of dispersing loads or the like. Also, the present invention does not restrict the number of data centers connected in any way.

Reference numeral 100 denotes a connecting device for connecting the user computers 110 and 111, the contents provider computers 120 and 121, the printout service provider computer 130, and the data center computer 140, the connecting device representing a network system such as the Internet or a Local Area Network (LAN), hereafter described simply as "network". Also, with the present embodiment, the Internet which is commonly used is employed as the network 100, but the present invention can be realized using other network systems, as well.

Also, with the present embodiment, description will be made under the assumption that actual contents to be printed out exist in the contents provider computer 120. As for the contents provider computer 121, a contents catalog screen is held therein, and the contents printout information which is actual contents and accompanying information to the contents as described later, and the information necessary for printouts and printout orders, are stored in the data center 140.

Also, printout orders from the contents viewing screen of the contents provider 121 will be described later in the fourth embodiment.

<Block Diagram of User Computer, Contents Provider Computer, and Data Center>

As already described with reference to the first and second embodiments, FIG. 2 is a block diagram illustrating the hardware configuration of the information processing devices listed in the present embodiment. Incidentally, with the present embodiment, there is no difference between the user computers 110 and 111, contents provider computers 120 and 121, and the data center 140, regarding internal configuration, and there is no difference with those described with reference to the first and second embodiments, so description thereof will be omitted.

<Block Diagram of Printout Service Provider Computer>

FIG. 3 is a block diagram illustrating the hardware configuration of the printout service provider computer 130 according to the third embodiment. There is no difference with the printout service provider computer 130 described with reference to the first and second embodiments, so description thereof will be omitted.

<Configuration of User Computer>

FIG. 4 is an explanatory diagram representing the software configuration of the user computer 110 which is the information processing device which the user actually uses. The user computer 111 is also of the same configuration. Further, there is no difference in FIG. 4 as described with reference to the first and second embodiments, so description thereof will be omitted.

<Configuration of Contents Provider Computer and Data Center Computer>

Figure 15:
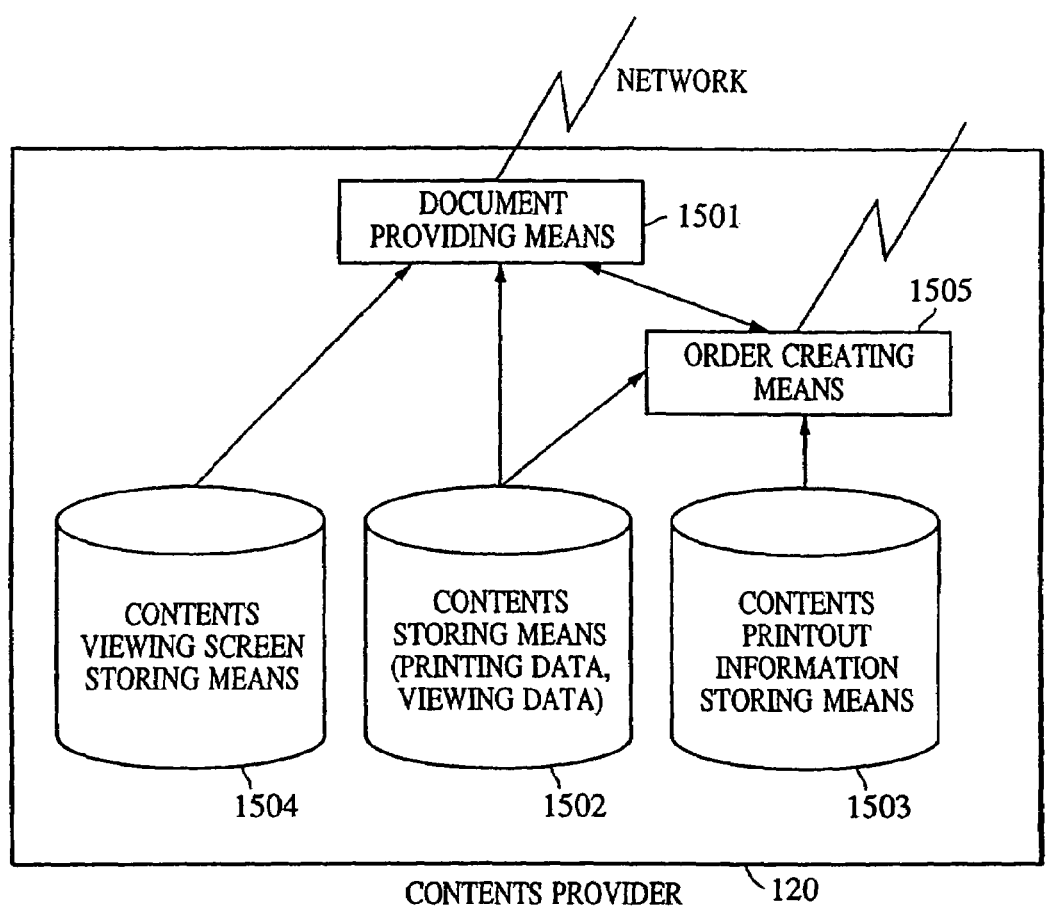
FIG. 15 is a diagram illustrating the software configuration of the contents provider computer and data center according to the third and fourth embodiments.

FIG. 15 is a configuration diagram illustrating the processing means and management data within the contents provider computer 120. The contents provider computer 121 and data center 140 are of approximately the same configuration, and accordingly, description thereof will be made from FIG. 15 as well.

In FIG. 15, reference numerals 1501 and 1505 denote application programs, which are read in from the ROM 203, HDD 209, or FDD 210, rendered at the RAM 202, and thus used.

Reference numerals 1502, 1503, and 1504 denote data stored within the HDD 209.

The document providing means 1501 is an application program enabling searching HTML documents, text, images, etc., from the data stored in the HDD 209 as described later, upon requests therefor from an external computer such as the user computers 110 and 111 or the printout service provider computer 130 via a network such as the Internet, and transmitting the file that has been found. The document providing means 1501 is generally called an Internet server program or WWW server program, and is an application program which enables, in addition to the above transmitting of documents, applications programs stored within the HDD 209 to be rendered at the RAM 202 and used upon request from external computers, and performing user ID certification of users making external requests and restricting data to be transmitted, as necessary.

Reference numeral 1502 denotes contents storing means for storing actual contents such as images and documents to be printed at the printout service provider 130, and viewing data to be displayed on the computer of the user as a preview of the contents. The viewing data is, in the case of an image for example, an image wherein the resolution has been reduced to the extent that screen display can be made. In the case of a document, a summarized text or an image whereby the first page can be displayed, is used. The present invention does not particularly restrict viewing data.

The data in the present means is stored in the HDD 209, with the document providing means 1501 performing searches upon requests from external computers such as the user computers 110 and 111 or the printout service provider computer 130, and transmitting the data thereto.

Reference numeral 1503 denotes contents printout information storing means for storing contents printout information describing, for example, various restrictions regarding contents such as printing size and number of copies to be printed, various restrictions regarding printout conditions such as sheet size for printing out and printing quality, and other information necessary for printout ordering and printing processing, at the time of printing out the actual contents stored in the contents storing means 1502.

The data in the present means is stored in the HDD 209, with a later-described order creating means 1505 performing searches and making reference in the means.

Reference numeral 1504 denotes contents viewing screen storing means for storing HTML documents for displaying screens (contents viewing screens) for the users to view contents viewing data stored in the contents storing means 1502 on the user computers 110 and 111, and perform printout commissioning.

The data in the present means is stored in the HDD 209, with the document providing means 1501 performing searches of the means upon requests from external computers such as the user computers 110 and 111 and so forth, and transmitting the data thereto.

The order creating means 1505 is an application program group for performing reception of contents printout orders issued from the user computers 110 and 111 at the contents provider computers 120 and 121.

The functions of the order creating means 1505 can be generally divided into four stages.

As the first stage, the order creating means 1505 is activated by a printout order request issued by the user computers 110 or 111, determines the contents regarding which a printout request has been made, obtains contents printout information of the contents necessary for reception of the order, from the contents printout information storing means 1503 or the data center computer 140, and further obtains later-described printout service information from the printout service provider computer 130, thereby generating an HTML document for displaying a printout conditions specifying screen whereby settings for printing out are made, which is transmitted to the user computers 110 or 111 issuing the printout order request.

The second stage is a function for being activated by printout conditions settings requests issued along with the various printout conditions settings, according to the printout conditions screen displayed on the user computer 110 or 111 which is the transmission destination of the HTML document, generating printout orders, and transmitting an HTML document to the user computer for displaying a printout confirmation screen.

The third stage is a function for generating printout order information by receiving a printout order completion notification issued from the user computers 110 or 111 by performing confirmation operation with the printout confirmation screen, and commissioning the printout service provider computer 130 with a printout order.

The fourth stage is a function for being activated by the printout service provider computer 130, and transmitting an HTML document to the user computer 110 for displaying an order reception completion screen with the information transmitted from the printout service provider computer 130, such as the order code for example, for making notification to the user, and reception notification of the printout order commission which was commissioned in the third stage.

As described above, the order creating means 1505 is an application program which is rendered to the RAM 202 from within the HDD 209 or the like by the document providing means 1501 based on requests from external computers and thus used, and is generally called a CGI program.

The above has been a description of the configuration of the contents provider computer 120. Note that with the contents provider computer 121 according to the present embodiment, contents printout information and actual contents are handled as existing on the data center computer 140, and accordingly, the contents storing means 1502 and the contents printout information storing means 1503 are not indispensable components. In this case, the contents provider computer 121 stores data describing the location of contents printout information stored in the contents printout information storing means 1503 within the data center 140 (i.e., contents printout information location data). The contents printout information location data may exist in arbitrary storing means, such as the contents viewing image storing means 1504 of the contents provider computer 121. With the present embodiment and the later-described fourth embodiment, the contents printout information storing means 1503 is handled as existing in the contents provider computer 121, and the contents printout information location data in the contents printout information storing means 1503.

Further, with the present embodiment and the later-described fourth embodiment, in the contents provider computer 121, the contents viewing data may be the contents viewing screen storing means 1504.

With regard to the data center computer 140, the document providing means 1501 does not necessarily have to be a so-called WWW server; a File Transfer Protocol (FTP) server or the like may be used so long as the computer is capable of transmitting files to the printout service provider computer 130. Further, the contents viewing screen storing means 1504 within the data center computer 140 is not necessary for realizing the present invention, either.

<Configuration of Printout Service Provider Computer>

Figure 16:
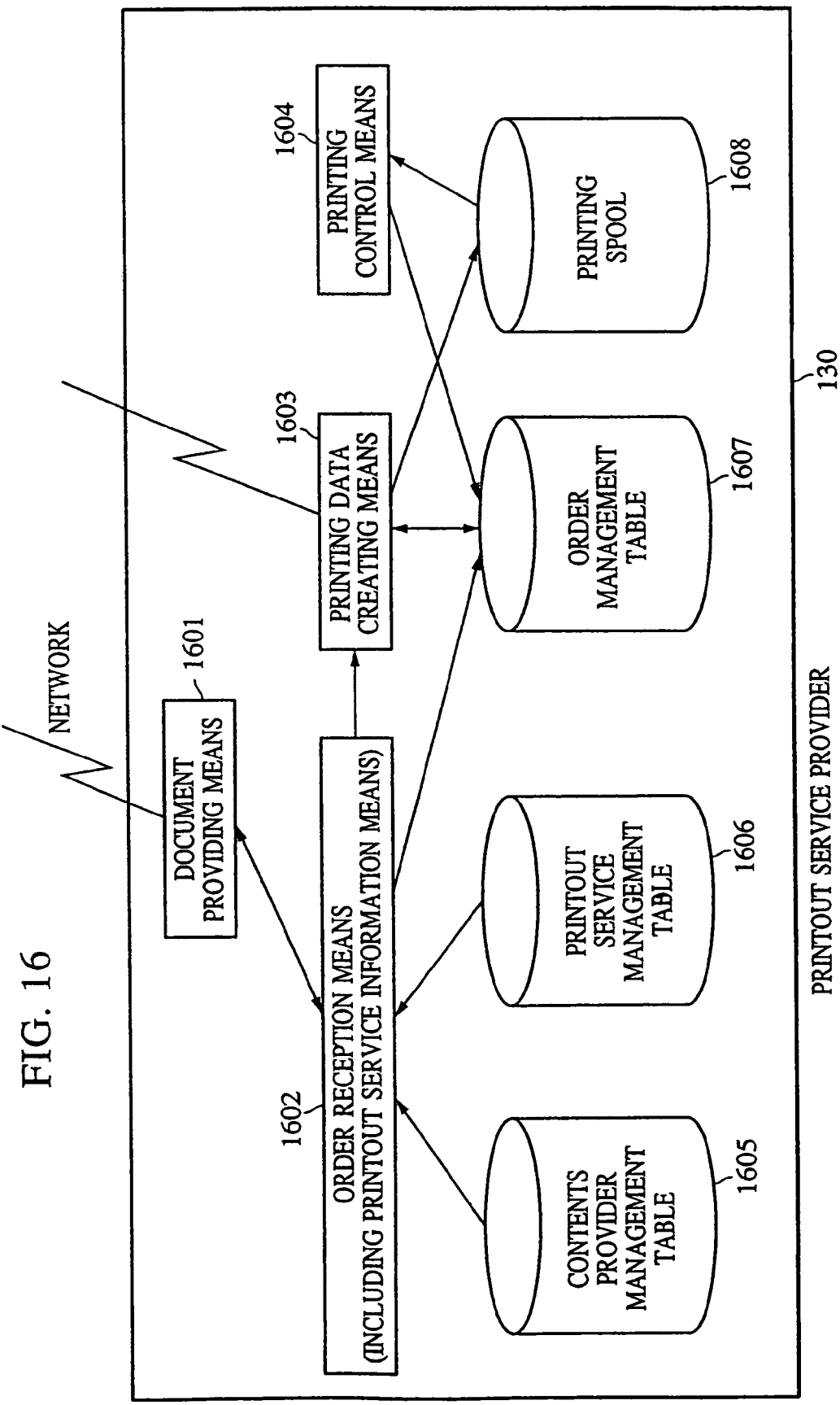
FIG. 16 is a diagram illustrating the software configuration of the printout service provider computer according to the first and second embodiments.

FIG. 16 is a configuration diagram illustrating the processing means and management data within the printout service provider computer 130. In FIG. 16, the processing means 1601, 1602, 1603, and 1604 are application programs, read in from the ROM 203, HDD 209, or FDD 210, rendered at the RAM 202, and thus used. Reference numerals 1605, 1606, 1607, and 1608 denote data stored within the HDD 209.

The document providing means 1601 is equal to the document providing means 1501, and is an application program enabling searching HTML documents, text, images, etc., from the data stored in the HDD 209 as described later, upon requests therefor from the external computers such as the user computers 110 and 111 or contents provider computers 120 and 121 via a network such as the Internet, and transmitting the file that has been found. The document providing means 1501 is generally called an Internet server program or WWW server program, and is an application program which enables, in addition to transmission of documents, applications programs stored within the HDD 209 to be rendered at the RAM 202 and used upon request from external computers, the processing results to be transmitted, and performing user ID certification of users making external requests and restricting data to be transmitted, as necessary.

The order reception means 1602 is an application program group for performing reception of printout orders, activated by printout order commissions from the contents provider computer 120 and 121. The functions of the order reception means 1602 can be generally divided into two stages.

As the first stage, the order reception means 1602 transmits printout service information stored in a later-described printout service management table 1606 in response to printout service information obtaining requests issued from the contents provider computers 120 or 121.

As the second stage, the order reception means 1602 is activated by the printout order requests issued from the contents provider computers 120 or 121, generates printout orders by the printout service information transmitted with the printout order commission, generates order information in a later-described printout order management table 1607, and activates the later-described printing data creating means 1603 for performing the printing preparation work.

As described above, the order reception means 1602 is an application program which is rendered to the RAM 202 from within the HDD 209 or the like by the document providing means 1601 based on requests from external computers, and is generally called a CGI program.

The printing data creating means 1603 is an application program which is rendered to the RAM 202 from the HDD 209 or the like by the order reception means 1602, and thus used.

After being activated by the order reception means 1602, the printing data creating means 1603 extracts records for creating printing data from the order management table 1607, obtains the actual contents to be printed out from the contents provider computer 120 or the data center computer 140 following the record, creates other data necessary for printing, and saves this to a later-described printing spool 1608.

Reference numeral 1604 denotes printing control means for controlling the printing processing of printing data within the printing spool 1608, following the order management table 1607. The printing control means 1604 is an application program which is rendered to the RAM 202 from within the HDD 209 or the like, and thus used. Activation of the printing control means 1604 occurs at the time of activation of the printing data creating means 1603, or at an arbitrary timing set by the operator of the printout service provider computer 130 or automatically at set intervals by a timer.

The contents provider management table 1605 has the data structure described later with reference to FIG. 18, and stores the contents provider code which identifies the contents provider, the address of the contents provider computer or data center, and so forth.

The printout service management table 1606 is a table storing all printout service settings provided by the printout service provider computer 130, and stores type of printer, printing conditions (sheet size, number of copies, paper quality, print quality, position, enlargement/reduction, two-side printing, binding direction and other layout information, post-printing work such as binding, laminating, covering, etc.), information regarding printing prices, and so forth.

Note that the printers registered in the printout service management table 1606 must be printers capable of performing printing processing according to printout orders received by the printout service provider computer 130. With regard to the connection of the printers, it is needless to say that printers connected to the PTRC 301 of the printout service provider computer 130 may be used, and further printers directly connected to the network 100, and printers connected to computers other than the printout service provider computer 130 which are connected to the network 100, may be used as well.

The order management table 1607 has the data structure described with reference to FIG. 9 as described with the first embodiment, stores the printout order and accompanying information, and the state of progress of the order. The printing spool 1608 stores actual contents for realizing the printing of the printout order and other data necessary for printing.

<Contents Printout Information>

Next, a description will be given regarding the contents printout information stored in the contents printout information storing means 1503 of the contents provider computer 120 and data center computer 140.

As described earlier, contents printout information is data describing information necessary for printout ordering and printing processing at the time of printing the contents which the contents provider has. Though the present invention does not particularly specify a particular data format or description format for the data, contents stored in the contents storing means 1502 that can be printed by the present invention must have contents printout information corresponding to the contents. Also, the present invention does not particularly stipulate the transfer method of contents printout information to the printout service provider. In order to describe the present invention in an even clearer manner, the present embodiment will be described as having one text file describing contents printout information corresponding to each of the printable contents, and the files are stored in the contents printout information storing means 1503.

Also, in the event that actual contents exist in the data center 140, the contents printout information will also be understood to exist within the data center 140. The contents printout information storing means 1503 within the contents provider computer 121 in this case has one text file for each set of contents, the text file describing the location of the contents printout information storing means 1503 in the data center 140, thereby indicating the location of the actual contents printout information. Further, in the event that the actual contents exist within the data center 140, the present invention can also be carried out by having the actual contents printout information in the contents provider computer 121.

As described in the first embodiment, information described in the contents printout information comprises the following, and possibly others, described as information relating to contents, as necessary:

① A contents code uniquely specifying contents within at least the range of the contents provider;
② Contents type, such as document, image, etc.;
③ The location of the actual contents;
④ The location of the viewing data;
⑤ Price information;
⑥ Overlay information, which is information to be overlaid at the time of printing the contents, e.g., copyright display, serial No., etc.; and
⑦ Overlay position information representing the overlay position of the overlay information.

The following, and possibly others, are described as restriction information relating to printing out of the contents, as necessary:

① Size restriction information restricting the minimum and maximum size of the contents at the time of printing;
② Sheet size restriction information restricting the size of the printing sheet;
③ Sheet quality restricting information restricting the quality of the printing sheet;
④ Restriction information for the number of copies, restricting the maximum number of copies which can be printed; and
⑤ Printer restriction information restricting the type of printer to print out the contents.

The following, and possibly others, are described as other contents printout information, as necessary:

① Default specified for printout settings;
② Settlement information for contents;
③ Settlement information for material printed out;
④ Identification information of users; and
⑤ Identification information of printout ordering managed by the contents provider.

FIG. 7 is a diagram illustrating an example of contents printout information according to the present embodiment, stored in the contents provider computer 120 and contents printout information storing means 1503 in the data center 140, as with the first and second embodiments. Detailed description will be omitted in the present embodiment.

Of course, with the present embodiment as well, information in the printout information space 702 is not the only information which might be omitted; information in the contents information space 701 and miscellaneous information space 703 can also be omitted as long as this does not interfere with printout ordering and printing out.

<Contents Printout Information Position Data>

FIG. 17 is a schematic diagram of the contents printout information position data in the contents provider computer 121 used with the present embodiment and the later-described fourth embodiment.

In FIG. 17, reference numeral 1700 denotes contents printout information location data in the contents provider computer 121, and with the present embodiment, is supplied as a text data file. The contents printout information location data 1700 starts with an index item between the parentheses [ ] as shown in the figure, and is listed in "settings name=settings value" fashion following the index item.

The first index item "[DATACENTER]" indicates that the actual contents and the contents printout information does not exist on this computer, but rather exists on an external computer such as the data center 140. There are two settings shown in FIG. 17.

"CONTENTSCODE=DEF00001" indicates that the object of the contents printout information location data 1700 is the contents specified by the contents code "DEF0001".

"ADDRESS=http://www.hanbai_Stock/printinfo/DEF0001.inf" indicates the location of the actual contents printout information. This is listed using a URL with the present embodiment.

In the event of receiving a printout order for contents represented by the contents code "DEF0001" with the contents provider computer 121, first, reference is made to the contents printout information location data within the contents printout information storing means 1503 in the computer, described with reference to FIG. 17, and the actual contents printout information is obtained from the data center 140 with the location in the contents printout information.

<Contents Provider Management Table>

Next, description will be made regarding a contents provider management table 1605 which the printout service provider computer 130 has.

The contents provider management table 1605 stores and manages contents provider code uniquely defining contents providers, and the position where the contents provider computers 120 and 121 exist. This table is stored in the HDD 209. Using a database system or the like can realize a suitable configuration.

The contents provider management table 1605 is searched at the time of the order reception means 1602 performing order reception processing, and reception processing of printout orders for contents existing in external computers is realized by making reference to the search results.

FIG. 18 is a schematic diagram of a contents provider management table according to the present embodiment and the later-described fourth embodiment.

The contents provider management table 1605 manages two items, denoted by reference numerals 1801 and 1802 as a single record (hereafter referred to as "contents provider management record"). Reference numeral 1801 denotes a contents provider code issued beforehand for each contents provider, and stored, for identifying contents providers. Reference numeral 1802 denotes a base address representing the location of the contents provider computers 120 and 121 on the network. With the present embodiment as well, the base address 1802 describes the locations URLs.

Thus, the contents provider code is determined by the parameters provided at the time of activating the order reception means 1602, the URL of the transmission originator is obtained, and comparison is made with the base address 1802, so it can be determined that the order is from a contents provider computer 120 or 121.

<Order Management Table>

The schematic diagram of the order management table 1607 is the same as FIG. 9 described with reference to the first and second embodiments, so description thereof will be omitted here.

With the present embodiment, records are generated by printout order information transmitted together with printout order commission issued from the contents provider computers 120 and 121.

<Printout Order Information>

Printout order information is generated by the order creating means 1505 within the contents provider computers 120 or 121, and is transmitted to the printout service provider computer 130. The transmitted printout order information is analyzed by the order reception means 1602 within the printout service provider computer 130, and a new record is created in the order management table 1607 based on the analysis results, thereby establishing the printout order, and printing data is created by the printing data creating means based on this record.

Figure 19:
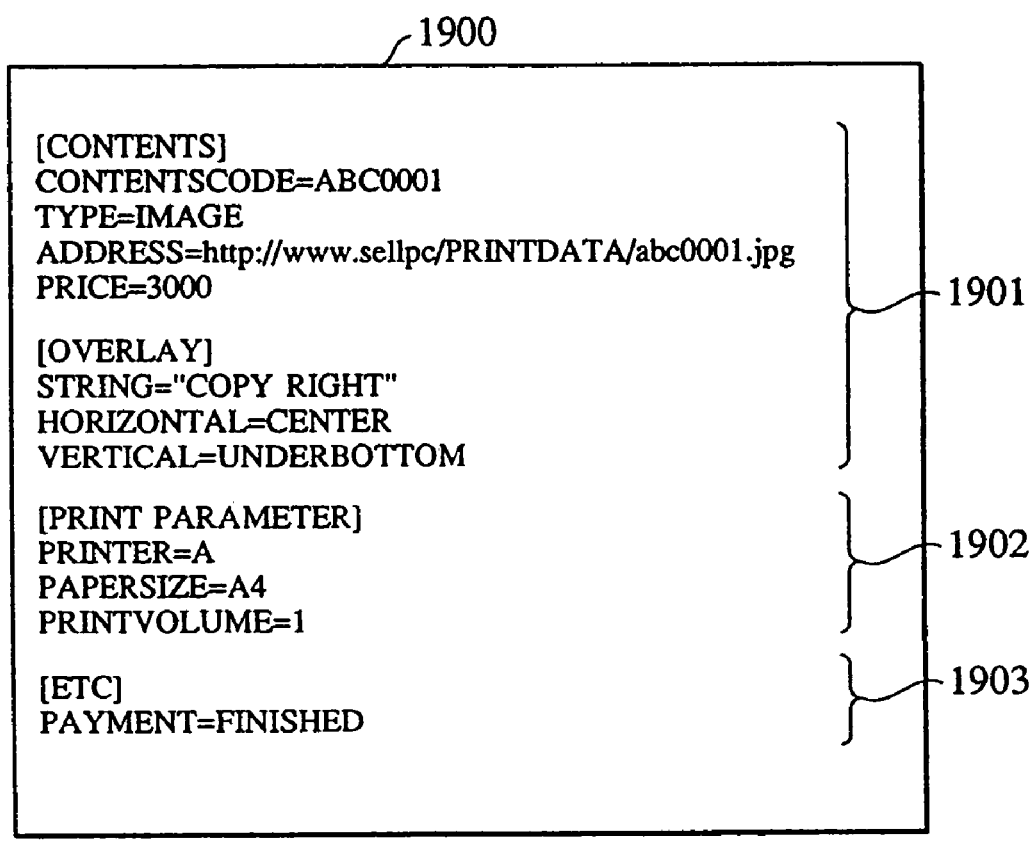
FIG. 19 is a schematic diagram of a printout order information table according to the third and fourth embodiments.

FIG. 19 is a schematic diagram illustrating printout order information according to the present embodiment.

In FIG. 19, reference numeral 1900 denotes printout order information, and with the present embodiment, this is supplied as a text data file. As with the contents printout information, the printout order information 1900 starts with an index item between the parentheses [ ] as shown in the figure, and is listed in "settings name=settings value" fashion following the index item.

Reference numeral 1901 denotes a contents information space listing information relating to the contents. There are two index items with the present embodiment indicating the contents information space 1901. The first index item "[CONTENTS]" lists contents code and the like, and the second index item "[OVERLAY]" lists overlay text strings which are printed along with the contents by overlaying at the time of printing contents, and the positions thereof. In FIG. 19, there are four settings under the first index item. The same items as with the contents information space 701 can be set for the contents information space, and the order creating means 1505 in the contents provider computer 120 generates this space based on contents printout information.

"CONTENTSCODE=ABC0001" indicates that the object of the contents printout information 1900 is the contents specified by the contents code "ABC0001"

"TYPE=IMAGE" indicates the type of contents, such as image or document, and in this case indicates that "ABC0001" is an image.

"ADDRESS=http://www.sellpc/PRINTDATA/abc0001.jpg" indicates that the location of the file "abc0001.jpg" which is the actual contents is "http://www.sellpc/PRINTDATA/abc0001.jpg".

The last settings item belonging to the index item "[CONTENTS]", which is "PRICE=3000", means that the price of the contents is 3,000 Yen. Note that though the present embodiment omits currency units, currency units may be included to handle cases wherein multiple currencies exist.

The other index item "[OVERLAY]" of the contents information space 1901 lists the added data to be printed out along with the contents at the time of making the contents printout, and the position thereof.

"STRING="COPYRIGHT"" indicates added data. The text string in the quotes "" for the setting value is the text string that will be printed out along with the contents.

"HORIZONTAL=CENTER",
"VERTICAL=UNDERBOTTOM" define the position for the added data, and in the case in FIG. 19 means that the horizontal position is at the center and the vertical position is at the bottommost position.

Reference numeral 1902 denotes a printout information settings space listing printout conditions set based on the printout service information transmitted to the contents provider computer 120 from the printout service provider computer 130.

The printout information space 1902 according to the present embodiment is indicated by "[PRINT PARAMETER]".

In FIG. 19, there are the following three setting items in "[PRINT PARAMETER]". Though items other than these three shown in FIG. 19 can be set for the printout information settings space 1902 with the present embodiment, such as printing on both sides, printing quality, etc., information regarding which settings have been omitted is handled as having no restrictions or default values set to the printout service provider computer 130 beforehand are applied.

"PRINTER=A" indicates that printer "A" is to perform the printout.

"PAPERSIZE=A4" indicates that the sheet size used for printing is to be A4.

"PRINTVOLUME=1" indicates that the number of printouts to be made order is 1.

Reference numeral 1903 denotes a miscellaneous information space for other contents printout information according to the present embodiment that does not belong to either contents-related information or contents printout-related restriction information. With the present embodiment, the miscellaneous information space 1903 is indicated by the index item "[ETC]".

In FIG. 19, "PAYMENT=FINISHED" means that the bill for the contents has already been settled.

The above has been a description of the contents printout information according to the present embodiment, with reference to FIG. 19. Of course, information in the printout information settings space 1902 is not the only information which might be omitted; information in the contents information space 1901 and miscellaneous information space 1903 can also be omitted as long as this does not interfere with printout ordering and printing out.

<Flow of the Present System>

Next, the flow of processing with the present embodiment will be described with reference to FIG. 20.

Figure 20:
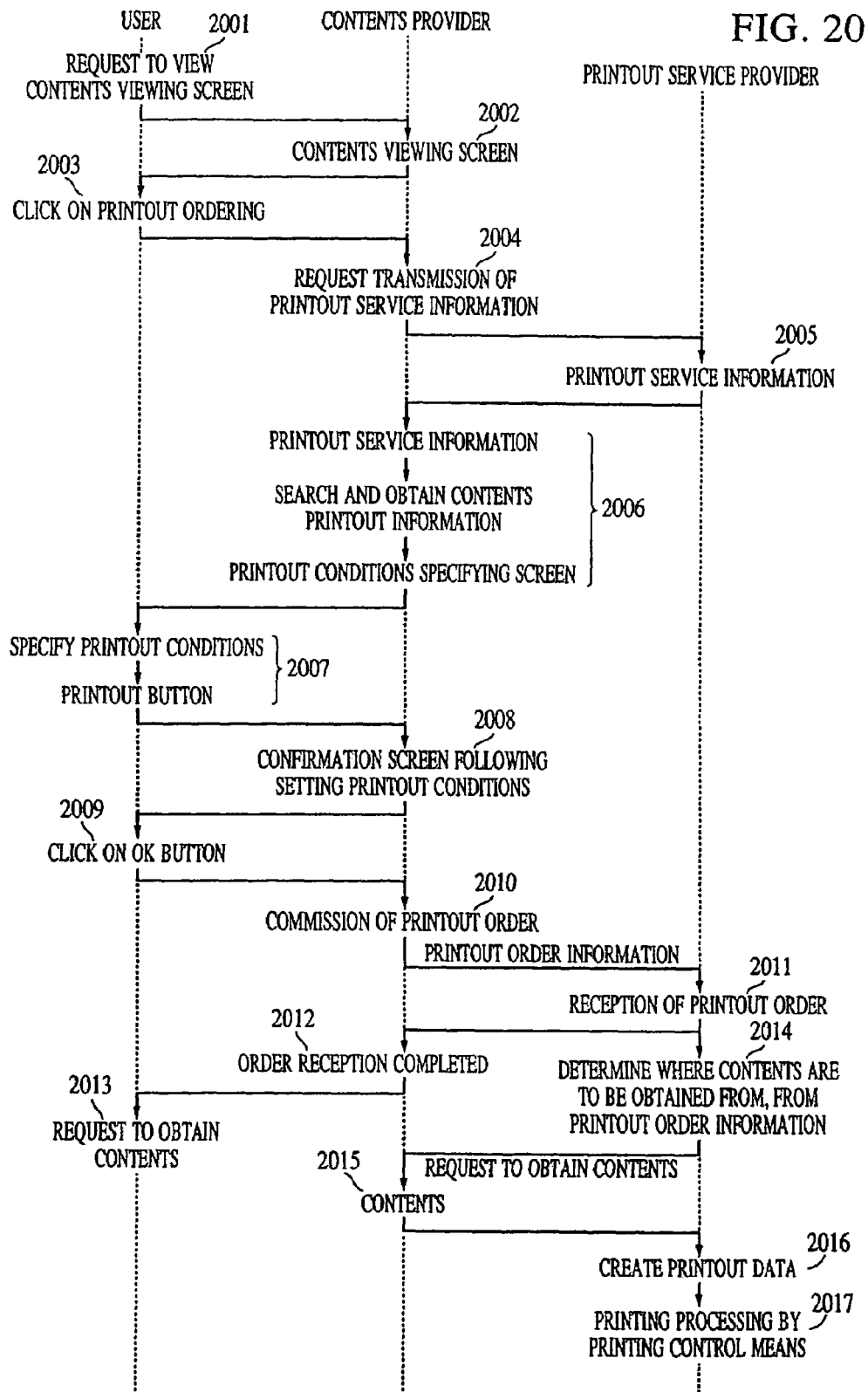
FIG. 20 is a flowchart of the processing occurring between the user computer, contents provider computer, and printout service provider, according to the third embodiment.

FIG. 20 is a processing flowchart for describing the flow occurring between the user computer 110, contents provider computer 120, and the printout service provider computer 130. In the following description, the user uses the user computer 110 to view the contents viewing screen within the contents provider computer 120, makes printout orders to the contents provider computer 120, and commissions the printout orders from the contents provider computer 120 to the printout service provider 130.

First, the user uses the document viewing means 401 in the user computer 110 to make a contents viewing screen display request to the contents provider computer 120. The contents viewing screen display request specifies the URL of a contents viewing screen that the user desires to view, based on HTTP protocol. The URL is specified by the user using the KB 208 to directly make input to the document viewing means 401, or using some other means to this end such as selecting a link on the screen which is displayed by the document viewing means 401 based on the HTML document. This processing is denoted by reference numeral 2001 in the figure.

The contents viewing screen display request issued by the user computer 110 is received over the network 100 by the document providing means 1501 in the contents provider computer 120 via the NETIF 204. Upon receiving the contents viewing screen display request, the document providing means 1501 transmits to the requesting user computer 110 an HTML document stored in the contents viewing screen storing means 1504 corresponding to the specified URL, as well as viewing data stored in the contents storing means 1502 which is linked to in the HTML document. This processing is denoted by reference numeral 2002 in the figure.

The document viewing means 401 within the user computer 110, upon receiving the HTML document and the viewing data, performs display of the contents viewing screen based on the HTML document.

Now, a description will be given of the contents viewing screen, with reference to FIGS. 21A and 21B.

Figure 21A:
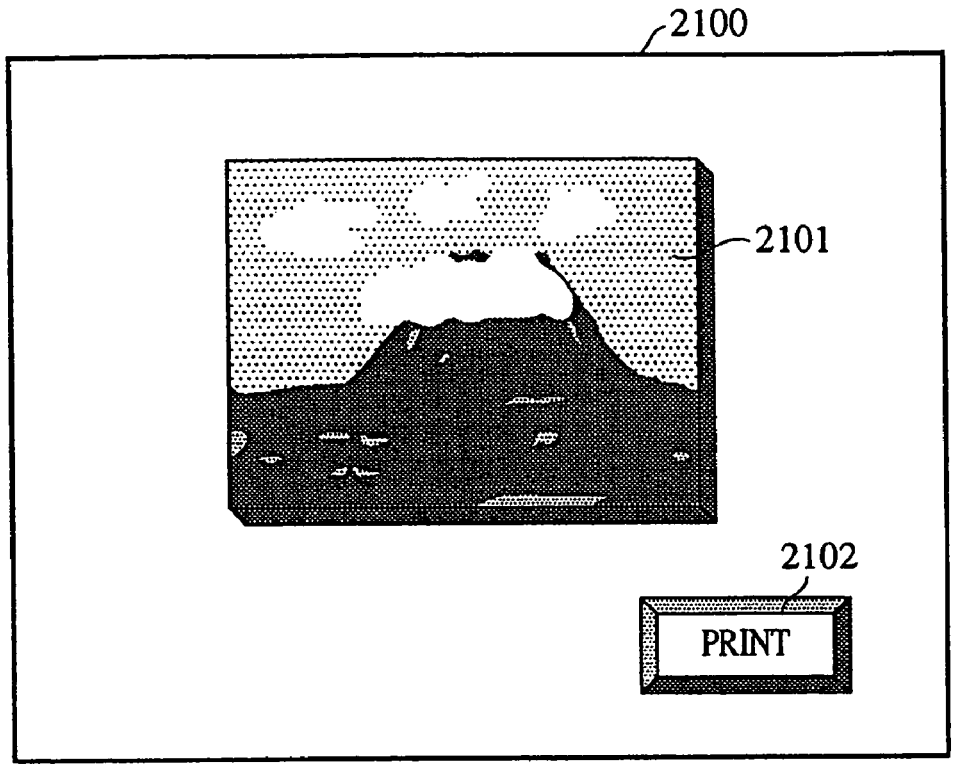
FIG. 21A is an example of a contents viewing screen according to the third embodiment.
Figure 21B:
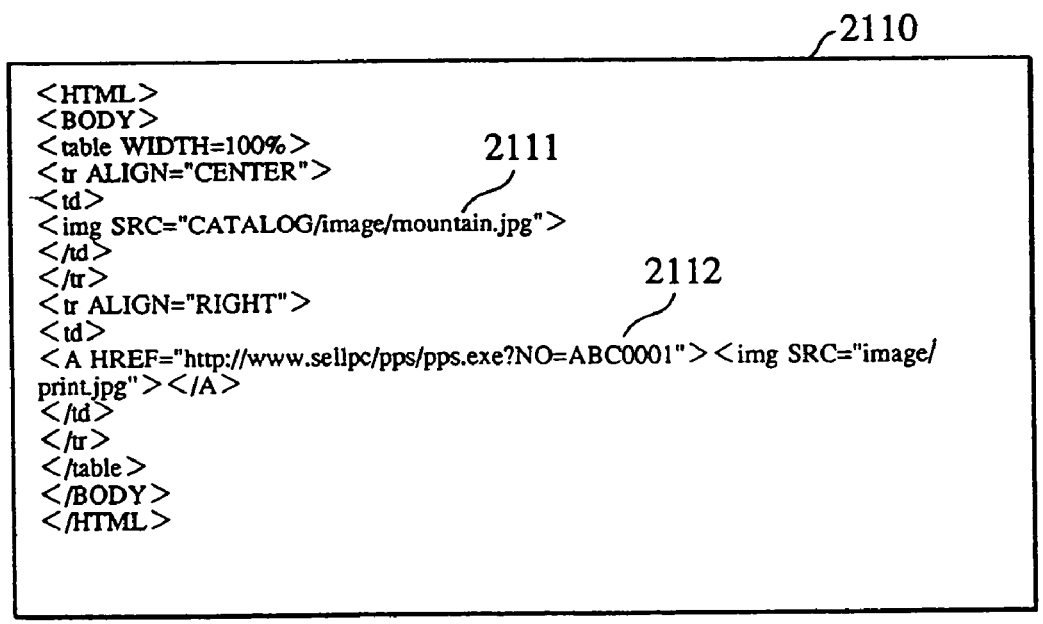
FIG. 21B is an example of an HTML document described so as to display the viewing screen, transmitted from the contents provider computer.

FIG. 21A is an example of a contents viewing screen, and FIG. 21B is an example of an HTML document described so as to display this contents viewing screen, transmitted from the contents provider computer 120.

In FIG. 21A, reference numeral 2100 denotes a contents viewing screen to be displayed on the user computer 110 in the preset embodiment. Reference numeral 2101 denotes a viewing screen using the contents viewing data displayed on the screen, with the contents viewing data being transmitted from the contents storing means 1502 within the contents provider computer 120, and the document viewing device 401 performing display on the main screen. Reference numeral 2102 denotes a printout commissioning button for commissioning a printout of the contents displayed on this screen to the printout service provider computer 130.

In FIG. 21B, reference numeral 2110 denotes an HTML document describing the display form of the contents viewing screen 2100, links, etc., and reference numeral 2111 denotes a viewing display instruction statement described so as to display images, which has described therein the location of the viewing data according to the present embodiment and the image file name.

Reference numeral 2112 denotes a print button display instruction statement describing displaying of the print button and action instructions given to the document viewing means 401 in the event that an action instruction such as clicking the print button has been performed. The description "http://www.sellpc/pps/pps.exe" in the print button display/action instruction statement is the activation instruction part for the CGI program which is the order creating means 1505, instructing the printout service provider computer 130, and "NO=ABC001" is the first parameter for activating the order creating means 1505. Multiple parameters can be specified using "&", but the present embodiment only uses the first parameter. The first parameter of the present embodiment is configured of the contents code stored in the contents printout information 700.

Returning to FIG. 20, in the state that the contents viewing screen 2100 is displayed, in the event that the user desires a printout of the actual contents of the viewing screen 2101 displayed on the screen, the user makes instructions to the printout commissioning button on the screen from the KB 208. In response to the instructions to the printout commissioning button 2102, the document viewing means 401 transmits an activation request for the order creating means 1505 to the contents provider computer 120 as described in the print button display/action instruction statement 2112. This processing is denoted by reference numeral 2003 in the figure.

The document providing means 1501 within the contents provider computer 120 activates the order creating means 1505 in the event that the order creating means 1505 activating instructions and the parameters have been received, and hands the parameters to the order creating means 1505.

The order creating means 1505 temporarily stores the parameters in the work area of the HDD 209.

Next, the order creating means 1502 issues a printout service transmission request to the printout service provider computer 130, to transmit printout service information to the printout service provider computer 130. This processing is denoted by reference numeral 2004 in the figure.

The document providing device 1601 within the printout service provider computer 130 which has received the transmission request for the printout service information activates the order reception means 1602. The order reception means 1602 transmits the printout service information within the printout service management table 1606 to the contents provider computer 120. This processing is denoted by reference numeral 2005 in the figure.

The order creating means 1505, upon reception of the printout service information, stores the printout service information in the RAM 202 or the HDD 209. Next, the contents code is determined from the first parameter stored in the HDD in 2004, the contents printout information storing means 1503 is searched, and the contents printout information which is the search results is obtained and stored to the work area in the HDD 209.

Next, the printout information within the contents printout information 700 is obtained, setting items matching the restriction range listed in the information is obtained from the printout service information stored in the RAM 202 or the HDD 209, and described in an HTML document for making display of the printout conditions specifying screen which is the output of order information.

Next, viewing data is obtained with the viewing data address listed in the contents information space 701, and in the event that information relating to overlays exists therein, synthesizing is performed according to the information, and this is saved in the work area of the HDD 209 as a preview image for display on a later-described print conditions specifying screen, along with adding the saved location thereof in a predetermined position in the HTML document for displaying the printout conditions specifying screen. Then, the HTML document described so as to display the printout conditions specifying screen on the user computer 110 is transmitted to the user computer 110 via the document providing means 1501. This processing is denoted by reference numeral 2006 in the figure.

The document viewing means 401 in the user computer 110 displays the printout conditions specifying screen based on the received HTML document, as shown in FIG. 12 described with the first embodiment.

The user uses the printout conditions specifying screen which the document viewing means 401 in the user computer 110 displays to set the output destination printer, sheet size, and number of copies. Also, if necessary, the user uses the detailed settings link button to call up the detailed settings screen and makes detailed settings thereby, and then returns to the main screen to make printout conditions settings.

Once the user has confirmed the settings, clicking on the printout ordering button causes the document viewing means 401 to transmit an activation instruction to the order generating means 1505 within the contents provider computer 120 which is the link destination listed in the HTML document. The printout conditions specifications are transmitted together as parameters at the time of transmitting the activation instructions. This processing is denoted by reference numeral 2007 in the figure.

The document providing means 1501 within the contents provider computer 120 activates the order generating means 1505 again. The order generating means 1505 stores the printout conditions which are parameters to the work area of the HDD 209, and then transmits a confirmation screen HTML document, for displaying a confirmation screen whereby the user confirms the intent to execute the printout under the printout conditions which the user has set, to the user computer 110 via the document providing means 1501. This processing is denoted by reference numeral 2008 in the figure.

The document viewing means 401 within the user computer 110, upon receiving the confirmation screen HTML document, displays the confirmation screen, as shown in FIG. 13 described with the first embodiment.

Following making confirmation of the preview image and the printout conditions, the user clicks the button so as to confirm the printout order, thereby giving order confirming instructions to execute printing out, to the printout order generating means 1505. This processing is denoted by reference numeral 2009 in the figure.

Based on the order confirmation instructions, the document providing means 1501 within the contents provider computer 120 generates printout order information described with reference to FIG. 19 from the contents information space 701 within contents printout information 700 stored in the HDD 209 in 2006, the printout conditions stored in 2008, and so forth.

Next, an activation instruction is given to the order reception means 1602 so as to make a printout order request to the printout service provider computer 130. At the time of the activation instruction, the contents provider code, the generated printout order information, and the URL which is a return destination, are transmitted as parameters. The return destination is the CGI application activation instruction with the present embodiment. This processing is denoted by reference numeral 2010 in the figure.

The document providing means 1601 within the printout service provider computer 130 activates the order reception means 1602 by an activation instruction for the order reception means 1602. The order reception means 1602 first searches within the contents provider management table 1605 for a record having the contents provider code handed as a parameter, and obtains the base address 1802 of the record as the results of the search. Next, confirmation is made to the document providing means 1602 regarding the transmission originator of the activation instruction is the contents provider computer 120 for the inquiring transmission originator.

Next, the order reception means 1602 issues an order code, and creates a new record for the order management table 1607 with the order code 901, the contents provider code 902 receiving an order by the parameters, the contents address 903 obtained from the received printout order information, and the status 904 as "Ordering", as with the order management record example 914. Also, in the event that overlay information exists within the printout order information, this is given a file name searchable by order code or order management table 1607, and saved in the printing spool 1608.

Then, the order reception means 1602 makes an activation instruction to the printout order generating means 1505 within the contents provider computer 120 which is the return destination URL handed over as a parameter. At the time of the activation instruction, the order code is transmitted as a parameter.

The order reception means 1602 sets the "gathering image" for the status 904 within the order management record, activates the printing data creating means 1603, and finishes processing. This processing is denoted by reference numeral 2011 in the figure.

The document providing means 1501 of the contents provider computer 120 activates the printout order creating means 1505 with a printout order creating means 1505 activation instruction transmitted from the printout service provider computer 130 in 2011 above. The printout order generating means generates an HTML document containing the order code handed over as a parameter, and transmits this to the user computer 110. This processing is denoted by reference numeral 2012 in the figure.

The document viewing means 401 of the user computer 110 displays the order reception completion screen based on the HTML document received from the contents provider computer 120. The order reception completion screen displays order code and the like to the effect that the printout order has been received, a link for continuing viewing contents with the contents provider computer 120, and so forth. This processing is denoted by reference numeral 2013 in the figure.

On the other hand, at the printout service provider computer 130, the printing data creating means 1603 activated in the processing in 2011 receives the order code as a parameter at the time of activation, and accordingly searches the order management table 1607 by order code, and obtains the contents address 903 from the record found as the result of the search. Next, a request is made with the contents address to the contents provider computer 120 for obtaining contents. This processing is denoted by reference numeral 2014 in the figure.

Upon receiving the request for obtaining the actual contents from the printout service provider computer 130, the document providing device 1501 of the contents provider computer 120 obtains the contents regarding which a request for obtaining has been made from the contents storing means 1502, and transmits the contents to the printout service provider computer 130. This processing is denoted by reference numeral 2015 in the figure.

Upon receiving the contents, the printing data creating means 1603 of the printout service provider computer 130 stores to the printing spool 1608, in a manner identifiable by order code, the contents data, the various settings for the printout, and data necessary for printing, such as added information and so forth, based on the record in the order management table 1607. Then, the status 904 of this record in the order management table 1607 is set to "Standby", the printing control means 1604 is activated, and the processing ends. This processing is denoted by reference numeral 2016 in the figure.

The printing control means 1604 first searches for records wherein the status 904 in the order management table 1607 is set to "Standby", and obtains the order code string as the results of the search. Next, one order code is extracted from the order code string according to predetermined rules, data necessary for performing a printout corresponding to the code is obtained from the printing spool 1608, the printout data is transmitted to the printer which is the output destination, and accordingly the printout is made. This processing is denoted by reference numeral 2017 in the figure.

Once the printout is completed, the order management table 1607 is searched with the order code whereby the printout has been executed, and the status 904 is set to "Printing completed".

Thus, a printout of the actual contents within the contents provider computer 120 is realized by printout instructions from a contents viewing screen stored in the contents provider computer 120.

Fourth Embodiment

Next, as the fourth embodiment, a description will be made regarding the procedures for the user computer 111 described with reference to FIG. 1 to display a contents viewing screen stored in the contents provider computer 121, and issuing a printout order from this contents viewing screen. A major difference between the fourth embodiment and the third embodiment is that the actual contents and the contents printout information is not stored in the contents provider computer but in a data center 140, and is distributed to a printout service provider. The following is a description thereof with reference to FIG. 22 and other drawings.

<Processing Flow in the Fourth Embodiment>

Figure 22:
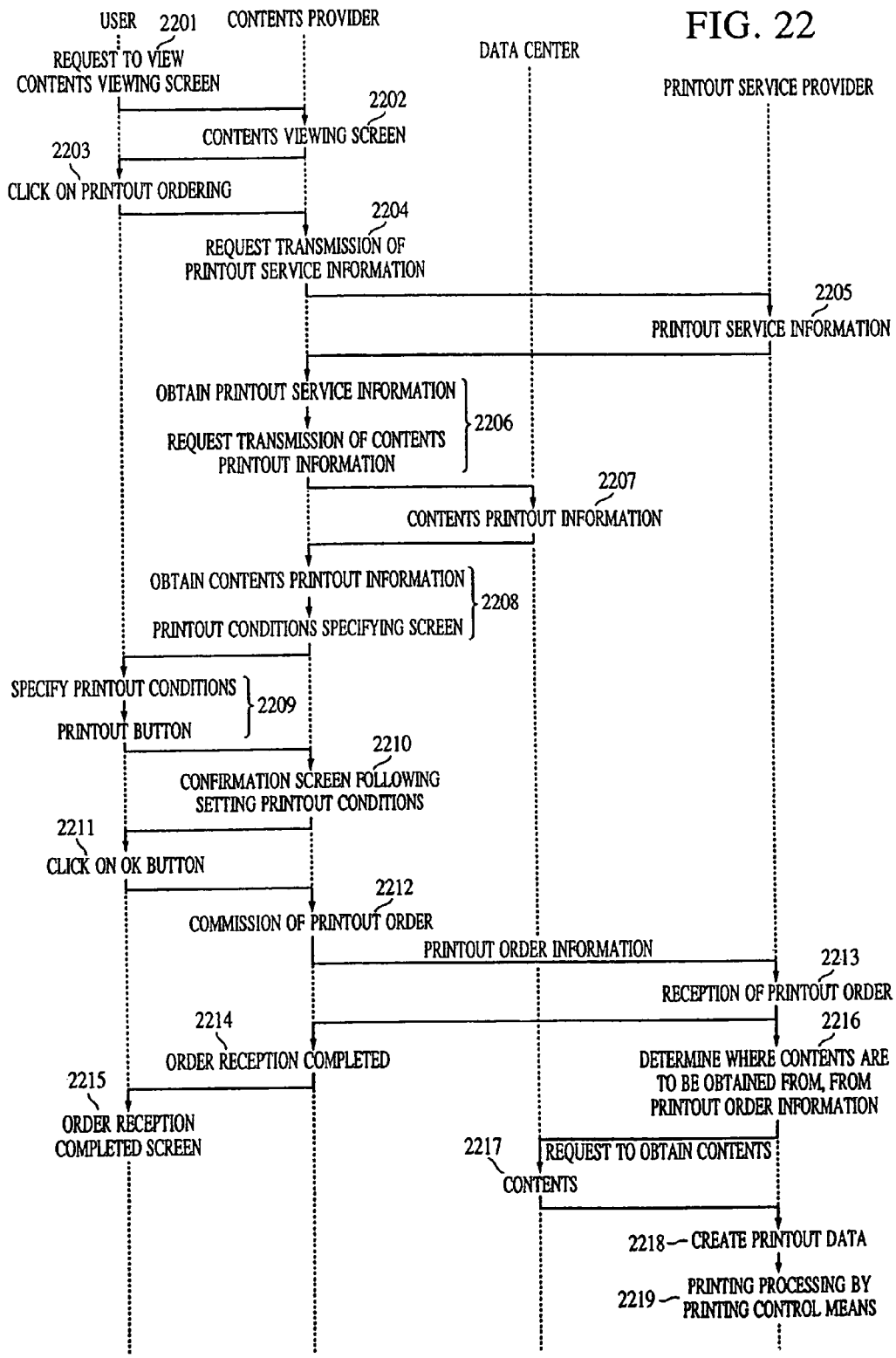
FIG. 22 is a flowchart of the processing occurring between the user computer, contents provider computer, data center, and printout service provider, according to the fourth embodiment.

FIG. 22 is a processing flowchart for describing the flow occurring between the user computer 111, the contents provider computer 121, the data center 140, and the printout service provider 130, according to the present embodiment. In the following description, the user uses the user computer 111 to view the contents viewing screen within the contents provider 121, and makes printout orders to the contents provider computer 121.

First, the user uses the document viewing means 401 in the user computer 111 to make a contents viewing screen display request to the contents provider computer 121. The contents viewing screen display request specifies the URL of a contents viewing screen that the user desires to view, based on HTTP protocol. The URL is specified by the user using the KB 208 to directly make input to the document viewing means 401, or using some other means to this end such as selecting a link on the screen which is displayed by the document viewing means 401 based on the HTML document. This processing is denoted by reference numeral 2201 in the figure.

The contents viewing screen display request issued by the user computer 111 is received over the network 100 by the document providing means 1501 in the contents provider computer 121 via the NETIF 204. Upon receiving the contents viewing screen display request, the document providing means 1501 transmits to the requesting user computer 111 an HTML document stored in the contents viewing screen storing means 1504 corresponding to the specified URL, as well as viewing data which is linked to in the HTML document. This processing is denoted by reference numeral 2202 in the figure.

In the state that the contents viewing screen is displayed, in the event that the user desires a printout of the actual contents of the viewing image displayed on the screen, the user clicks the printout commissioning button on the screen. In response to clicking the printout commissioning button, the document viewing means 401 transmits an activation request for the order reception means to the contents provider computer 121 as described in the print button display/action instruction statement. This processing is denoted by reference numeral 2203 in the figure.

The document providing means 1501 within the contents provider computer 121 activates the order creating means 1505 in the event that the order creating means 1505 activating instructions and parameters have been received, and hands the parameters to the order creating means 1505. The order creating means 1505 temporarily stores the parameters in the work area of the HDD 209. Next, the order creating means 1505 issues a printout service information transmission request to the printout service provider computer 130, to transmit printout service information to the printout service provider computer 130. This processing is denoted by reference numeral 2204 in the figure.

The document providing device 1601 within the printout service provider computer 130, upon receiving the printout service information transmission request, activates the order reception means 1602. The order reception means 1602 transmits the printout service information within the printout service management table 1606 to the contents provider computer 121. This processing is denoted by reference numeral 2205 in the figure.

The order creating means 1505, upon receiving the printout service information, stores the printout service information in the RAM 202 or in the HDD 209.

Next, the contents provider code is determined from the first parameter stored in the HDD 209 in 2204, the contents printout information storing means 1503 is searched, and contents printout information location data 1700, which is the results of the search, is obtained.

The contents printout information location data 1700 lists a first index item "[DATACENTER]" indicating that the actual contents printout information exists in the data center 140, so the order generating means 2206 issues a request for obtaining contents printout information to the data center 140 with "ADDRESS=http://www.hanbai_Stock/printinfo/DEF0001.inf" which indicates the location of the contents printout information. This processing is denoted by reference numeral 2206 in the figure.

The document providing means 1501 within the data center 140 obtains the desired contents printout information from within the contents printout information storing means 1503 in accordance with the contents printout information obtaining request, and transmits this to the contents provider computer 121. This processing is denoted by reference numeral 2207 in the figure.

The order creating means 1205 of the contents provider computer 121 which has obtained the contents printout information stores the obtained contents printout information in the HDD 209, and also obtains printout information within the contents printout information, obtains setting items matching the restriction range listed in the information from the printout service information stored in the RAM 202 or HDD 209, and described in an HTML document for making display of the printout conditions specifying screen which is the output of order information.

Next, viewing data is obtained with the viewing data address listed in the contents information space, and in the event that information relating to overlays exists therein, synthesizing is performed according to the information, and this is saved in the work area of the HDD 209 as a preview image for display on a later-described print conditions specifying screen, along with adding the saved location thereof in a predetermined position in the HTML document for displaying the printout conditions specifying screen. Then, the HTML document described so as to display the printout conditions specifying screen on the user computer 111 is transmitted to the user computer 111 via the document providing means 1501. This processing is denoted by reference numeral 2208 in the figure.

The document viewing means 401 in the user computer 111 displays the printout conditions specifying screen based on the received HTML document, as shown in FIG. 12 described with the first embodiment.

The user uses the printout conditions specifying screen which the document viewing means 401 in the user computer 111 displays to set the output destination printer, sheet size, and number of copies. Also, if necessary, the user uses the detailed settings link button to call up the detailed settings screen and makes detailed settings thereby, and then returns to the main screen to make printout conditions settings.

Once the user has confirmed the settings, clicking on the printout ordering button causes the document viewing means 401 to transmit an activation instruction to the order generating means 1505 within the contents provider computer 121 which is the link destination listed in the HTML document. The printout conditions specifications are transmitted together as parameters at the time of transmitting the activation instructions. This processing is denoted by reference numeral 2209 in the figure.

The document providing means 1501 within the contents provider computer 121 activates the order generating means 1505 again. The order generating means 1505 stores the printout conditions which are parameters to the work area of the HDD 209, and then transmits a confirmation screen HTML document, for displaying a confirmation screen whereby the user confirms the intent to execute the printout under the printout conditions which the user has set, to the user computer 111 via the document providing means 1501. This processing is denoted by reference numeral 2210 in the figure.

The document viewing means 401 within the user computer 111, upon receiving the confirmation screen HTML document, displays the confirmation screen, as shown in FIG. 13 described with the first embodiment. Following making confirmation of the preview image and the printout conditions, the user clicks the button so as to confirm the printout order, thereby giving order confirming instructions to execute printing out, to the order generating means 1505. This processing is denoted by reference numeral 2211 in the figure.

Based on the order confirmation instructions, the document providing means 1501 within the contents provider computer 121 generates, as described with reference to FIG. 19, printout order information from the contents information space within the contents printout information stored in the HDD 209 in 2008, the printout conditions stored in 2210, and so forth.

Next, an activation instruction is given to the order reception means 1602 so as to make a printout order request to the printout service provider computer 130. At the time of activation instruction, the contents provider code, the generated printout order information, and the URL which is a return destination, are transmitted as parameters. The return destination is the CGI application activation instruction with the present embodiment. This processing is denoted by reference numeral 2212 in the figure.

The document providing means 1601 within the printout service provider computer 130 activates the order reception means 1602 by an activation instruction for the order reception means 1602. The order reception means 1602 first searches within the contents provider management table 1605 for a record having the contents provider code handed as a parameter, and obtains the base address 1802 of the record as the results of the search. Next, confirmation is made to the document providing means 1602 regarding the transmission originator of the activation instruction is the contents provider computer 121 for the inquiring transmission originator.

Next, the order reception means 1602 issues an order code, and creates a new record for the order management table 1607 with the order code 901, the contents provider code 902 receiving an order by the parameters, the contents address 903 obtained from the received printout order information, and the status 904 as "Ordering", as with the order management record example 914. Also, in the event that overlay information exists within the printout order information, this is given a file name searchable by order code or order management table 1607, and saved in the printing spool 1608.

Then, the order reception means 1602 makes an activation instruction to the printout order generating means 1505 within the contents provider computer 121 which is the return destination URL handed over as a parameter. At the time of the activation instruction, the order code is transmitted as a parameter.

The order reception means 1602 sets "gathering image" for the status 904 within the order management record, activates the order printing data creating means 1603, and finishes processing. This processing is denoted by reference numeral 2213 in the figure.

The document providing means 1501 of the contents provider computer 121 activates the printout order generating means 1505 with the activation instruction for the printout order generating means 1505 transmitted from the printout service provider computer 130 in 2213. The printout order generating means generates an HTML document containing the order code handed over by the parameters, and transmits this to the user computer 111. This processing is denoted by reference numeral 2214 in the figure.

The document viewing means 401 of the user computer 111 displays the order reception completion screen based on the HTML document received from the contents provider computer 121. The order reception completion screen displays an order code or the like to the effect that the printout order has been received, a link for continuing viewing contents with the contents provider computer 121, and so forth. This processing is denoted by reference numeral 2215 in the figure.

On the other hand, at the printout service provider computer 130, the printing data creating means 1603 activated in the processing in 2213 receives the order code as a parameter at the time of activation, and accordingly searches the order management table 1607 by order code, and obtains the contents address 903 from the record found as the result of the search. Next, a request is made with the contents address to the data center 140 for obtaining contents. This processing is denoted by reference numeral 2216 in the figure.

Upon receiving the request for obtaining the actual contents from the printout service provider computer 130, the document providing device 1501 of the data center 140 obtains the contents regarding which a request for obtaining has been made from the contents storing means 1502, and transmits the contents to the printout service provider computer 130. This processing is denoted by reference numeral 2217 in the figure.

Upon receiving the contents, the printing data creating means 1603 of the printout service provider computer 130 stores to the printing spool 1608, in a manner identifiable by order code, the contents data and data necessary for printing, such as the various settings for the printout, added information, and so forth, based on the record in the order management table 1607. The status 904 of this record in the order management table 1607 is then set to "Standby", the printing control means 1604 is activated, and the processing ends. This processing is denoted by reference numeral 2218 in the figure.

The printing control means 1604 first searches for records wherein the status 904 in the order management table 1607 is set to "Standby", obtains the order code string as the results of the search, and extracts one order code from the order code string according to predetermined rules, data necessary for performing a printout corresponding to the code is obtained from the printing spool 1608, the printout data is transmitted to the printer which is the output destination, and accordingly the printout is made. This processing is denoted by reference numeral 2219 in the figure.

Once the printout is completed, the order management table 1607 is searched with the order code whereby the printout has been executed, and the status 904 of the found record is set to "Printing completed".

Thus, a printout of the actual contents within the data center 140 is realized by printout instructions from a contents viewing screen stored in the contents provider computer 121.

As described above, contents providers can provide contents providing services other than downloading data without the contents providers having own printing solutions, and users can be provided with services for various printing forms other than home-use printers.

Thus, printed material can be provided without directly distributing contents to users, thereby preventing unauthorized use of contents.

Further, the printout service providers can provide printout services without the necessity to have capital to possess contents and to pay for licenses, and businesses are not affected by the quality of the contents.

Fifth Embodiment

With the first through fourth embodiments, the printout service provider has been described as obtaining contents from a contents provider. However, in the event that printing requests for contents provided by the contents provider are concentrated for a certain amount of time, the load for processing the obtaining of the contents increases, and the processing speed of the printout service provider may drop. Also, in the event that the printer which actually performs the printing is to be carried out by a printout server connected to the printout service provider via network, this means that the printout service provider performs distribution of the contents to the printout server following obtaining the contents, so much time is consumed in the processing from giving the printing request from the user to actually obtaining the printed material.

With the fifth embodiment, at the time of the printout service provider receiving an order, the information is transmitted to a printout server, and the printout service receiving this obtains contents from a contents provider, and performs printing processing, thereby providing a printing control system wherein the load on the printout service provider can be alleviated.

<System Configuration>

Figure 23:
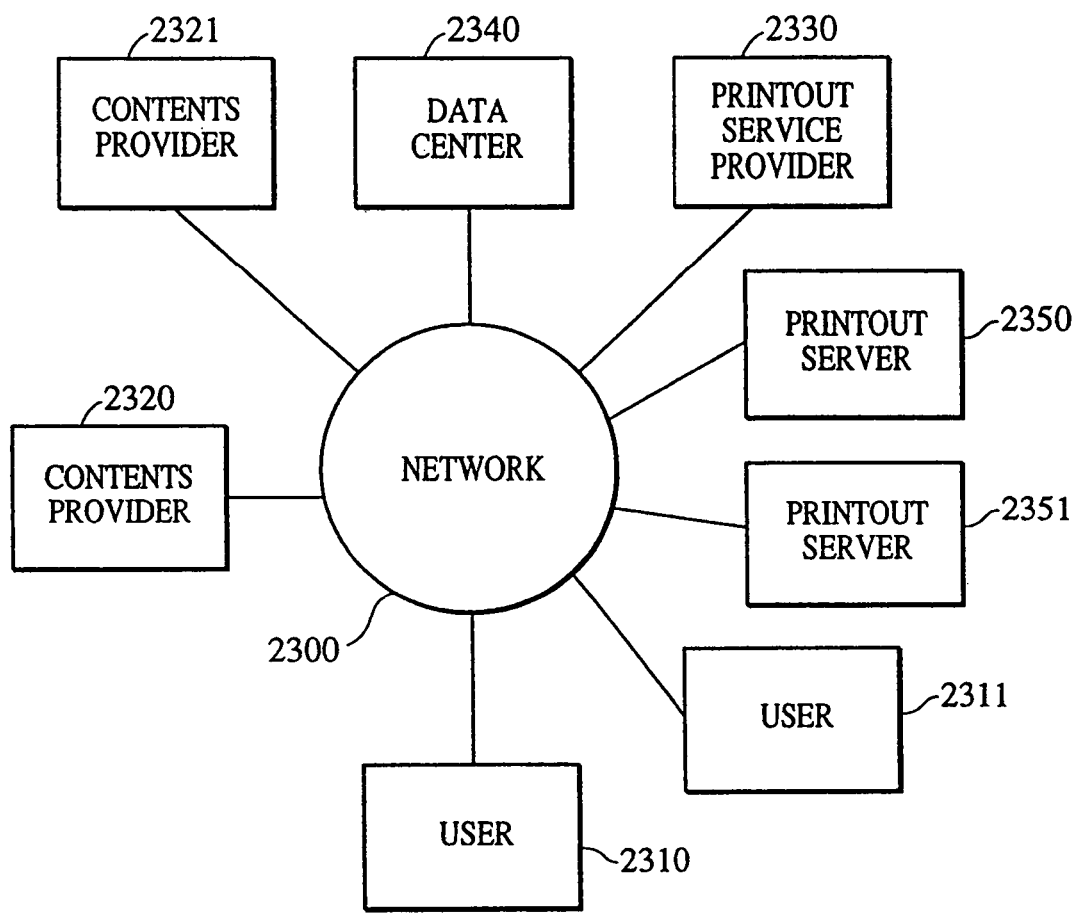
FIG. 23 is a configuration diagram of the overall system of fifth through eighth embodiments of the present invention.

FIG. 23 is a configuration diagram of the overall system of an embodiment of the present invention.

In FIG. 23, reference numerals 2310 and 2311 denote information processing devices (computer system comprising CPU, ROM, RAM, HDD, etc., as described later with reference to FIG. 24) for customers, which are users of the system according to the present embodiment, to perform direct operation from their homes, for example, and will hereafter be referred to as "user computers".

The user computers 2310 and 2311 have functions for viewing documents including contents of images and the like, and catalogs of contents, stored in later-described contents provider computers 2320 and 2321 via a network 2300, and also have functions for placing orders for printing orders to a printout service provider 2330 by using a printing order button contained in the document. Note that though the number of user computers connected in the present embodiment is two, with the present invention the number of user computers connected is not restricted in any way as long as one or more user computers are connected. Also, ordering image printing may be referred to as "printout order" or simply "order".

Reference numerals 2320 and 2321 denote information processing devices for contents providers which provide contents such as images and documents to carry out various services, and will hereafter be referred to as "contents provider computers" or simply "contents providers".

The contents provider computers 2320 and 2321 have the functions for providing user computers with documents including contents of images, documents, and the like, and catalogs of contents (hereafter may be referred to as "contents viewing screen") via the network 2300, and functions for supplying a later-described printout service provider 2330 with contents (hereafter may be referred to as "merchandise" or "actual contents") and accompanying information. Note that though the number of contents provider computers connected in the present embodiment is two, with the present invention the number of contents provider computers connected is not restricted in any way as long as one or more contents provider computers are connected. Also, though in the present embodiment each contents provider operating entity is described as operating one contents provider computer for the sake of description of the invention, there are no restrictions whatsoever on this number; rather, the contents provider operating entities may operate two or more contents provider computers for the purpose of dispersing loads or handling different contents.

Reference numeral 2330 denotes an information processing device which performs printing processing based on requests from the user computer 2301, and is referred to as a "printout service provider computer", or simply as a "printout service provider".

The printout service provider 2330 has the functions of supplying documents for realizing printout order screens based on requests from the user computers 2310 or 2311, receiving printout settings with the screen and configuring printout orders, and transmitting to later-described printout servers 2350 or 2351 which are output destinations in accordance with the printout orders.

Note that though in the present embodiment each printout service provider operating entity is described as operating one printout service provider computer for the sake of description of the invention, there are no restrictions whatsoever on this number; rather, the printout service provider operating entities may operate two or more printout service provider computers for the purpose of dispersing loads or the like.

Reference numeral 2340 denotes an information processing device holding actual contents described in a document containing contents catalog pages to be disclosed by the contents provider computers 2320 or 2321, and will be referred to as a "data center computer" or "data center".

In the event that the user views a contents viewing screen, which is a contents catalog, at the contents provider computer 2320 or 2321 and executes a printout order to the printout service provider computer 2330 for the actual contents in the viewing screen, the data center computer 2340 transmits, to the printout service provider computer 2330, data necessary for the printout or printout order such as the actual contents requested by the printout service provider computer 2330 and the later-described contents printout information.

Now, though the present embodiment is described with the number of data centers connected as one, the present invention does not restrict the number of data centers connected in any way.

Also, note that though in the present embodiment each data center operating entity is described as operating one data center computer for the sake of description of the invention, there are no restrictions whatsoever on this number; rather, the data center operating entities may operate two or more data center computers for the purpose of dispersing loads or the like.

Reference numerals 2350 and 2351 denote printout servers for receiving printout orders from the printout service provider 2330, obtaining actual contents from the contents provider computer 2320 or data center computer 2340 in accordance with the printout orders, and performing printing processing of the actual contents.

Now, though the present embodiment is described with the number of printout servers connected as one, the present invention does not restrict the number of data centers connected in any way.

Also, note that though in the present embodiment each printout server is described as operating one computer for the sake of description of the invention, there are no restrictions whatsoever on this number; rather, the printout server operating entities may operate two or more printout servers for the purpose of dispersing loads or the like.

Reference numeral 2300 denotes a connecting device for connecting the user computers 2310 and 2311, the contents provider computers 2320 and 2321, the printout service provider computer 2330, the data center computer 2340, and the printout servers 2350 and 2351, the connecting device representing a network system such as the Internet or a Local Area Network (LAN), hereafter described simply as "network". Also, with the present embodiment, the Internet which is commonly used is employed as the network 2300, but the present invention can be realized using other network systems, as well.

Also, with the present embodiment, description will be made under the assumption that actual contents to be printed out exist in the contents provider computer 2320. As for the contents provider computer 2321, a contents catalog screen is held therein, and the contents printout information which is actual contents and accompanying information to the contents as described later, and the information necessary for printouts and printout orders, are stored in the data center 2340.

Also, printout orders from the contents viewing screen of the contents provider 2321 will be described later in the sixth embodiment.

<Block Diagram of User Computer, Contents Provider Computer, Printout Service Provider Computer, and Data Center>

Figure 24:
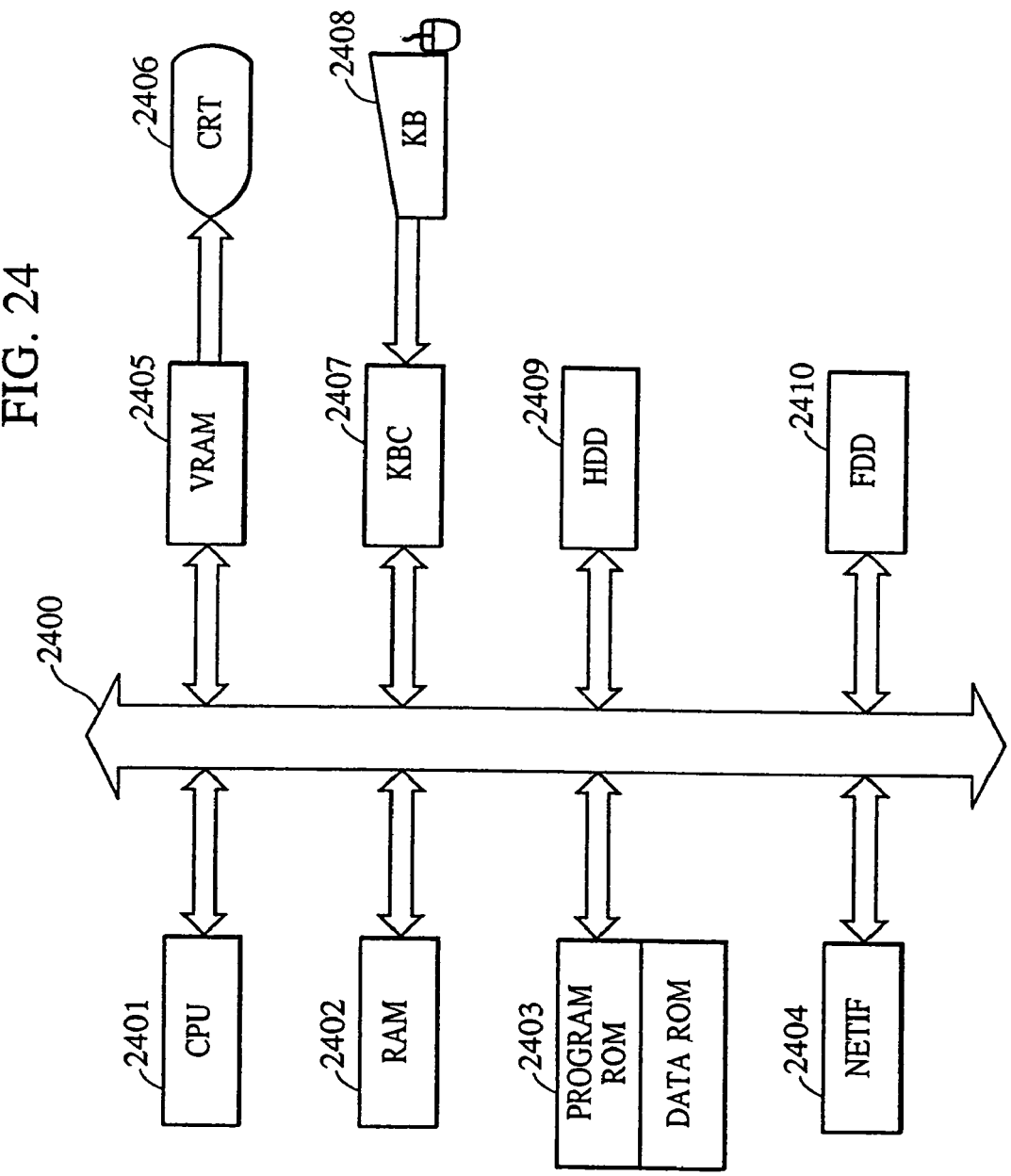
FIG. 24 is a block diagram illustrating the hardware configuration of user computers, contents provider computers, data center, and printout service provider computer, according to the fifth through eighth embodiments.

FIG. 24 is a block diagram illustrating the hardware configuration of the information processing devices listed in the present embodiment. Incidentally, with the present embodiment, there is no difference between the user computers 2310 and 2311, contents provider computers 2320 and 2321, printout service provider 2330, and the data center 2340 regarding internal configuration, so description thereof will be made regarding all in FIG. 24.

In FIG. 24, reference numeral 2401 is a Central Processing Unit (hereafter referred to as "CPU") for governing the control of the information processing device. Reference numeral 2402 denotes Random Access Memory (hereafter referred to as "RAM"), functioning as the primary memory of the CPU 2401 and as area for programs being executed, area for executing the programs, and as data area. Reference numeral 2403 denotes Read Only Memory (hereafter referred to as "ROM") storing the action processing procedures for the CPU 2401. There are two types of ROM 2403; program ROM which has recorded therein operating software which is the system program which performs device control of the information processing device, and data ROM which has recorded there information and the like necessary for running the system. There are cases wherein a later-described HDD 2409 is used instead of the ROM 2403.

Reference numeral 2404 denotes a network interface (NETIF), which performs control for performing data transfer via network with other information processing devices, and diagnosis of the connection state.

Reference numeral 2405 denotes Video RAM (VRAM) which renders images to be displayed on a later-described CRT 2406 screen indicating the operating state of the information processing device, and performs control of the display thereof. Reference numeral 2406 denotes a display device, such as a dedicated display, hereafter referred to as "CRT". Reference numeral 2407 denotes a controller for controlling input signals from a later-described external input device 2408. Reference numeral 2408 denotes an external input device, such as a keyboard, a mouse or other like pointing device, and so forth, for the user of the information processing device to input operations to the information processing device. The external input device will hereafter be denoted simply as "KB". Reference numeral 2409 denotes a hard disk drive (HDD), used for saving application programs, data such as image information, and the like. In the present embodiment, application programs are software programs executing the processing means making up the present embodiment.

Reference numeral 2410 denotes an external input/output device, for performing input and output of removable disks such as floppy disks or CD-ROMs for example, for reading the above application programs from the medium. The external input/output device will hereafter be denoted by "FDD". Note that the application programs and data stored in the HDD 2409 can also be stored in the FDD 2410 and thus used. Reference numeral 2400 denotes an input/output bus (address bus, data bus, and control bus) for connecting the above-described units.

<Block Diagram of Printout Server>

Figure 25:
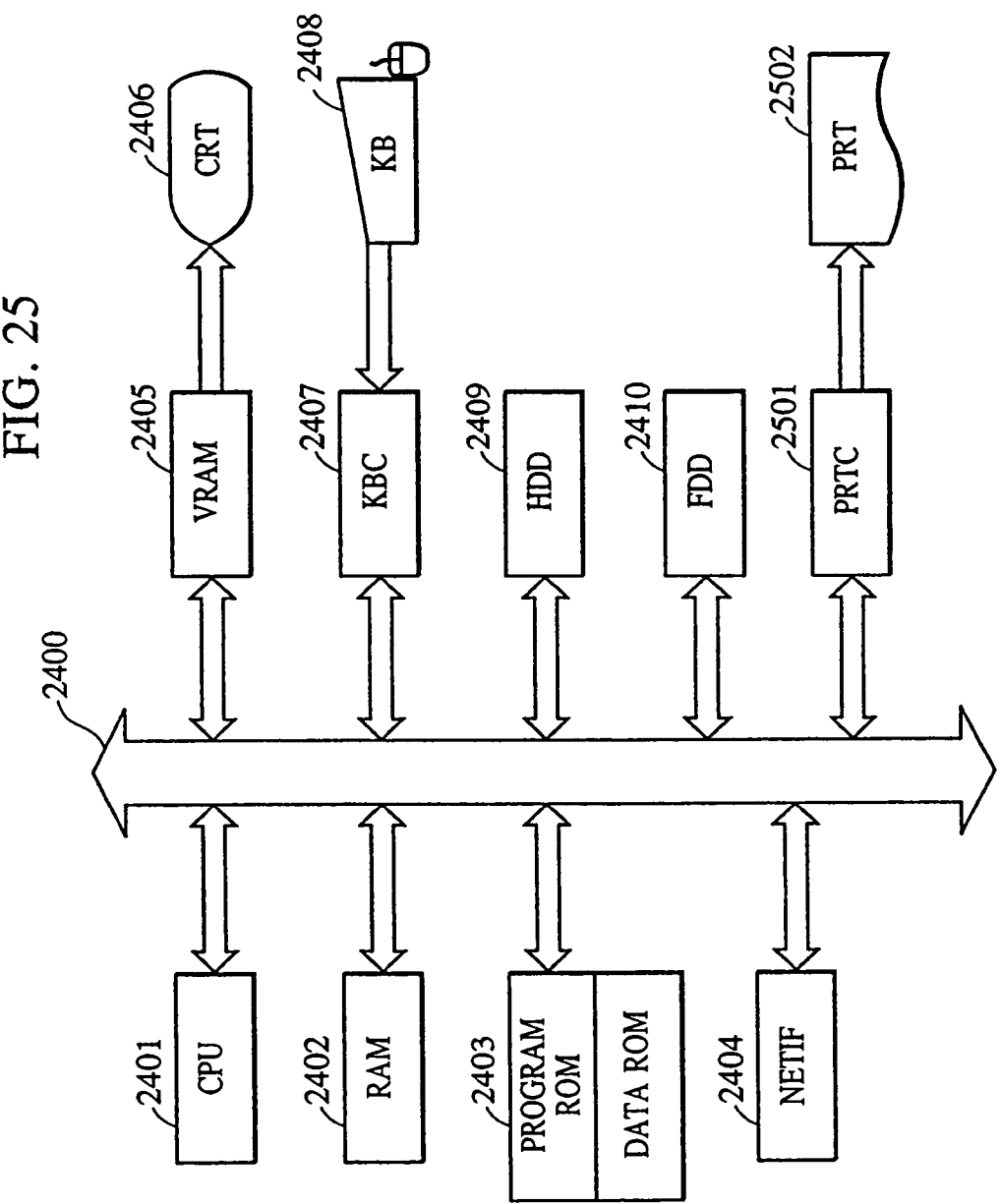
FIG. 25 is a block diagram illustrating the hardware configuration of a printout server according to the fifth through eighth embodiments.

FIG. 25 is a block diagram illustrating the hardware configuration of the printout servers 2350 and 2351 according to the present embodiment.

The printout service provider computer 2330 has the same hardware configuration as that of the user computers 2310 and 2311, contents provider computers 2320 and 2321, printout service provider computer 2330, and the data center computer 2340, described with reference to FIG. 24, with several additions thereto. Accordingly, in FIG. 25, the components which are equivalent to those in FIG. 24 will be denoted with the same reference numerals.

In FIG. 25, reference numeral 2401 denotes a CPU for governing the control of the information processing device which is the printout servers 2350 and 2351. Reference numeral 2402 denotes RAM functioning as the primary memory of the CPU 2401 and as area for programs being executed, area for executing the programs, and as data area. Reference numeral 2403 denotes ROM storing the action processing procedures for the CPU 2401. There are two types of the ROM 2403; program ROM which has recorded therein operating software which is the system program which performs device control of the printout server, and data ROM which has recorded there information and the like necessary for running the system. There are cases wherein a later-described HDD 2409 is used instead of the ROM 2403. Reference numeral 2404 denotes a network interface (NETIF), which performs control for performing data transfer via network with other information processing devices such as the user computer 2310 connected via the network and diagnosis of the connection state. Reference numeral 2405 denotes VRAM which renders images to be displayed on a later-described CRT 2406 screen indicating the operating state of the information processing device, and performs control of the display thereof. Reference numeral 2406 denotes a display device, such as a dedicated display, hereafter referred to as "CRT".

Reference numeral 2407 denotes a controller for controlling input signals from a later-described external input device 2408. Reference numeral 2408 denotes an external input device, such as a keyboard, a mouse or other like pointing device, and so forth, for the user of the information processing device to input operations to the information processing device. The external input device will hereafter be denoted simply as "KB". Reference numeral 2409 denotes a hard disk drive (HDD), used for saving application programs for controlling printing, data such as image information, and the like. Reference numeral 2410 denotes an external input/output device, for performing input and output of removable disks such as floppy disks or CD-ROMs for example, for reading the above application programs from the medium. The external input/output device will hereafter be denoted by "FDD". Note that the application programs and data stored in the HDD 2409 can also be stored in the FDD 2410 and thus used. Reference numeral 2501 denotes a printer control device, which performs control of a later-described external output device 2502 and control of images to be output. The printer control device will hereafter be denoted by "PRTC". Reference numeral 2502 is an external output device, such as a printer for example, and will hereafter be denoted by "PRT". Reference numeral 2400 denotes an input/output bus (address bus, data bus, and control bus) for connecting the above-described units.

<Configuration of User Computer>

Figure 26:
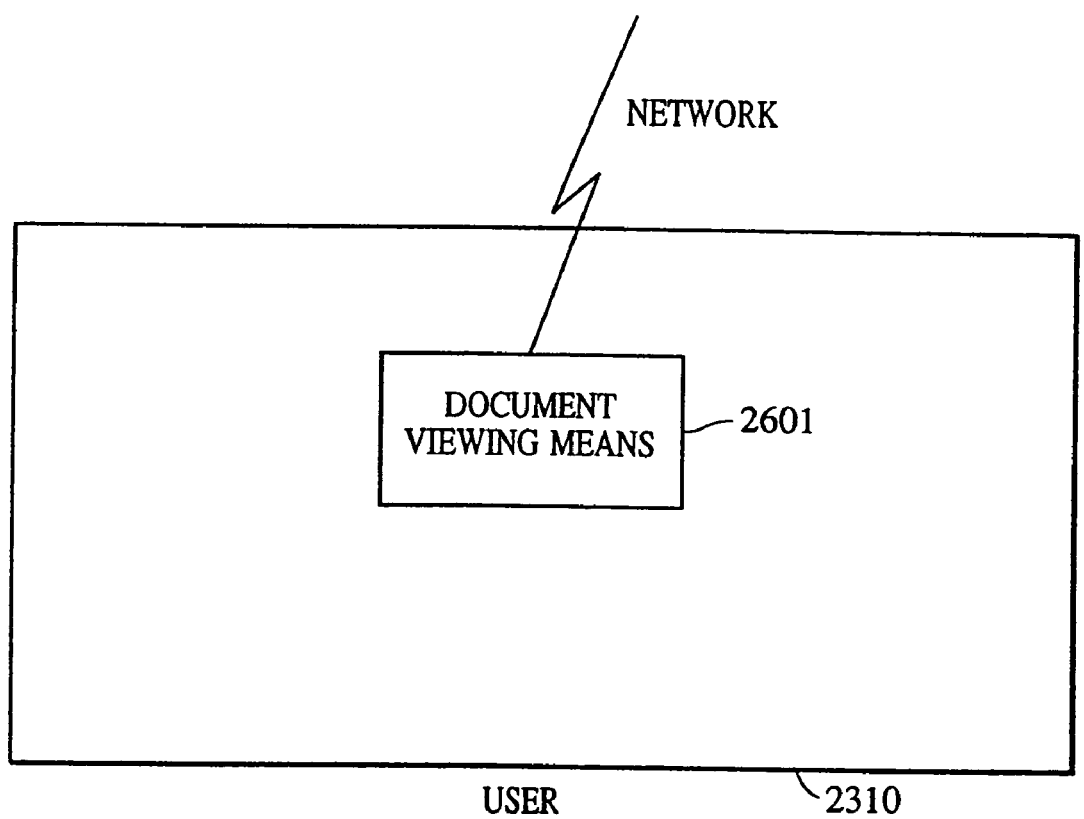
FIG. 26 is a diagram illustrating the software configuration of a user computer according to the fifth through eighth embodiments.

FIG. 26 is an explanatory diagram representing the software configuration of the user computer 2310 which is the information processing device which the user actually uses. The user computer 2311 is also of the same configuration.

The user computer 2310 comprises document viewing means 2601 which is an application program read in from the ROM 2403, HDD 2409, or FDD 2410, rendered to the RAM 2402, and used. The document viewing means 2601 is an application program which enables receiving of services from external sources, such as the Internet, via network (i.e., a common application program such as a so-called Internet browser). Services normally received by the document viewing means 2601 normally are documents described in HyperText Markup Language (HTML), and in addition to viewing documents, document transmission request can be made to the contents providers 2320 and 2321 and the printout service provider 2330 by operating buttons and the like embedded in the HTML, and transmitting printout commissions and various settings for commissioning printouts made at the user computer such as paper size for example can be performed, as well.

<Configuration of Contents Provider Computer and Data Center Computer>

Figure 27:
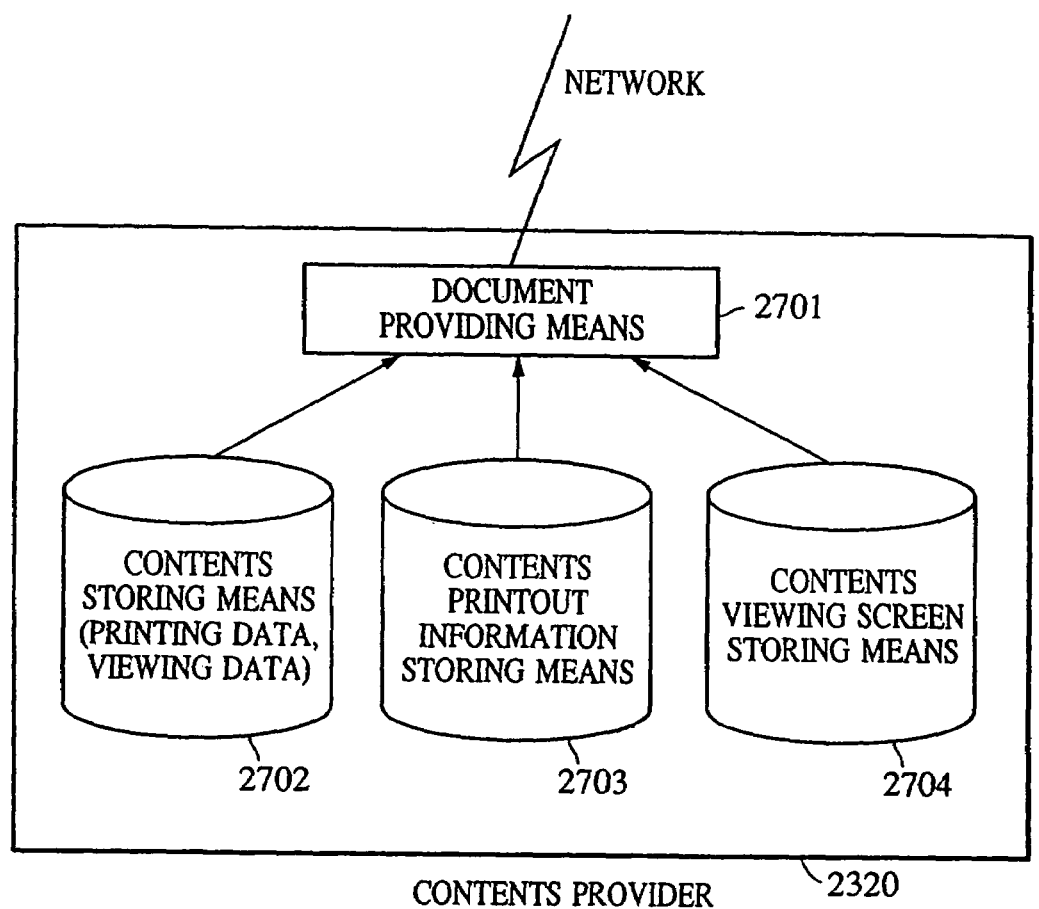
FIG. 27 is a diagram illustrating the software configuration of the contents provider computer and data center according to the fifth and sixth embodiments.

FIG. 27 is a configuration diagram illustrating the processing means and management data within the contents provider computer 2320. The contents provider computer 2321 and data center 2340 are of approximately the same configuration, and accordingly, description thereof will be made from FIG. 27 as well.

In FIG. 27, reference numeral 2701 denotes an application program, which is read in from the ROM 2403, HDD 2409, or FDD 2410, rendered at the RAM 2402, and thus used.

Reference numerals 2702, 2703, and 2704 denote data stored within the HDD 2409. The document providing means 2701 is an application program enabling searching HTML documents, text, images, etc., from the data stored in the HDD 2409 as described later, upon requests therefor from an external computer such as the user computers 2310 and 2311 or the printout service provider computer 2330 via a network such as the Internet, and transmitting the file that has been found. The document providing means 2701 is generally called an Internet server program or WWW server program, and is an application program which enables, in addition to the above transmitting of documents, applications programs stored within the HDD 2409 to be rendered at the RAM 2402 and used upon request from external computers, and performing user ID certification of users making external requests and restricting data to be transmitted, as necessary.

Reference numeral 2702 denotes contents storing means for storing actual contents such as images and documents to be printed at the printout service provider 2330, and viewing data to be displayed on the computer of the user as a preview of the contents. The viewing data is, in the case of an image for example, an image wherein the resolution has been reduced to the extent that screen display can be made. In the case of a document, a summarized text or an image whereby the first page can be displayed, is used. The present invention does not particularly restrict viewing data.

The data in the present means is stored in the HDD 2409, with the document providing means 2701 performing searches upon requests from external computers such as the user computers 2310 and 2311 or the printout service provider computer 2330, and transmitting the data thereto.

Reference numeral 2703 denotes contents printout information storing means for storing contents printout information describing, for example, various restrictions regarding contents such as printing size and number of copies to be printed, various restrictions regarding printout conditions such as sheet size for printing out and printing quality, and other information necessary for printout ordering and printing processing, at the time of printing out the actual contents stored in the contents storing means 2702. Details of the contents printout information will be described later with reference to FIG. 29. The data in the present means is stored in the HDD 2409, with the document providing means 2701 performing searches upon requests from external computers such as the printout service provider computer 2330, and transmitting the data thereto.

Reference numeral 2704 denotes contents viewing screen storing means for storing HTML documents for displaying screens (contents viewing screens) for the users to view contents viewing data stored in the contents storing means 2702 on the user computers 2310 and 2311, and perform printout commissioning. The data in the present means is stored in the HDD 2409, with the document providing means 2701 performing searches of the means upon requests from external computers such as the user computers 2310 and 2311 and so forth, and transmitting the data thereto.

The above has been a description of the configuration of the contents provider computer 2320. Note that with the contents provider computer 2321 according to the present embodiment, contents printout information and actual contents are handled as existing on the data center computer 2340, and accordingly, the contents printout information storing means 2703 and the contents storing means 2702 are not indispensable components. In this case, the contents viewing data may be the contents viewing screen storing means 2704. Also, with regard to the data center computer 2340, the document providing means 2701 does not necessarily have to be a so-called WWW server; a File Transfer Protocol (FTP) server or the like may be used so long as the computer is capable of transmitting files to the printout service provider computer 2330. Further, the contents viewing screen storing means 2704 within the data center computer 2340 is not necessary for realizing the present invention, either.

<Configuration of Printout Service Provider Computer>

Figure 28:
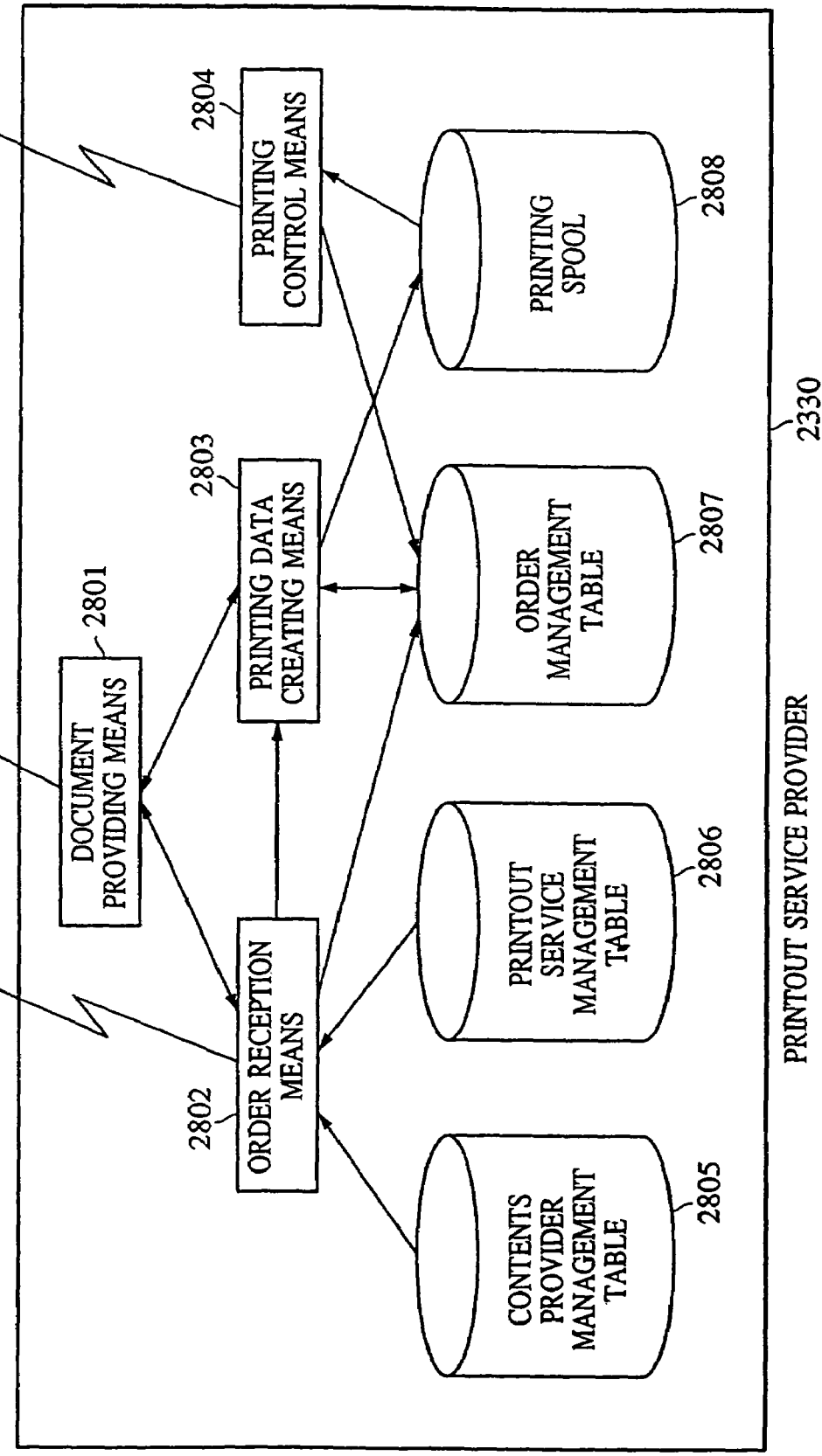
FIG. 28 is a diagram illustrating the software configuration of the printout service provider computer according to the fifth and sixth embodiments.

FIG. 28 is a configuration diagram illustrating the processing means and management data within the printout service provider computer 2330. In FIG. 28, the processing means 2801, 2802, 2803, and 2804 are application programs, read in from the ROM 2403, HDD 2409, or FDD 2410, rendered at the RAM 2402, and thus used. Reference numerals 2805, 2806, 2807, and 2808 denote data stored within the HDD 2409.

The document providing means 2801 is equal to the document providing means 2701, and is an application program enabling searching HTML documents, text, images, etc., from the data stored in the HDD 2409 as described later, upon requests therefor from the external computers such as the user computers 2310 and 2311 or contents provider computers 2320 and 2321 via a network such as the Internet, and transmitting the file that has been found. The document providing means 2701 is generally called an Internet server program or WWW server program, and is an application program which enables, in addition to transmission of documents, applications programs stored within the HDD 2409 to be rendered at the RAM 2402 and used upon request from external computers, and performing user ID certification of users making external requests and restricting data to be transmitted, as necessary.

The order reception means 2802 is an application program group for performing reception of contents printout orders. The functions of the order reception means 2802 can be generally divided into three stages.

As the first stage, the order reception means 2802 is activated by a printout order request issued by the user computers 2310 or 2311, determines the contents and the contents provider having the contents regarding which a printout request has been made, obtains contents printout information of the contents necessary for reception of the order, from the contents provider computer 2320 or the data center computer 2340, and further obtains necessary information from a later-described printout service management table 2806, thereby generating order information in a later-described order management table 2807 and generating an HTML document for displaying a printout conditions specifying screen whereby settings for printing out are made, which are transmitted to the user computers 2310 or 2311 issuing the printout order request.

The second stage is a function for being activated by printout conditions settings requests issued along with the various printout conditions settings, according to the printout conditions screen displayed on the user computer 2310 or 2311 which is the transmission destination of the HTML document, generating printout orders, and transmitting an HTML document to the user computer for displaying a printout confirmation screen.

The third stage is a function for being activated by receiving a printout order completion notification issued from the user computers 2310 or 2311 by performing confirmation operation with the printout confirmation screen, and the later-described printing data creating means 2803 for performing printing preparation work is activated.

As described above, the order reception means 2802 is an application program which is rendered to the RAM 2402 from within the HDD 2409 or the like by the document providing means 2801 based on requests from external computers, and is generally called a CGI program.

The printing data creating means 2803 is an application program which is rendered to the RAM 2402 from the HDD 2409 or the like by the order reception means 2802, and thus used. After being activated by the order reception means 2802, the printing data creating means 2803 extracts records for creating printing data from the order management table 2807, creates printout order data which enables printing with the printout servers 2350 or 2351 according to the record, and saves this to a later-described printing spool 2808.

Reference numeral 2804 denotes printing control means for controlling printing by transmitting printout orders to printout servers 2350 or 2351 to realize the printing processing of the printout order data within the printing spool 2808, and receiving the state of progress of the printing processing from the printout servers 2350 or 2351. The printing control means 2804 is an application program which is rendered to the RAM 2402 from within the HDD 2409 or the like, and thus used. Activation of the printing control means 2804 occurs at the time of activation of the printout service provider computer 2330. The contents provider management table 2805 has the data structure described later with reference to FIG. 30, and stores the address of the contents provider computer or data center, the location of contents printout information, and so forth.

The printout service management table 2806 is a table storing all printout service settings provided by the printout service provider computer 2330, and stores type of printer, printing conditions (sheet size, number of copies, paper quality, print quality, position, enlargement/reduction, two-side printing, binding direction and other layout information, post-printing work such as binding, laminating, covering, etc.), information regarding printing prices, and so forth.

Note that the printers registered in the printout service management table 2806 must be printers capable of performing printing processing according to printout orders received by the printout service provider computer 2330. The registered printout servers are the printout servers 2350 and 2351 connected to the network 2300, and the printers connected to the servers are registered by printer type.

The order management table 2807, described in detail later with reference to FIG. 31, stores the printout order and accompanying information, and the state of progress of the order. The printing spool 2808 stores actual contents for realizing the printing of the printout order and other data necessary for printing.

<Configuration of Printout Server>

Figure 37:
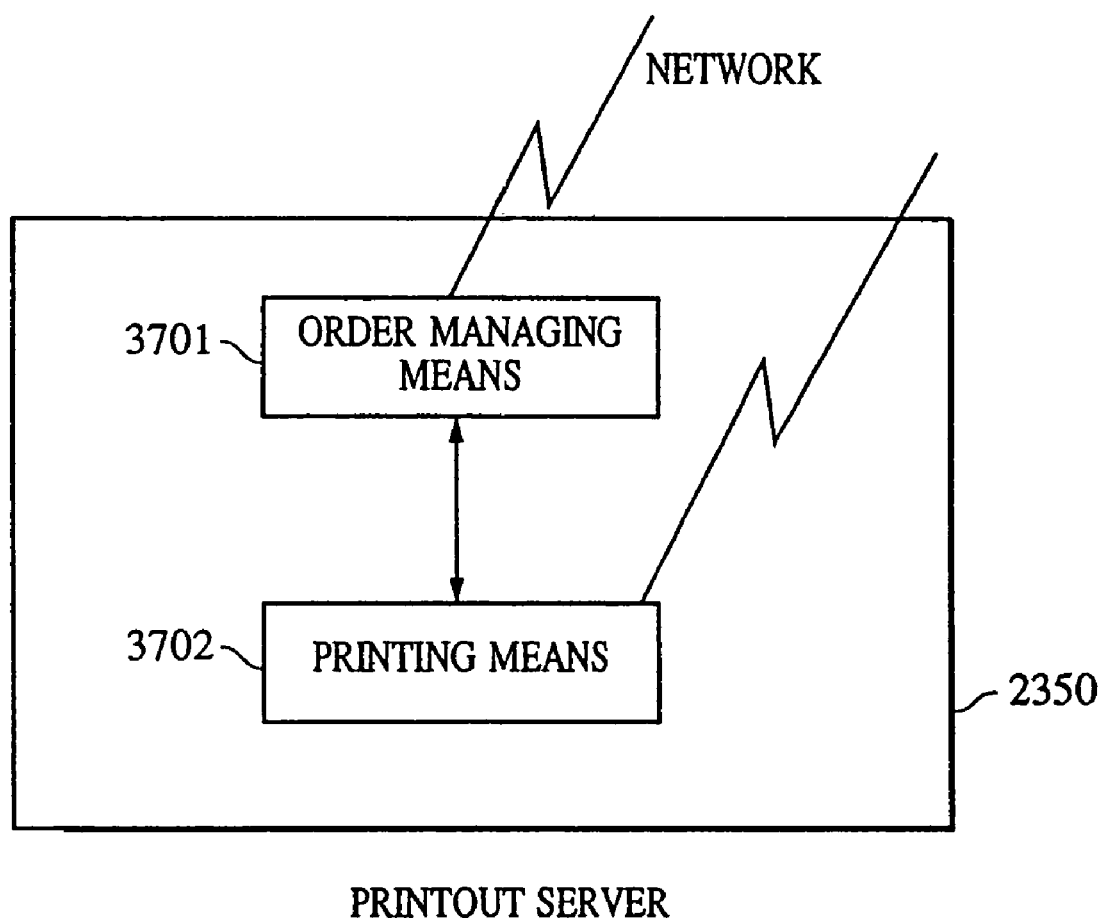
FIG. 37 is a diagram illustrating the software configuration of the printout server according to the fifth and sixth embodiments.

FIG. 37 is a configuration diagram illustrating the processing means and the management data within the printout server 2350. The printout server 2351 is of the same configuration.

In FIG. 37, reference numerals 3701 and 3702 denote application programs, which are read in from the ROM 2403, HDD 2409, or FDD 2410, rendered at the RAM 2402, and thus used.

Reference numeral 3701 denotes order managing means for receiving printout order data transmitted from the printing control means 2804 within the printout service provider computer 2330, handing the printout order data to later-described printing means 3702, and transmitting the results of processing by the printing means to the printing means 2804 of the printout service provider. In the present embodiment, the order managing means 3701 for standing by for transmitting and receiving is automatically activated at the point of activating the printout server.

Reference numeral 3702 denotes printing means for obtaining actual contents from the contents provider computer 2320 or data center computer 2340 according to the printout order handed thereto by the order managing means 3701, realizing printing using a printer 2502 connected to the PTRC 2501, and sending the printing results to the order managing means. In the present embodiment, the printing means 3702 is activated by the order managing means 3701.

With the present embodiment, the printout servers 2350 and 2351 are handled as being configured on a computer, but the present invention can be realized by printers directly connectable to the network having the configuration shown in FIG. 37.

<Contents Printout Information>

Next, a description will be given regarding the contents printout information stored in the contents printout information storing means 2703 of the contents provider computer 2320 and data center computer 2340.

As described earlier, contents printout information is data describing information necessary for printout ordering and printing processing at the time of printing the contents which the contents provider has. Though the present invention does not particularly specify a particular data format or description format for the data, contents stored in the contents storing means 2702 that can be printed by the present invention must have contents printout information corresponding to the contents. Also, the present invention does not particularly stipulate the transfer method of contents printout information to the printout service provider. In order to describe the present invention in an even clearer manner, the present embodiment will be described as having one text file describing contents printout information corresponding to each of the printable contents, and the files are stored in the contents printout information storing means 2703.

Information described in the contents printout information will be listed next.

The following, and possibly others, are described as information relating to contents, as necessary:
① A contents code uniquely specifying contents within at least the range of the contents provider;
② Contents type, such as document, image, etc.;
③ The location of the actual contents;
④ The location of the viewing data;
⑤ Price information;
⑥ Overlay information, which is information to be overlaid at the time of printing the contents, e.g., copyright display, serial No., etc.; and
⑦ Overlay position information representing the overlay position of the overlay information.

The following, and possibly others, are described as restriction information relating to printing out of the contents, as necessary:
① Size restriction information restricting the minimum and maximum size of the contents at the time of printing;
② Sheet size restriction information restricting the size of the printing sheet;
③ Sheet quality restricting information restricting the quality of the printing sheet;
④ Restriction information for the number of copies, restricting the maximum number of copies which can be printed; and
⑤ Printer restriction information restricting the type of printer to print out the contents.

The following, and possibly others, are described as other contents printout information, as necessary:
① Default specified for printout settings;
② Settlement information for contents;
③ Settlement information for material printed out;
④ Identification information of users; and
⑤ Identification information of printout ordering managed by the contents provider.

Figure 29:
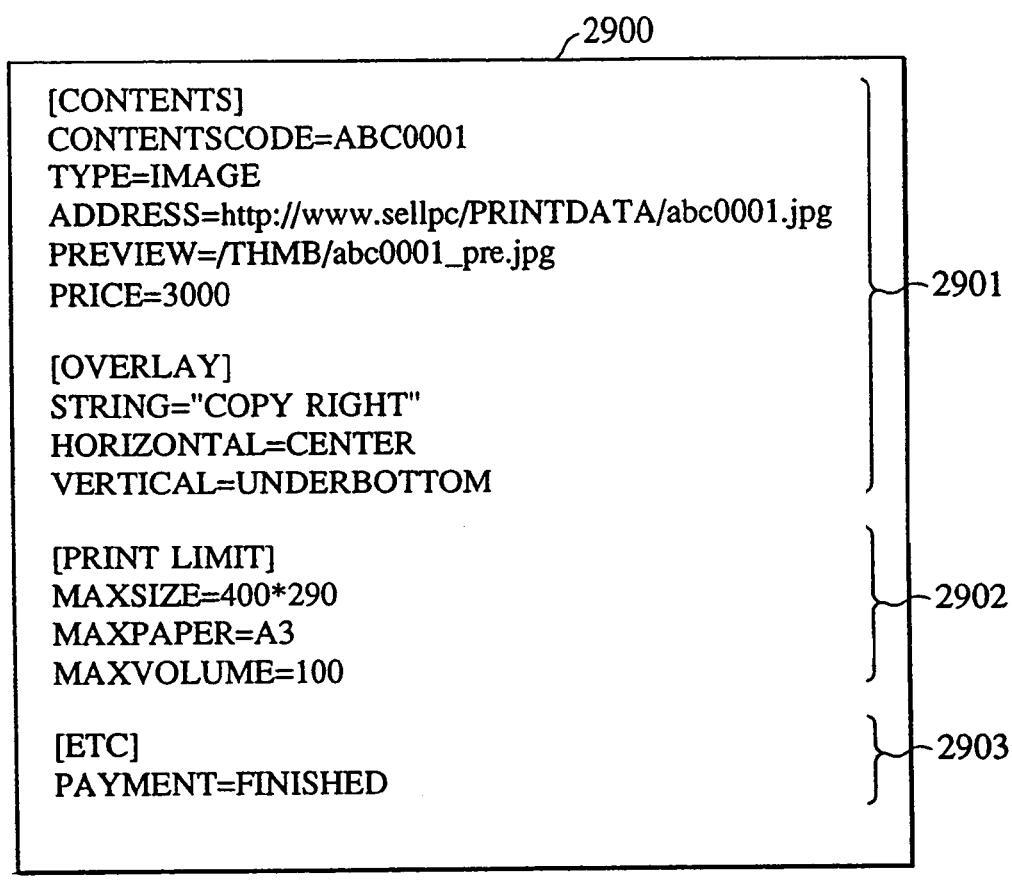
FIG. 29 is a diagram illustrating an example of contents printout information according to the fifth through eighth embodiments.

FIG. 29 is a diagram illustrating an example of contents printout information according to the present embodiment.

In FIG. 29, reference numeral 2900 denotes contents printout information, and with the present embodiment, is supplied as a text data file. The contents printout information 2900 starts with an index item between the parentheses [ ] as shown in the figure, and is listed in "settings name=settings value" fashion following the index item.

Reference numeral 2901 denotes a contents information space listing information relating to the contents. There are two index items with the present embodiment indicating the contents information space 2901. The first index item "[CONTENTS]" lists contents code and the like, and the second index item "[OVERLAY]" lists overlay text strings which are printed along with the contents by overlaying at the time of printing contents, and the positions thereof. In FIG. 29, there are five settings under the first index item. "CONTENTSCODE=ABC0001" indicates that the object of the contents printout information 2900 is the contents specified by the contents code "ABC0001". "TYPE=IMAGE" indicates the type of contents, such as image or document, and in this case indicates that "ABC0001" is an image. "ADDRESS=http://www.sellpc/PRINTDATA/abc0001.jpg" indicates that the location of the file "abc0001.jpg" which is the actual contents is "http://www.sellpc/PRINTDATA/abc0001.jpg".

"PREVIEW=/THMB/abc0001_pre.jpg" indicates that the location of the viewing data "abc0001_pre.jpg" used for previewing and so forth is "/THMB/abc0001_pre.jpg".

In the event that, unlike the actual contents, there is no information indicating the computer name in the location of the viewing data, as in this case, this means that the viewing data exists on the same computer where the contents printout information 2900 is stored.

The last settings item belonging to the index item "[CONTENTS]", which is "PRICE=3000", means that the price of the contents is 3,000 Yen. Note that though the present embodiment omits currency units, currency units may be included to handle cases wherein multiple currencies exist.

The other index item "[OVERLAY]" of the contents information space 2901 lists the added data to be printed out along with the contents at the time of making the contents printout, and the position thereof.

"STRING="COPYRIGHT"" indicates added data. The text string in the quotes " " for the setting value is the text string that will be printed out along with the contents.

"HORIZONTAL=CENTER", "VERTICAL=UNDERBOTTOM" define the position for the added data, and in the case in FIG. 29 means that the horizontal position is at the center and the vertical position is at the bottommost position.

Reference numeral 2902 denotes a printout information space listing restriction information for printing out contents.

The printout information space 2902 according to the present embodiment is indicated by "[PRINT LIMIT]".

In FIG. 29, there are the following three setting items in "[PRINT LIMIT]". Though items other than these three shown in FIG. 29 can be set with the contents printout information, with the present embodiment, information regarding which settings have been omitted is handled as having no restrictions or default values set to the printout service provider computer 2330 beforehand are applied. "MAXSIZE=400*290" indicates that the actual printing size of the contents is to be restricted to 400 (mm) wide and 290 (mm) high.

"MAXPAPER=A3" indicates that the largest sheet size used for printing is to be restricted to A3.

"MAXVOLUME=100" indicates that the number of printouts that can be made with one printout order is to be restricted to 100.

Reference numeral 2903 denotes a miscellaneous information space for other contents printout information according to the present embodiment that does not belong to either contents-related information or contents printout-related restriction information. With the present embodiment, the miscellaneous information space 2903 is indicated by the index item "[ETC]".

In FIG. 29, "PAYMENT=FINISHED" means that the bill for the contents has already been settled.

The above has been a description of the contents printout information according to the present embodiment, with reference to FIG. 29. Of course, information in the printout information space 2902 is not the only information which might be omitted; information in the contents information space 2901 and miscellaneous information space 2903 can also be omitted as long as this does not interfere with printout ordering and printing out.

<Contents Provider Management Table>

Next, description will be made regarding a contents provider management table 2805 which the printout service provider computer 2330 has.

The contents provider management table 2805 stores and manages the position where the contents provider computer 2320 and data center computer 2340 exist and the position where the contents printout information is stored within the computer. This table is stored in the HDD 2409. Using a database system or the like can realize a suitable configuration.

The contents provider management table 2805 is searched at the time of the order reception means 2802 at the time of performing order reception processing, and reception processing of printout orders for contents existing in external computers is realized by making reference to the search results.

FIG. 30 is a schematic diagram of a contents provider management table according to the present embodiment.

The contents provider management table 2805 manages three items, denoted by reference numerals 3001, 3002, and 3003, as a single record (hereafter referred to as "contents provider management record").

Reference numeral 3001 denotes a contents provider code issued beforehand for each contents provider, and stored, for identifying contents providers.

Reference numeral 3002 denotes a base address representing the position of the contents provider computers 2320 and 2321 on the network. With the present embodiment, description is made with reference to an example wherein the network connection is made with the Internet, so the base address 3002 describes the locations thereof with Uniform Resource Locators (URLs) commonly used in Internet environments.

Reference numeral 3003 denotes a contents printout information path, for storing the position of the contents printout information storing means 2703. The contents printout information path 3003 is described as a relative path from the base address 3002.

Thus, the contents provider code is determined by the parameters provided at the time of activating the order reception means, and further a file name is provided to the contents printout information such that the uniqueness of the contents code is guaranteed, thereby synthesizing the base address 3002 in the record detected by the contents provider code 3001 and the contents printout information path 3003, and further synthesizing the contents printout information file name, consequently enabling the location of the contents printout information for performing printout ordering to be determined. Then, the contents printout information is obtained based on the location of the contents printout information within the contents provider computer 2320 or the data center computer 2340.

Next, description will be made regarding an example of data in the contents provider management table, according to the present embodiment.

Reference numeral 3011 denotes a contents provider management record corresponding to the contents provider computer 2320, in the present embodiment. The contents provider management record 3011 indicates that the contents provider code 3001 issued beforehand is "0001", that the base address 3002 is "http://www.sellpc", and that the contents printout information path 3003 is "/info/printinfo".

Reference numeral 3012 denotes a contents provider management record corresponding to the contents provider computer 2321, in the present embodiment. The contents provider management record 3012 indicates that the contents provider code 3001 issued beforehand is "0002", that the base address 3002 is "http://www.hanbai_Stock" indicating the data center 2340, and that the contents printout information path 3003 is "/printinfo".

The following is a description of a specific example of the procedures for generating contents printout information location with the order reception means 2802, in the printout service provider computer 2330 having the contents provider management tables 3011 and 3012.

Activating the order reception means 2802 analyzes the parameters to be handed to the means upon activation. For example, in the event that the analysis results of the parameters to be handed upon activation indicate that the contents provider code is "0001" and the contents code is "ABC0001", searching a contents provider record wherein the contents provider code 3001 in the contents provider management table 2805 matches "0001" determines the contents provider management record 3011. Next, the contents provider management record 3011 is obtained, and the path, for the contents printout information corresponding to the contents for which printing out is to be ordered, is synthesized from the base address 3002, contents printout information path 3003, and the contents code. For example, in the event that ".inf", which is a file suffix is attached to the contents code for the contents printout information file name, the location of the contents printout information of the contents specified by the contents code "ABC0001" is "http://www.sellpc/info/printinfo/ABC0001.inf".

<Order Management Table>

Next, description will be given regarding the order management table 2807 in the printout service provider computer 2330.

The order management table 2807 manages the location of contents to be printed out for the printout order, information necessary for printing out, the state of progression of the printout order, and so forth. This table is stored in the HDD 2409. Using a database system or the like can realize a suitable configuration.

FIG. 31 is a part of a schematic diagram of the order management table 2807. With the order management table 2807, each order makes one record.

Reference numeral 3101 denotes an order code capable of uniquely identifying each printout order to the printout service provider computer 2330. The order code 3101 is issued at the time of activating the order reception means 2802, and is used for identifying orders at the time of processing with the order reception means 2802, printing data creating means 2803, and printing control means 2804.

Reference numeral 3102 denotes a contents provider code for the code of the contents provider storing the contents to be printed by the printout order. The contents provider code 3102 is obtained by analyzing the parameters to be handed over at the time of activating the order reception means 2802, and is stored with the order code at the time of issuing the order code.

Reference numeral 3103 denotes a contents address storing the location of the actual contents in an external computer, such as the contents provider computer 2320 which is where the actual contents to be printed out by the printout order are collected, or the data center 2340. The contents address 3103 is extracted from the contents printout information at the time of the order reception means obtaining the contents printout information from the contents provider computer 2320 or the data center 2340, and is stored.

Reference numeral 3104 denotes a status managing the state of progression of the printout order. In the present embodiment, the status 3104 contains one of the following statuses as the state of progression:

① "Ordering", meaning that the printout order is in the reception stage;

② "Gathering image", meaning that the printout data is being created by the printing data creating means 2803;

③ "Standby for printing", meaning that all contents and other information necessary for the printout have been stored in the printing spool 2808 and that preparations for printing have been completed; and.

④ "Printing", meaning that the print order data stored in the printing spool 2808 by the printing control means 2804 has been transmitted to the print servers 2350 or 2351, and that the flow has progressed to the printing processing stage.

⑤ "Printing completed", meaning that completion of printing has been notified by the printout servers 2350 or 2351, and that the printing processing has ended.

Reference numeral 3105 denotes an output destination printout server storing the printout server which performs the printing processing.

The above has been a description of the configuration of the necessary records as a description of the order management table 2807 according to the present embodiment. Note that information other than 3101 through 3105 is stored in a record in the order management table 2807, such as output printer, sheet size, sheet quality, number of copies to be printed, and further the ordering party, settlement information, etc., i.e., information relating to printing out the printout order. Also note that the present invention does not restrict in any way separating the components making up single records in the order management table 2807 according to the present embodiment into multiple tables, such as separating information which is not directly related to the printout, e.g., the ordering party, from information relating to the printout data, e.g., the contents address 3103, and making these into separate tables, or further separating the order progression state, as well. In the event that the table is to be separated and managed thus, the present invention can be realized by managing using multiple tables with order codes as keys, for example.

Now, returning to FIG. 31, reference numerals 3111, 3112, 3113, and 3114 illustrate examples of records in the order management table. These will be referred to in the following description of the embodiment as, for example, "order management record example 3111", and so forth.

<Printout Order Data>

Next, description of the printout order data which the printing data creating means 2803 within the printout service provider 2330 creates will be described with reference to FIG. 38.

Figure 38:
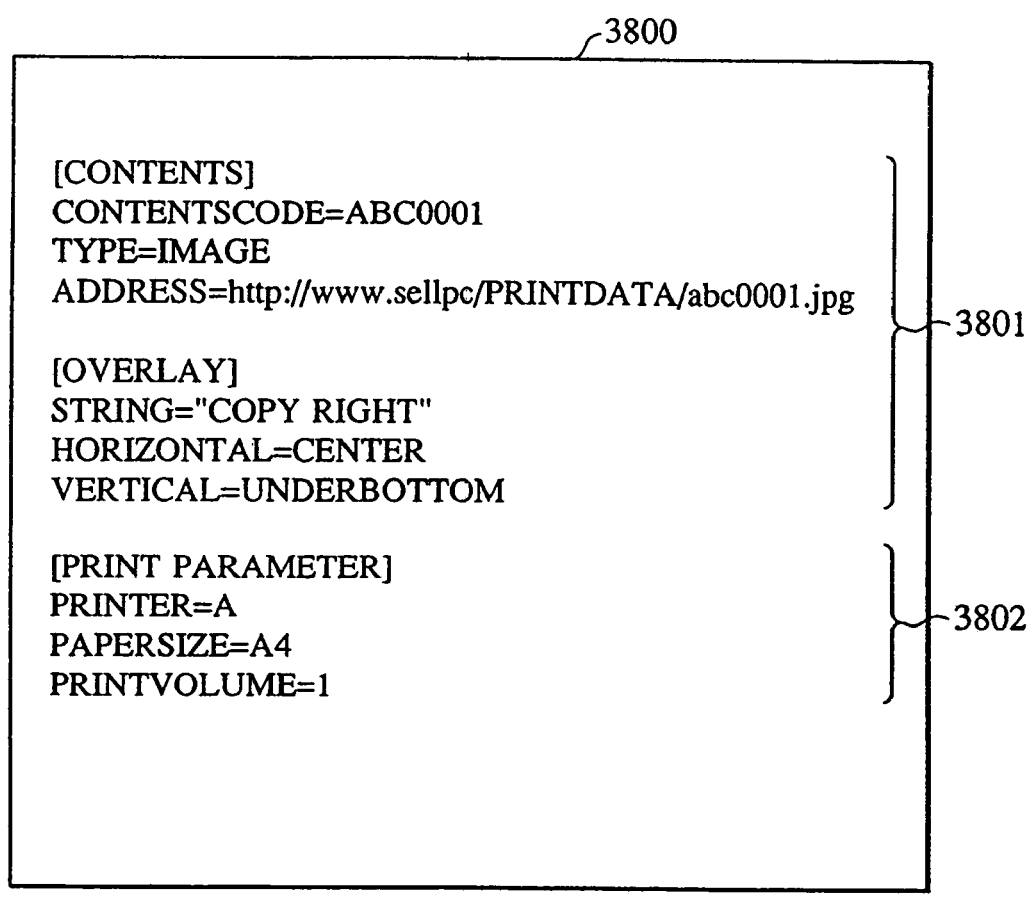
FIG. 38 is a diagram illustrating an example of printout order data according to the fifth and sixth embodiments.

In FIG. 38, reference numeral 3800 denotes printout order information, and with the present embodiment, this is supplied as a text data file. As with the contents printout information, the printout order information 3800 starts with an index item between the parentheses [ ] as shown in the figure, and is listed in "settings name=settings value" fashion following the index item.

Reference numeral 3801 denotes a contents information space listing information relating to the contents. There are two index items with the present embodiment indicating the contents information space 3801. The first index item "[CONTENTS]" lists contents code and the like, and the second index item "[OVERLAY]" lists overlay text strings which are printed along with the contents by overlaying at the time of printing contents, and the positions thereof. In FIG. 38, there are four settings under the first index item. The same items as with the contents information space 2901 within the contents printout information can be set for the contents information space.

"CONTENTSCODE=ABC0001" indicates that the object of the printout order data 3800 is the contents specified by the contents code "ABC0001"

"TYPE=IMAGE" indicates the type of contents, such as image or document, and in this case indicates that "ABC0001" is an image.

"ADDRESS=http://www.sellpc/PRINTDATA/abc0001.jpg" indicates that the location of the file "abc0001.jpg" which is the actual contents is "http://www.sellpc/PRINTDATA/abc0001.jpg".

The other index item "[OVERLAY]" of the contents information space 3801 lists the added data to be printed out along with the contents at the time of making the contents printout, and the position thereof.

"STRING="COPYRIGHT"" indicates added data. The text string in the quotes " " for the setting value is the text string that will be printed out along with the contents.

"HORIZONTAL=CENTER",

"VERTICAL=UNDERBOTTOM" define the position for the added data, and in the case in FIG. 38 means that the horizontal position is at the center and the vertical position is at the bottommost position.

Reference numeral 3802 denotes a printout information settings space listing printout conditions.

The printout information settings space 3802 according to the present embodiment is indicated by the index item "[PRINT PARAMETER]".

In FIG. 38, there are the following three setting items in the index item "[PRINT PARAMETER]". Items other than these three shown in FIG. 38 can be set for the printout information settings space 3802 with the present embodiment, such as printing on both sides, printing quality, etc.

"PRINTER=A" indicates that printer "A" is to perform the printout.

"PAPERSIZE=A4" indicates that the sheet size used for printing is to be A4.

"PRINTVOLUME=1" indicates that the number of printouts to be made order is 1.

<Flow of the Present System>

Next, the flow of processing with the present embodiment will be described with reference to FIG. 32 and other drawings.

Figure 32:
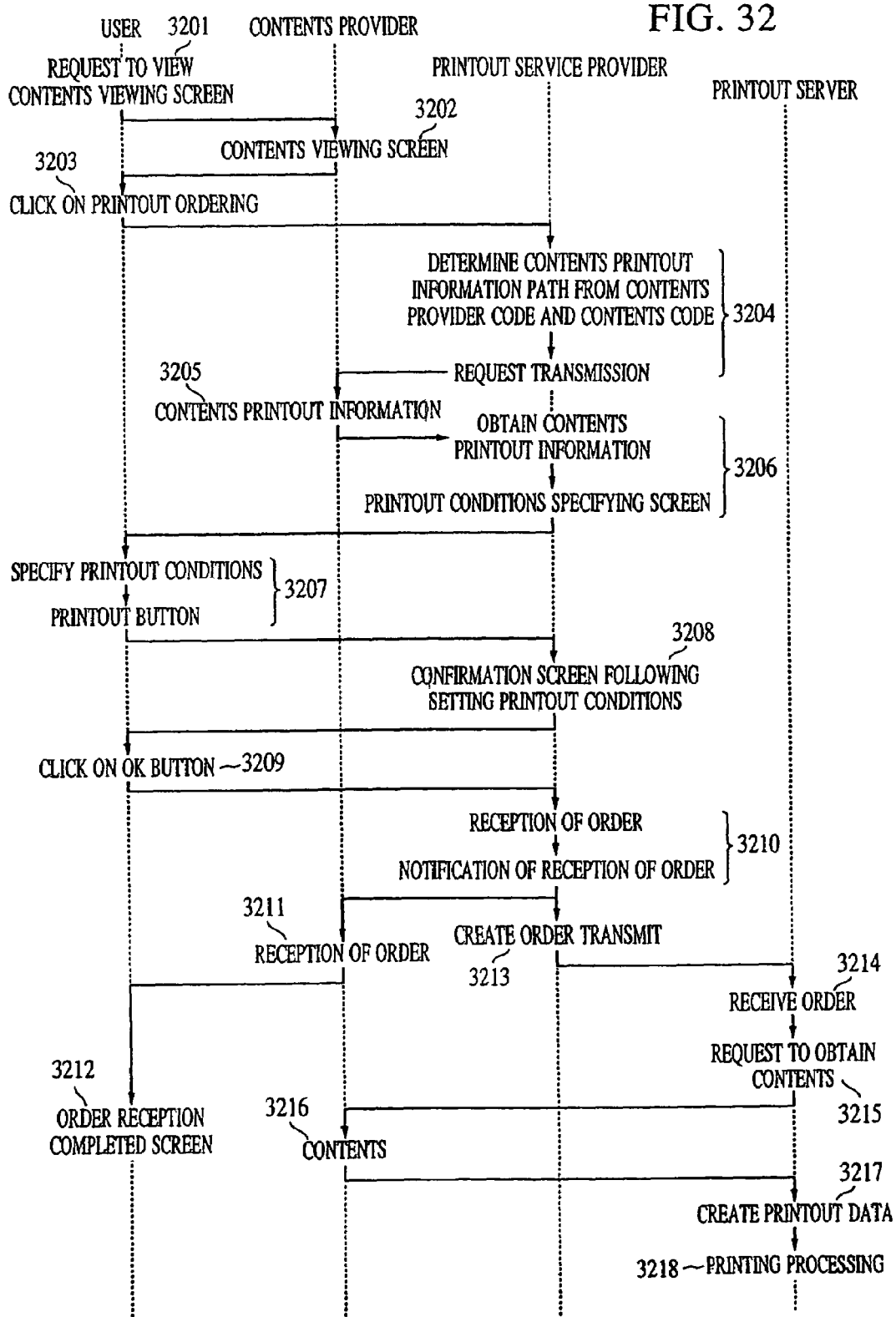
FIG. 32 is a flowchart of the processing occurring between the user computer, contents provider computer, printout service provider, and printout server, according to the fifth embodiment.

FIG. 32 is a processing flowchart for describing the flow occurring between the user computer 2310, contents provider computer 2320, printout service provider 2330, and the printout server 2350, according to the present invention. In the following description, the user uses the user computer 2310 to view the viewing screen within the contents provider 2320, and makes printout orders to the printout service provider 2330.

First, the user uses the document viewing means 2601 in the user computer 2310 to make a contents viewing screen display request to the contents provider computer 2320. The contents viewing screen display request specifies the URL of a contents viewing screen that the user desires to view, based on HTTP protocol. The URL is specified by the user using the KB 2408 to directly make input to the document viewing means 2601, or using some other means to this end such as selecting a link on the screen which is displayed by the document viewing means 2601 based on the HTML document. This processing is denoted by reference numeral 3201 in the figure.

The contents viewing screen display request issued by the user computer 2310 is received over the network 2300 by the document providing means 2701 in the contents provider computer 2320 via the NETIF 2404. Upon receiving the contents viewing screen display request, the document providing means 2701 transmits to the requesting user computer 2310 an HTML document stored in the contents viewing screen storing means 2704 corresponding to the specified URL, as well as viewing data stored in the contents storing means 2702 which is linked to in the HTML document. This processing is denoted by reference numeral 3202 in the figure.

The document viewing means 2601 within the user computer 2310, upon receiving the HTML document and the viewing data, performs display of the contents viewing screen based on the HTML document.

Now, a description will be given of the contents viewing screen, with reference to FIGS. 33A and 33B.

Figure 33A:
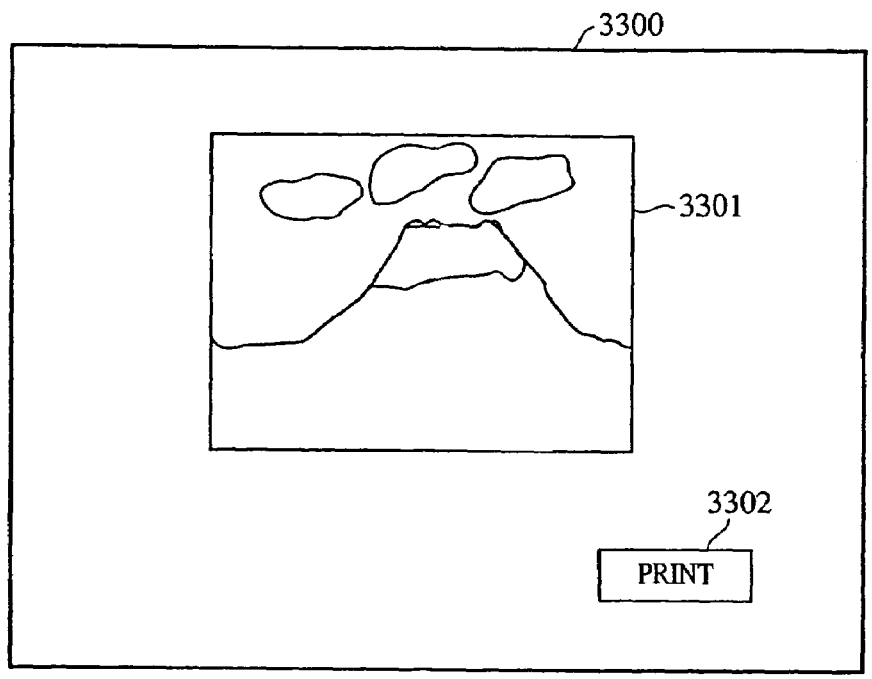
FIG. 33A is an example of a contents viewing screen according to the fifth and sixth embodiments.
Figure 33B:
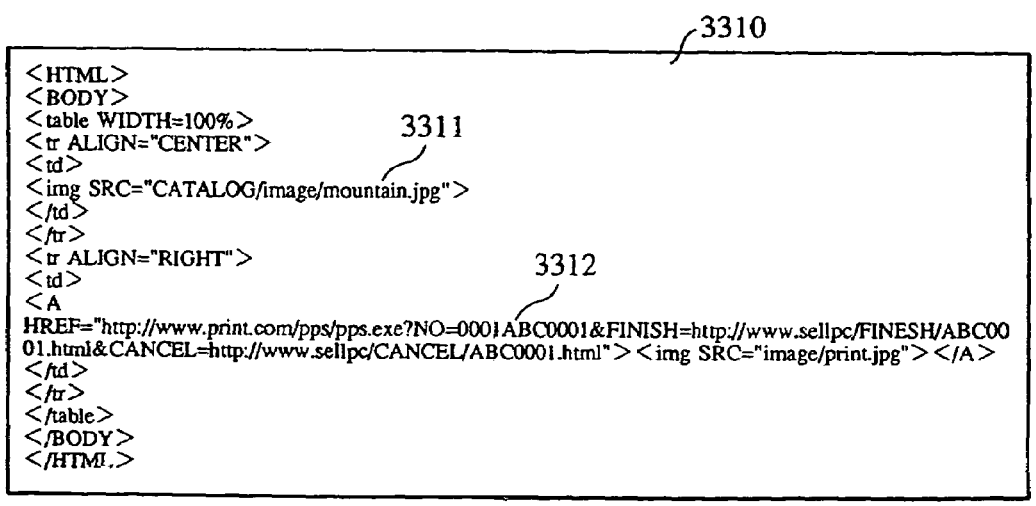
FIG. 33B is an example of an HTML document described so as to display the viewing screen, transmitted from the contents provider computer.

FIG. 33A is an example of a contents viewing screen, and FIG. 33B is an example of an HTML document described so as to display this contents viewing screen, transmitted from the contents provider computer 2320.

In FIG. 33A, reference numeral 3300 denotes a contents viewing screen to be displayed on the user computer 2310 in the preset embodiment.

Reference numeral 3301 denotes a viewing screen using the contents viewing data displayed on the screen, with the contents viewing data being transmitted from the contents storing means 2702 within the contents provider computer 2320, and the document viewing device 2601 performing display on the main screen.

Reference numeral 3302 denotes a printout commissioning button for commissioning a printout of the contents displayed on this screen to the printout service provider computer 2330.

In FIG. 33B, reference numeral 3310 denotes an HTML document describing the display form of the contents viewing screen 3300, links, etc., and reference numeral 3311 denotes a viewing display instruction statement described so as to display images, which has described therein the location of the viewing data according to the present embodiment and the image file name.

Reference numeral 3312 denotes a print button display instruction statement describing displaying of the print button and action instructions given to the document viewing means 2601 in the event that an action instruction such as clicking the print button has been performed. The description "http://www.print.com/pps/pps.exe" in the print button display/action instruction statement is the activation instruction part for the CGI program which is the order reception means 2802, instructing the printout service provider computer 2330, and "NO=0001ABC0001" is the first parameter for activating the order reception means 2702. Multiple parameters can be specified using "&", and the second parameter is "FINISH=http://www.sellpc/FINISH/ABC0001.html". In the same manner, the third parameter is "CANCEL=http://www.sellpc/CANCEL/ABC0001.html".

The first parameter of the present embodiment is configured of the contents provider code stored in the contents provider code 3001 in the contents provider management table 2805 and the contents code stored in the contents printout information 2900. The second and third parameters are the returning designations to the screen provided by the contents provided following completion of the order reception, with the second parameter being for cases wherein the order reception has been completed successfully, and the third parameter being a return destination in the event that the order reception is not completed due to the user canceling or other causes such as communication problems or the like, which causes an HTML document retrieval by HTTP protocol in the present embodiment.

The second and third parameters will be used in later-described processing, and accordingly are kept for later reference by, for example, saving in the work area of the HDD 2409 as a text file, or the like.

Returning to FIG. 32, in the state that the contents viewing screen 3300 is displayed, in the event that the user desires a printout of the actual contents of the viewing screen 3301 displayed on the screen, the user makes instructions to the printout commissioning button on the screen from the KB 2408. In response to the instructions to the printout commissioning button 3302, the document viewing means 2601 transmits an activation request for the order reception means to the printout service provider computer 2330 as described in the print button display/action instruction statement 3312. This processing is denoted by reference numeral 3203 in the figure.

The document providing means 2801 within the printout service provider 2330 activates the order reception means 2802 in the event that the order reception means activating instructions and parameters have been received, and hands the parameters to the order reception means 2802.

The order reception means 2805 analyzes the parameters, determines the contents provider code and contents code from the first parameter, performs a search of the contents provider management table 2805 with the contents provider code determined by the parameters, and generates a contents printout information path using the contents code determined by the search results recording and the parameters. The second and third parameters are stored in the work area of the HDD 2409 as a text file. Next, the generated contents printout information path is used to make an obtaining request of the contents printout information 2900 to the contents provider computer 2320. This processing is denoted by reference numeral 3204 in the figure.

Upon receiving the obtaining request for the contents printout information, the document providing device 2701 within the contents provider computer 2320 searches within the contents printout information storing means 2703 and transmits the contents printout information which is the search results to the printout service provider computer 2330. This processing is denoted by reference numeral 3205 in the figure.

The order reception means 2802 within the printout service provider computer 2330 issues an order code, and creates a new record for the order management table 2807 with the order code 3101, the contents provider code 3102, the contents address 3103 obtained from the received contents printout information, and the status 3104 as "Ordering", as with the order management record example 3114.

Next, the print information 2902 within the contents printout information 2900 is obtained, settings items matching the range of restriction listed in the information are obtained from the printout service management table 2806, and these are described in an HTML document for performing display of the printout conditions specifying screen which is the output of the order information.

Next, viewing data is obtained with the viewing data address listed in the contents information space 2901, and in the event that information relating to overlays exists therein, synthesizing is performed according to the information, and this is saved in the work area of the HDD 2409 as a preview image for display on a later-described print conditions specifying screen, along with adding the saved location thereof in a predetermined position in the HTML document for displaying the printout conditions specifying screen. Also, the overlay information is provided with an order code or a file name which would allow it to be searched from the order management table 2807, and saved in the printing spool 2808.

Then, the HTML document described so as to display the printout conditions specifying screen on the user computer 2310 is transmitted to the user computer 2310 via the document providing means 2801. This processing is denoted by reference numeral 3206 in the figure.

The document viewing means 2601 in the user computer 2310 displays the printout conditions specifying screen based on the received HTML document.

Figure 34:
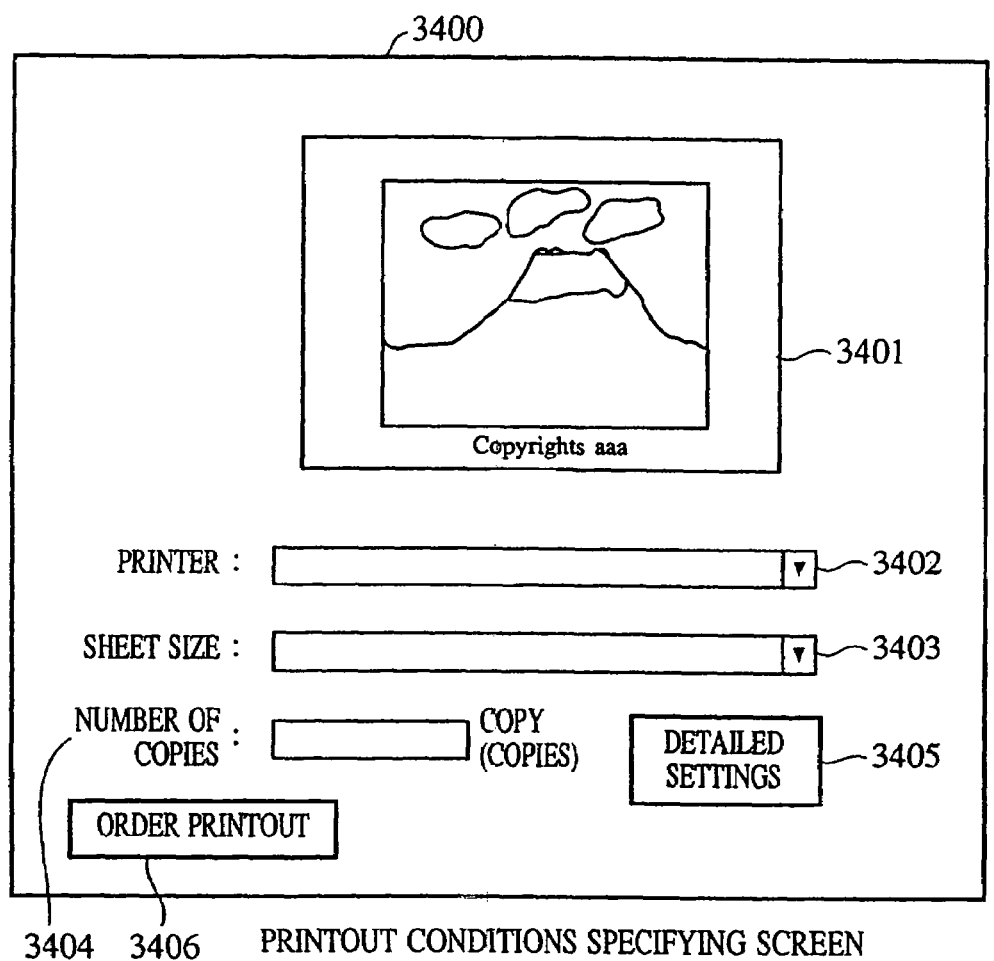
FIG. 34 is an example of a printout conditions specifying screen which document viewing means 2601 of a user computer 2310 displays according to the fifth and sixth embodiments.

FIG. 34 illustrates the printout conditions specifying screen which the document viewing means 2601 in the user computer 2310 displays.

In FIG. 34, reference numeral 3400 denotes the printout conditions specifying screen displayed according to the present embodiment.

Reference numeral 3401 denotes the preview image of the contents to be displayed in this screen. The preview image 3401 is an image in a state of reflecting overlay information and the like with the order reception means 2802. That is to say, the printout results are displayed as a preview.

Reference numeral 3402 denotes a printer selection space for selecting the printer to perform the printout of the contents. The printer selection space 3402 is configured such that the user can only select printers capable of performing the printout, by the order reception means 2802 selecting printers capable of performing the printout from the contents printout information 2900 and the printout service management table 2806 and assembling a list of the printers capable of performing the printout into the HTML document.

Reference numeral 3403 denotes a sheet selection space for selecting the printing sheet for performing the printout of the contents upon. The sheet selection space 3403 is configured such that the user can only select sheets on which the printout can be made, by the order reception means 2802 selecting printing sheets for performing the printout from the contents printout information 2900 and the printout service management table 2806 and assembling a list of the printing sheets for performing the printout into the HTML document.

Reference numeral 3404 denotes a printout copy number specifying space.

Reference numeral 3405 denotes a detailed settings link button 3405 which calls up a detailed settings screen capable of performing detailed settings other than those which can be set by the printout conditions specifying screen 3400, such as enlarging or reducing, setting the printout sheet quality, etc. Details of the detailed settings link button 3405 will be omitted in the description the present embodiment.

Reference numeral 3406 denotes a printout ordering button for ordering printouts.

Now, let us return to FIG. 32 and continue with the description of the state transition.

The user uses the printout conditions specifying screen 3400 which the document viewing means 2601 in the user computer 2310 displays to set the output destination printer, sheet size, and number of copies. Also, if necessary, the user uses the detailed settings link button 3405 to call up the detailed settings screen and makes detailed settings thereby, and then returns to the main screen to make printout conditions settings.

Once the user has confirmed the settings, clicking on the printout ordering button 3406 causes the document viewing means 2601 to transmit an activation instruction to the order reception means 2802 within the printout service provider computer 2330 which is the link destination listed in the HTML document. The printout conditions set at the printout conditions specifying screen 3400 and the detailed settings screen at the time of transmitting the activation instructions, and the order code assembled into the printout conditions specifying screen 3400 beforehand, are transmitted together. This processing is denoted by reference numeral 3207 in the figure.

The document providing means 2801 within the printout service provider computer 2330 activates the order reception means 2802 again. The order reception means 2802 searches the order management table 2807 for a record having the order code within the parameters, and sets the printout conditions within the record obtained by the search. Then, a confirmation screen HTML document, for displaying a confirmation screen whereby the user confirms the intent to execute the printout under the printout conditions which the user has set, is transmitted to the user computer 2310 via the document providing means 2801. This processing is denoted by reference numeral 3208 in the figure.

The document viewing means 2601 within the user computer 2310, upon receiving the confirmation screen HTML document, displays the confirmation screen.

Figure 35:
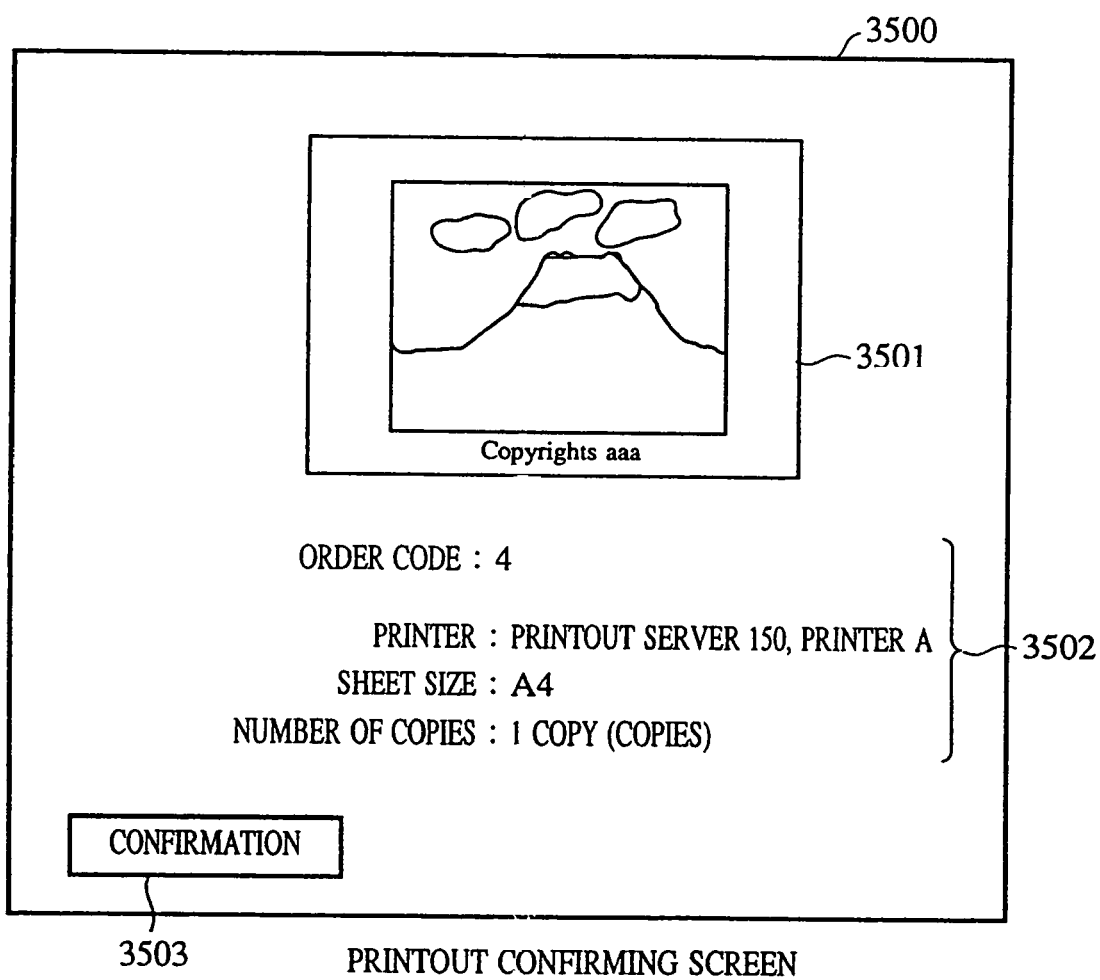
FIG. 35 is an example of a confirmation screen display according to the fifth and sixth embodiments.

FIG. 35 illustrates an example of a confirmation screen display. In FIG. 35, reference numeral 2500 denotes the confirmation screen.

Reference numeral 3501 denotes a preview image, the same as the preview image 3401 displayed in the printout conditions settings screen 3400. The preview image 3501 more suitably serves as a preview display by making a preview display under the conditions written to the order management table 2807 whereby the actual printout will be made, at the point of the order reception means 2802 receiving the printout conditions.

Reference numeral 3502 denotes a printout conditions confirmation space, displaying printing conditions set by the order reception means 2802 to the order management table 2807, order code whereby the order can be uniquely identified, and so forth. Reference numeral 3503 denotes a confirmation button.

Returning to FIG. 32, following making confirmation of the preview image 3501 and the printout conditions 3502, the user clicks this button so as to confirm the printout order, thereby giving order confirming instructions to execute printing out, to the printout order reception means 2802. This processing is denoted by reference numeral 3209 in the figure.

Based on the order confirmation instructions, the document providing means 2801 within the printout service provider 2330 searches within the order management table 2807 for records having the order code received as a parameter, and sets "creating data" for the status 3104 of the record once it has been found.

Then, the order reception means 2802 calls up the second parameter stored in the HDD 2409 in 3204 as described above, and makes a request to the contents provider computer 2320 so as to display the HTML document at the URL listed in the second parameter on the user computer 2310. In the event that a direct request to the contents provider computer 2320 is difficult due to restrictions in HTTP protocol or HTML document format, an arrangement may be made wherein, for example, an HTML document embedded with a link to the second parameter is transmitted to the user computer 2310. Describing the document so as to automatically perform a transmission request for the page of the second parameter enables the screen stored in the contents provider computer 2320 to be displayed.

Next, the order reception means 2802 activates the printing data creating means 2803, and finishes processing. This processing is denoted by reference numeral 3210 in the figure.

The document providing means 2701 of the contents provider computer 2320 searches, from the contents viewing screen storing means 2704, the HTML document regarding which a transmission request has been made in 3210 from the printout service provider computer 2330 to the-user computer 2310, and transmits the HTML document found as a result of the search to the user computer 2310. This processing is denoted by reference numeral 3211 in the figure.

The document viewing means 2601 of the user computer 2310 displays the order reception completion screen based on the HTML document received from the contents provider computer 2320. The order reception completion screen displays a message to the effect that the printout order has been received, a link for continuing viewing contents with the contents provider computer 2320, and so forth. This processing is denoted by reference numeral 3212 in the figure.

On the other hand, at the printout service provider computer 2330, the printing data creating means 2803 activated in the processing in 3210 receives the order code as a parameter at the time of activation, and accordingly searches the order management table 2807 by order code, sets "creating data" to the status 3104 of the record which is the results of the search, obtains the contents address 3103 and creates printout order data 3800, and stores this in the printing spool 2808. Next, the status 3104 of the corresponding record in the order management table 2807 is set to "Standby", a request is made to the printing control means 2804 to transmit printout order data to the printout server, and the processing ends.

The printing control means 2804 first searches for the records within the order management table 2807 wherein the status 3104 is "Standby", and obtains as the search results, the order code string. Next, one order code is extracted from the order code string according to predetermined rules, printout order data corresponding to the code is obtained from the printing spool 2808, and the printout order data is transmitted along with the order code to the printout server corresponding to the output destination printout server 3105. Next, the status 3104 is set to "Standby". This processing is denoted by reference numeral 3213 in the figure.

The order managing means 2350 within the printout server 2350, upon receiving the printout order data, saves the received printout order data and the order code in the HDD 2409, and activates the printing means 3702. At the time of activation, the location of the printout order data that has been saved is notified to the printing means 3702. This processing is denoted by reference numeral 3214 in the figure.

The printing means 3702 reads the printout order data from the notified location into the RAM 2402, extracts the location of the actual contents from the data, and makes a request for obtaining the actual contents to the contents provider computer 2320 where the actual contents exist. This processing is denoted by reference numeral 3215 in the figure.

Upon receiving the request for obtaining the actual contents from the printout server 2350, the document providing device 2701 within the contents provider computer 2320 obtains the contents regarding which the request for obtaining was made from the contents storing means 2702, and transmits the contents to the printout server 2350. This processing is denoted by reference numeral 3216 in the figure.

The printing means 3702 of the printout server 2350, upon receiving the contents, creates printout data from the printout order data read into the RAM 2402 and the received contents. This processing is denoted by reference numeral 3217 in the figure.

Next, the printing means 3702 transmits the printout data to the printer which is the output destination thereof, and thus printing is performed. Once the printing has been completed, notification of completion is made to the location of the printout order data within the HDD 2409 and the order managing means 3701, and the processing ends.

The order managing means 3701 makes notification to the printout service provider 2330 along with the order code corresponding to the location of the printout order data. This processing is denoted by reference numeral 3218 in the figure.

Upon receiving the notification of completion of printing, the printing control means 2804 in the printout service provider 2330 searches the order management table 2807 with the order code which has been received, and the status 3104 of the found record is set to "Printing completed".

Thus, a printout of the actual contents within the contents provider computer 2320 is realized by printout instructions from a contents viewing screen stored in the contents provider computer 2320.

Sixth Embodiment

Next, as the sixth embodiment, a description will be made regarding the procedures for the user computer 2311 described with reference to FIG. 23 in the fifth embodiment to display a contents viewing screen stored in the contents provider computer 2321, and to issue a printout order from this contents viewing screen. A major difference between the present embodiment and the fifth embodiment is that the actual contents and the contents printout information is not stored in the contents provider computer but in a data center 2340, and is distributed to a printout service provider. The following is a description thereof with reference to FIG. 36 and other drawings.

<Processing Flow in the Sixth Embodiment>

Figure 36:
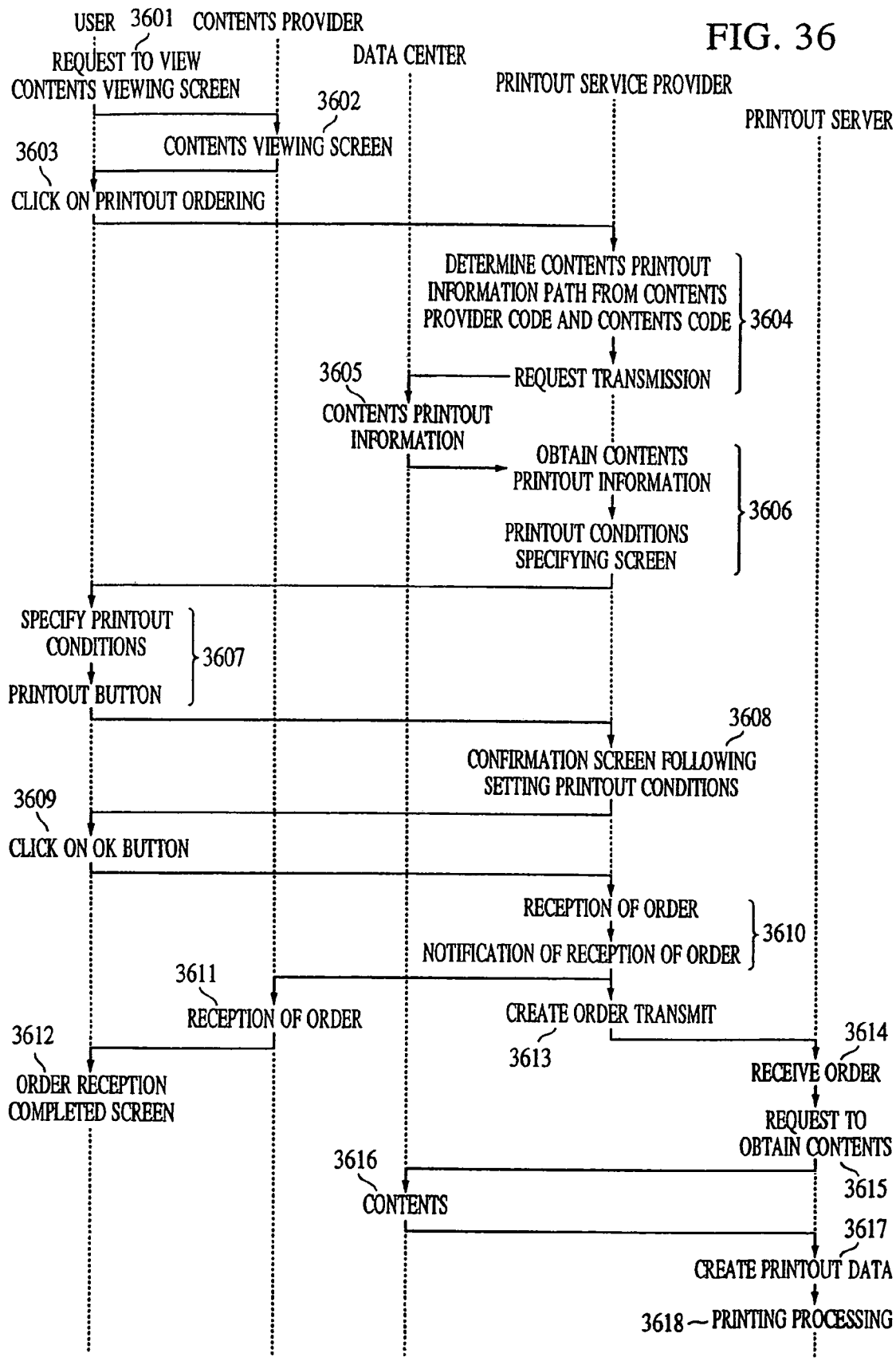
FIG. 36 is a flowchart of the processing occurring between the user computer, contents provider computer, data center, printout service provider, and printout server, according to the sixth embodiment.

FIG. 36 is a processing flowchart for describing the flow occurring between the user computer 2311, the contents provider computer 2321, the data center 2340, and the printout service provider 2330, according to the present embodiment. In the following description, the user uses the user computer 2311 to view the contents viewing screen within the contents provider 2321, and makes printout orders to the printout service provider 2330.

First, the user uses the document viewing means 2601 in the user computer 2311 to make a contents viewing screen display request to the contents provider computer 2321. The contents viewing screen display request specifies the URL of a contents viewing screen that the user desires to view, based on HTTP protocol. The URL is specified by the user using the KB 2408 to directly make input to the document viewing means 2601, or using some other means to this end such as selecting a link on the screen which is displayed by the document viewing means 2601 based on the HTML document. This processing is denoted by reference numeral 3601 in the figure.

The contents viewing screen display request issued by the user computer 2311 is received over the network 2300 by the document providing means 2701 in the contents provider computer 2321 via the NETIF 2404. Upon receiving the contents viewing screen display request, the document providing means 2701 transmits to the requesting user computer 2311 an HTML document stored in the contents viewing screen storing means 2704 corresponding to the specified URL, as well as viewing data which is linked to in the HTML document. This processing is denoted by reference numeral 3602 in the figure.

The document viewing means 2601 within the user computer 2311, upon receiving the HTML document and the viewing data, performs display of the contents viewing screen based on the HTML document, as described in the first embodiment with reference to FIGS. 33A and 33B. In the state that the contents viewing screen is displayed, in the event that the user desires a printout of the actual contents of the viewing image displayed on the screen, the user clicks the printout commissioning button on the screen. In response to clicking the printout commissioning button, the document viewing means 2601 transmits an activation request for the order reception means to the printout service provider computer 2330 as described in the print button display/action instruction statement. This processing is denoted by reference numeral 3603 in the figure.

The document providing means 2801 within the printout service provider 2330 activates the order reception means 2802 in the event that the order reception means activating instructions and parameters have been received, and hands the parameters to the order reception means 2802.

The order reception means 2802 analyzes the parameters, determines the contents provider code and contents code from the first parameter, performs a search of the contents provider management table 2805 with the contents provider code determined by the parameters, and generates a contents printout information path using the contents code determined by the search results recording and the parameters. The present embodiment differs from the first embodiment here in that the base address of the data center 2340 is stored in the base address 3002 in the contents provider management table 2805, so the contents printout information is obtained from the data center 2340. The second and third parameters are stored in the work area of the HDD 2409 as a text file. Next, the generated contents printout information path is used to make an obtaining request of the contents printout information to the data center 2340. This processing is denoted by reference numeral 3604 in the figure.

Upon receiving the obtaining request for the contents printout information, the document providing device 2701 within the data center 2340 searches within the contents printout information storing means 2703 for the corresponding contents print information and transmits the contents printout information which is the search results to the printout service provider computer 2330. This processing is denoted by reference numeral 3605 in the figure.

The order reception means 2802 within the printout service provider 2330 which has obtained the contents printout information from the data center 2340 issues an order code, and creates a new record for the order management table 2807 with the order code 3101, the contents provider code 3102, the contents address 3103 obtained from the contents printout information, and the status 3104 as "Ordering".

Next, the print information 2902 within the contents printout information 2900 is obtained, settings items matching the range of restriction listed in the information are obtained from the printout service management table 2806, and these are described in an HTML document for performing display of the printout conditions specifying screen which is the output of the order information.

Next, viewing data is obtained with the viewing data address listed in the contents information space 2901, and in the event that information relating to overlay exists there, synthesizing is performed according to this information, and the synthesized data is saved in the work area of the HDD 2409 as a preview image to be displayed on a later-described printout conditions specifying screen, while the position where this has been saved is added to a predetermined position in the HTML document for displaying the printout conditions specifying screen. Also, the overlay information is provided with an order code or a file name which would allow it to be searched from the order management table 2807, and saved in the printing spool 2808.

Then, the HTML document described so as to display the printout conditions specifying screen on the user computer 2311 is transmitted to the user computer 2311 via the document providing means 2801. This processing is denoted by reference numeral 3606 in the figure.

The document viewing means 2601 in the user computer 2311 displays the printout conditions specifying screen based on the received HTML document, as shown in FIG. 34 described in reference to the fifth embodiment.

The user uses the printout conditions specifying screen which the document viewing means 2601 in the user computer 2311 displays to set the output destination printer, sheet size, and number of copies. Also, if necessary, the user calls up the detailed settings screen and makes detailed settings thereby, and then returns to the main screen to make printout conditions settings. Once the user has confirmed the settings, instructing the printout ordering button causes the document viewing means 2601 to transmit an activation instruction to the order reception means 2802 within the printout service provider computer 2330 which is the link destination listed in the HTML document. The printout conditions set at the printout conditions specifying screen and the detailed settings screen at the time of transmitting the activation instructions, and the order code assembled into the printout conditions specifying screen beforehand, are transmitted together. This processing is denoted by reference numeral 3607 in the figure.

The document providing means 2801 within the printout service provider computer 2330 activates the order reception means 2802 again. The order reception means 2802 searches the order management table 2807 for a record having the order code within the parameters, and sets the printout conditions within the record obtained by the search. Then, a confirmation screen HTML document, for displaying a confirmation screen whereby the user confirms the intent to execute the printout under the printout conditions which the user has set, is transmitted to the user computer 2311 via the document providing means 2801. This processing is denoted by reference numeral 3608 in the figure.

The document viewing means 2601 within the user computer 2311, upon receiving the confirmation screen HTML document, displays the confirmation screen such as shown in FIG. 35, described with regard to the fifth embodiment. Following making confirmation of the preview 3501 and the printout conditions 3502, the user clicks on this button, so as to confirm the printout order, thereby giving order confirming instructions to the printout order reception means 602. This processing is denoted by reference numeral 3609 in the figure.

Based on the order confirmation instructions, the document providing means 2801 within the printout service provider 2330 searches within the order management table 2807 for records having the order code received as a parameter, and sets "creating data" for the status 3104 of the record once it has been found.

Then, the order reception means 2802 calls up the second parameter stored in the HDD 2409 in 3604 as described above, and makes a request to the contents provider computer 2321 so as to display the HTML document at the URL listed in the second parameter on the user computer 2311. In the event that a direct request to the contents provider computer 2321 is difficult due to restrictions in HTTP protocol or HTML document format, an arrangement may be made wherein, for example, an HTML document embedded with a link to the second parameter is transmitted to the user computer 2310. Describing the document so as to automatically perform a transmission request for the page of the second parameter enables the screen stored in the contents provider computer 2321 to be displayed. Next, the order reception means 2802 activates the printing data creating means 2803, and finishes processing. This processing is denoted by reference numeral 3610 in the figure.

The document providing means 2701 of the contents provider computer 2321 searches, from the contents viewing screen storing means 2704, the HTML document regarding which a transmission request has been made in 3610 from the printout service provider computer 2330 to the user computer 2311, and transmits the HTML document found as a result of the search to the user computer 2311. This processing is denoted by reference numeral 3611 in the figure.

The document viewing means 2601 of the user computer 2311 displays the order reception completion screen based on the HTML document received from the contents provider computer 2321. The order reception completion screen displays a message to the effect that the printout order has been received, a link for continuing viewing contents with the contents provider computer 2321, and so forth. This processing is denoted by reference numeral 3612 in the figure.

On the other hand, at the printout service provider computer 2330, the printing data creating means 2803 activated in the processing in 2610 receives the order code as a parameter at the time of activation, and accordingly searches the order management table 2807 by order code, sets "creating data" to the status 3104 of the record which is the results of the search, obtains the contents address 3103 and creates printout order data 2800, and stores this in the printing spool 2808. Next, the status 3104 of the corresponding record in the order management table 2807 is set to "Standby", a request is made to the printing control means 2804 to transmit printout order data to the printout server, and the processing ends.

The printing control means 2804 first searches for the records within the order management table 2807 wherein the status 3104 is "Standby", and obtains as the search results, the order code string. Next, one order code is extracted from the order code string according to predetermined rules, printout order data corresponding to the code is obtained from the printing spool 2808, and the printout order data is transmitted along with the order code to the printout server corresponding to the output destination printout server 3105. Next, the status 3104 is set to "Standby". This processing is denoted by reference numeral 3613 in the figure.

The order managing means 2350 within the printout server 2350, upon receiving the printout order data, saves the received printout order data and the order code in the HDD 2409, and activates the printing means 2702. At the time of activation, the location of the printout order data that has been saved is notified to the printing means 2702. This processing is denoted by reference numeral 3614 in the figure.

The printing means 2702 reads the printout order data from the notified location into the RAM 2402, extracts the location of the actual contents from the data, and makes a request for obtaining the actual contents to the data center 2340 where the actual contents exist. This processing is denoted by reference numeral 3615 in the figure.

Upon receiving the request for obtaining the actual contents from the printout server 2350, the document providing device 2710 within the data center 2340 obtains the contents regarding which the request was made from the contents storing means 2702, and transmits the contents to the printout server 2350. This processing is denoted by reference numeral 3616 in the figure.

The printing means 2702 of the printout server 2350, upon receiving the contents, creates printout data from the printout order data read into the RAM 2402 and the received contents. This processing is denoted by reference numeral 3617 in the figure.

Next, the printing means 2702 transmits the printout data to the printer which is the output destination thereof, and thus printing is performed. Once the printing has been completed, notification of completion is made to the location of the printout order data within the HDD 2409 and the order managing means 2701, and the processing ends.

The order managing means 2701 makes notification to the printout service provider 2330 along with the order code corresponding to the location of the printout order data. This processing is denoted by reference numeral 3618 in the figure.

Upon receiving the notification of completion of printing, the printing control means 2804 in the printout service provider 2330 searches the order management table 2807 with the order code which has been received, and the status 3104 of the found record is set to "Printing completed".

Thus, a printout of the actual contents within the data center 2340 is realized by printout instructions from a contents viewing screen stored in the contents provider computer 2321.

Seventh Embodiment

The fifth and sixth embodiments have been described with regard to an arrangement wherein printout requests issued from user computers 2310 and 2311 are made to a printout service provider computer 2330.

This seventh embodiment will be described with regard to an arrangement wherein the user computers 2310 and 2311 issue printout requests to contents provider computers 2320 or 2321, instead of the printout service provider computer 2330.

<System Configuration>

The system configuration will be described with reference to FIG. 23 which was used for describing the system configuration for the fifth and sixth embodiments.

FIG. 23 is a configuration diagram of the overall system according to embodiments of the present invention.

In FIG. 23, reference numerals 2310 and 2311 denote information processing devices (computer system comprising CPU, ROM, RAM, HDD, etc., as described later with reference to FIG. 24) for customers, which are users of the system according to the present embodiment, to perform direct operation from their homes, for example, and will hereafter be referred to as "user computers".

The user computers 2310 and 2311 have functions for viewing documents including contents of images and the like, and catalogs of contents, stored in later-described contents provider computers 2320 and 2321 via a network 2300, and also have functions for placing orders for printing orders to the contents provider computers 2320 and 2321 by using a printing order button contained in the document. Note that though the number of user computers connected in the present embodiment is two, with the present invention the number of user computers connected is not restricted in any way as long as one or more user computers are connected.

Reference numerals 2320 and 2321 denote information processing devices for contents providers which provide contents such as images and documents to carry out various services, and will hereafter be referred to as "contents provider computers" or simply "contents providers".

The contents provider computers 2320 and 2321 have functions for providing user computers 2310 or 2311 with documents including contents of images, documents, and the like, and catalogs of contents (hereafter may be referred to as "contents viewing screen") via the network 2300, and functions for supplying documents realizing a printout order screen based on requests from the user computers 2310 or 2311, receiving printout settings from the screen, creating a printout order, and making a printout commission to the printout service provider computer 2330 based on the printout order. The contents provider computers 2320 and 2321 also have functions for supplying the printout service provider 2330 with contents (hereafter may be referred to as "merchandise" or "actual contents") and the like, and functions for obtaining from the printout service provider computer 2330 information relating to the printout service, making up the printout order screen. Note that though the number of contents provider computers connected in the present embodiment is two, with the present invention the number of contents provider computers connected is not restricted in any way as long as one or more contents provider computers are connected. Also, though in the present embodiment each contents provider operating entity is described as operating one contents provider computer for the sake of description of the invention, there are no restrictions whatsoever on this number; rather, the contents provider operating entities may operate two or more contents provider computers for the purpose of dispersing loads or handling different contents.

Reference numeral 2330 denotes an information processing device which performs printing processing based on printout order commissions from the contents provider computers 2320 and 2321, and is referred to as a "printout service provider computer", or simply as a "printout service provider".

The printout service provider 2330 has the functions of receiving printout orders based on requests from the contents provider computers 2320 and 2321, transmitting to the later-described printout servers 2350 or 2351 which are the output destinations thereof in accordance with the printout order, and supplying information relating to the printout service to the contents provider computers 2320 and 2321.

Note that though in the present embodiment each printout service provider operating entity is described as operating one printout service provider computer for the sake of description of the invention, there are no restrictions whatsoever on this number; rather, the printout service provider operating entities may operate two or more printout service provider computers for the purpose of dispersing loads or the like.

Reference numeral 2340 denotes an information processing device holding actual contents described in a document containing contents catalog pages to be disclosed by the contents provider computers 2320 or 2321, and will be referred to as a "data center computer" or "data center".

The data center computer 2340 has the functions for, in the event that the user views a contents viewing screen, which is a contents catalog at the contents provider computer 2320 or 2321 and executes a printout order to the printout service provider computer 2330 for the actual contents in the viewing screen, transmitting, the actual contents requested by the printout server 2350, and functions for transmitting data necessary for printout and printout orders, such as contents printout information, to the contents provider computers 2320 or 2321.

Note that though in the present embodiment each data center operating entity is described as operating one data center computer for the sake of description of the invention, there are no restrictions whatsoever on this number; rather, the data center operating entities may operate two or more data center computers for the purpose of dispersing loads or the like. Also, the present invention does not restrict the number of data centers connected in any way.

Reference numerals 2350 and 2351 denote printout servers for receiving printout orders from the printout service provider 2320, obtaining actual contents from the contents provider computer 2320 or data center computer 2340 in accordance with the printout orders, and performing printing processing of the actual contents.

Now, in the present embodiment each printout server is described as operating one computer for the sake of description of the invention, there are no restrictions whatsoever on this number; rather, the printout server operating entities may operate two or more printout servers for the purpose of dispersing loads or the like. Also, note that though the present embodiment is described with the number of printout servers connected as one, the present invention does not restrict the number of data centers connected in any way.

Reference numeral 2300 denotes a connecting device for connecting the user computers 2310 and 2311, the contents provider computers 2320 and 2321, the printout service provider computer 2330, the data center computer 2340, and the printout servers 2350 and 2351, the connecting device representing a network system such as the Internet or a Local Area Network (LAN), hereafter described simply as "network". Also, with the present embodiment, the Internet which is commonly used is employed as the network 2300, but the present invention can be realized using other network systems, as well.

Also, with the present embodiment, description will be made under the assumption that actual contents to be printed out exist in the contents provider computer 2320. As for the contents provider computer 2321, a contents catalog screen is held therein, and the contents printout information which is actual contents and accompanying information to the contents as described later, and the information necessary for printouts and printout orders, are stored in the data center 2340.

Also, printout orders from the contents viewing screen of the contents provider 2321 will be described later in the eighth embodiment.

<Block Diagram of User Computer, Contents Provider Computer, and Data Center>

As already described with reference to the fifth and sixth embodiments, FIG. 24 is a block diagram illustrating the hardware configuration of the information processing devices listed in the present embodiment. Incidentally, with the present embodiment, there is no difference between the user computers 2310 and 2311, contents provider computers 2320 and 2321, the printout service provider 2330, and the data center 2340, regarding internal configuration, and there is no difference with those described with reference to the fifth and sixth embodiments, so description thereof will be omitted.

<Block Diagram of Printout Service Provider Computer>

FIG. 25 is a block diagram illustrating the hardware configuration of the printout service provider computer 2330 according to the seventh embodiment. There is no difference with the printout service provider computer 2330 described with reference to the fifth and sixth embodiments, so description thereof will be omitted.

<Configuration of User Computer>

FIG. 26 is an explanatory diagram representing the software configuration of the user computer 2310 which is the information processing device which the user actually uses. The user computer 2311 is also of the same configuration. Further, there is no difference in FIG. 26 as described with reference to the fifth and sixth embodiments, so description thereof will be omitted.

<Configuration of Contents Provider Computer and Data Center Computer>

Figure 39:
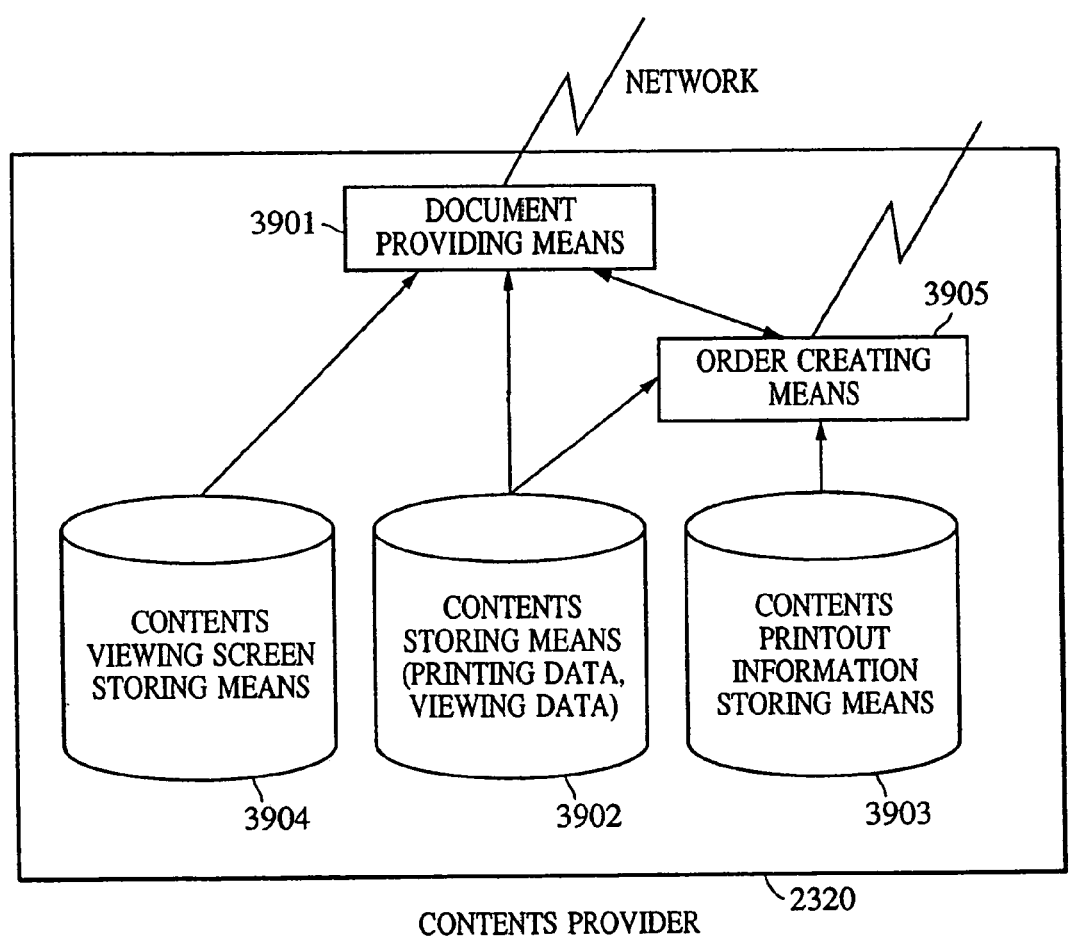
FIG. 39 is a diagram illustrating the software configuration of the contents provider computer and data center according to the seventh and eighth embodiments.

FIG. 39 is a configuration diagram illustrating the processing means and management data within the contents provider computer 2320. The contents provider computer 2321 and data center 2340 are of approximately the same configuration, and accordingly, description thereof will be made from FIG. 39 as well.

In FIG. 39, reference numerals 3901 and 3905 denote application programs, which are read in from the ROM 2403, HDD 2409, or FDD 2410, rendered at the RAM 2402, and thus used.

Reference numerals 3902, 3903, and 3904 denote data stored within the HDD 2409.

The document providing means 3901 is an application program enabling searching HTML documents, text, images, etc., from the data stored in the HDD 2409 as described later, upon requests therefor from an external computer such as the user computers 2310 and 2311 or the printout service provider computer 2330 via a network such as the Internet, and transmitting the file that has been found. The document providing means 3901 is generally called an Internet server program or WWW server program, and is an application program which enables, in addition to the above transmitting of documents, applications programs stored within the HDD 2409 to be rendered at the RAM 2402 and used upon request from external computers, and performing user ID certification of users making external requests and restricting data to be transmitted, as necessary.

Reference numeral 3902 denotes contents storing means for storing actual contents such as images and documents to be printed at the printout server 2350, and viewing data to be displayed on the computer of the user as a preview of the contents. The viewing data is, in the case of an image for example, an image wherein the resolution has been reduced to the extent that screen display can be made. In the case of a document, a summarized text or an image whereby the first page can be displayed, is used. The present invention does not particularly restrict viewing data.

The data in the present means is stored in the HDD 2409, with the document providing means 3901 performing searches upon requests from external computers such as the user computers 2310 and 2311 or the printout server 2350, and transmitting the data thereto.

Reference numeral 3903 denotes contents printout information storing means for storing contents printout information describing, for example, various restrictions regarding contents such as printing size and number of copies to be printed, various restrictions regarding printout conditions such as sheet size for printing out and printing quality, and other information necessary for printout ordering and printing processing, at the time of printing out the actual contents stored in the contents storing means 3902.

The data in the present means is stored in the HDD 2409, with a later-described order creating means 3905 performing searches and making reference in the means.

Reference numeral 3904 denotes contents viewing screen storing means for storing HTML documents for displaying screens (contents viewing screens) for the users to view contents viewing data stored in the contents storing means 3902 on the user computers 2310 and 2311, and perform printout commissioning.

The data in the present means is stored in the HDD 2409, with the document providing means 3901 performing searches of the means upon requests from external computers such as the user computers 2310 and 2311 and so forth, and transmitting the data thereto.

The order creating means 3905 is an application program group for performing reception of contents printout orders issued from the user computers 2310 and 2311 at the contents provider computers 2320 and 2321.

The functions of the order creating means 3905 can be generally divided into four stages.

As the first stage, the order creating means 3905 is activated by a printout order request issued by the user computers 2310 or 2311, determines the contents regarding which a printout request has been made, obtains contents printout information of the contents necessary for reception of the order, from the contents printout information storing means 3903 or the data center computer 2340, and further obtains later-described printout service information from the printout service provider computer 2330, thereby generating an HTML document for displaying a printout conditions specifying screen whereby settings for printing out are made, which is transmitted to the user computers 2310 or 2311 issuing the printout order request.

The second stage is a function for being activated by printout conditions settings requests issued along with the various printout conditions settings, according to the printout conditions screen displayed on the user computer 2310 or 2311 which is the transmission destination of the HTML document, generating printout orders, and transmitting an HTML document to the user computer for displaying a printout confirmation screen.

The third stage is a function for generating printout order information by receiving a printout order completion notification issued from the user computers 2310 or 2311 by performing confirmation operation with the printout confirmation screen, and commissioning the printout service provider computer 2330 with a printout order.

The fourth stage is a function for being activated by the printout service provider computer 2330, and transmitting an HTML document to the user computer 2310 for displaying an order reception completion screen with the information transmitted from the printout service provider computer 2330, such as the order code for example, for making notification to the user, and reception notification of the printout order commission which was commissioned in the third stage.

As described above, the order creating means 3905 is an application program which is rendered to the RAM 2402 from within the HDD 2409 or the like by the document providing means 3901 based on requests from external computers and thus used, and is generally called a CGI program.

The above has been a description of the configuration of the contents provider computer 2320. Note that with the contents provider computer 2321 according to the present embodiment, contents printout information and actual contents are handled as existing on the data center computer 2340, and accordingly, the contents storing means 3902 and the contents printout information storing means 3903 are not indispensable components. In this case, the contents provider computer 2321 stores data describing the location of contents printout information stored in the contents printout information storing means 3903 within the data center 2340 (i.e., contents printout information location data). The contents printout information location data may exist in arbitrary storing means, such as the contents viewing image storing means 3904 of the contents provider computer 2321. With the present embodiment and the later-described fourth embodiment, the contents printout information storing means 3903 is handled as existing in the contents provider computer 2321, and the contents printout information location data in the contents printout information storing means 3903.

Further, with the present embodiment and the later-described eighth embodiment, in the contents provider computer 2321, the contents viewing data may be the contents viewing screen storing means 3904.

With regard to the data center computer 2340, the document providing means 3901 does not necessarily have to be a so-called WWW server; a File Transfer Protocol (FTP) server or the like may be used so long as the computer is capable of transmitting files to the printout service provider computer 2330. Further, the contents viewing screen storing means 3904 within the data center computer 2340 is not necessary for realizing the present invention, either.

<Configuration of Printout Service Provider Computer>

Figure 40:
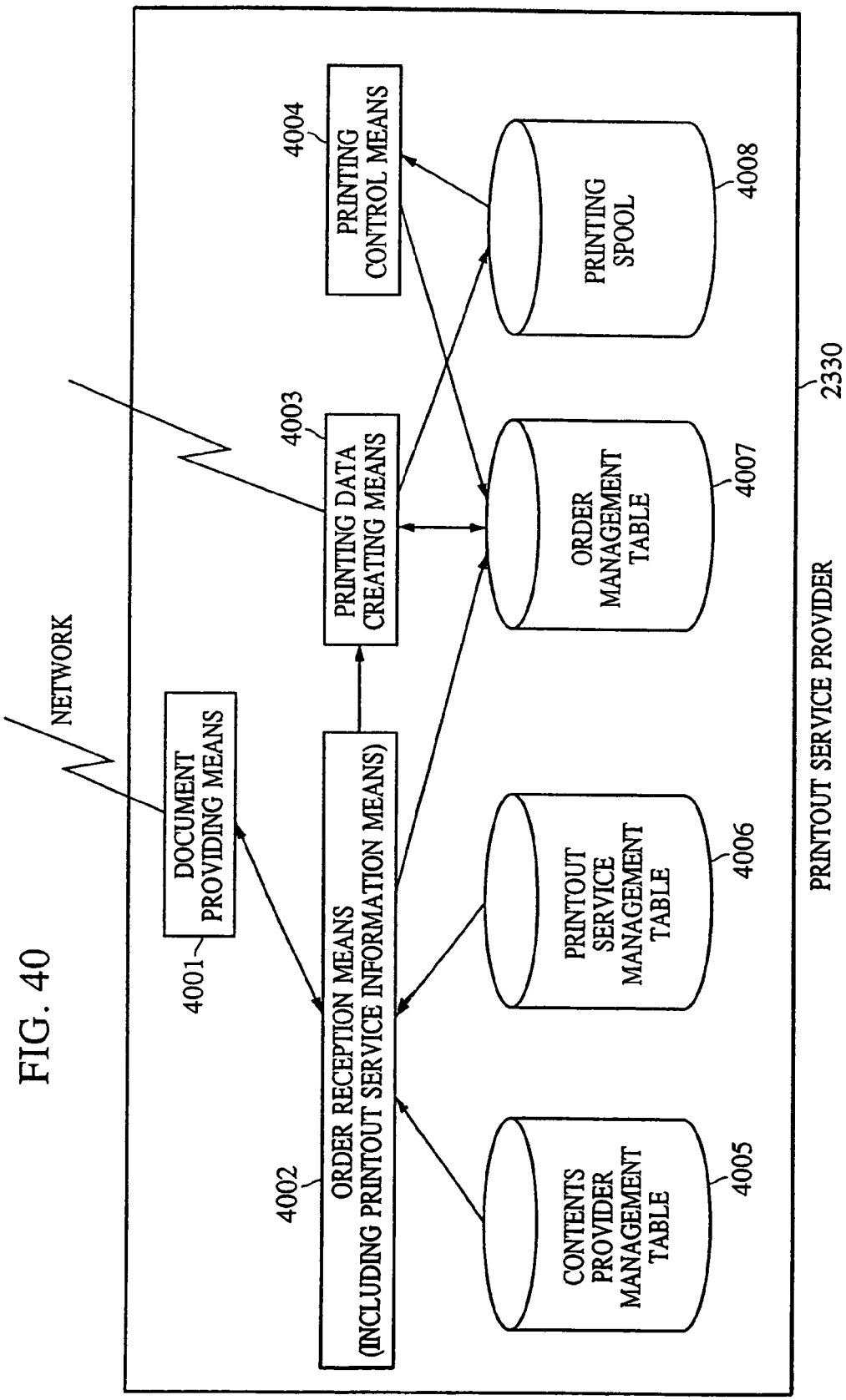
FIG. 40 is a diagram illustrating the software configuration of the printout service provider computer according to the seventh and eighth embodiments.

FIG. 40 is a configuration diagram illustrating the processing means and management data within the printout service provider computer 2330. In FIG. 40, the processing means 4001, 4002, 4003, and 4004 are application programs, read in from the ROM 2403, HDD 2409, or FDD 2410, rendered at the RAM 2402, and thus used. Reference numerals 4005, 4006, 4007, and 4008 denote data stored within the HDD 2409.

The document providing means 4001 is equal to the document providing means 3901, and is an application program enabling searching HTML documents, text, images, etc., from the data stored in the HDD 2409 as described later, upon requests therefor from external computers or contents provider computers 2320 and 2321 via a network such as the Internet, and transmitting the file that has been found. The document providing means 3901 is generally called an Internet server program or WWW server program, and is an application program which enables, in addition to transmission of documents, applications programs stored within the HDD 2409 to be rendered at the RAM 2402 and used upon request from external computers, the processing results to be transmitted, and performing user ID certification of users making external requests and restricting data to be transmitted, as necessary.

The order reception means 3902 is an application program group for performing reception of printout orders, activated by printout order commissions from the contents provider computers 2320 and 2321.

The functions of the order reception means 3902 can be generally divided into two stages.

As the first stage, the order reception means 3902 transmits printout service information stored in a later-described printout service management table 3906 in response to printout service information obtaining requests issued from the contents provider computers 2320 or 2321.

As the second stage, the order reception means 3902 is activated by the printout order requests issued from the contents provider computers 2320 or 2321, generates printout orders by the printout service information transmitted with the printout order commission, generates order information in a later-described printout order management table 3907, and transmits this to the printout server 2350, and activates the later-described printing data creating means 3903 for performing the printing preparation work.

As described above, the order reception means 3902 is an application program which is rendered to the RAM 2402 from within the HDD 2409 or the like by the document providing means 3901 based on requests from external computers, and is generally called a CGI program.

The printing data creating means 3903 is an application program which is rendered to the RAM 2402 from the HDD 2409 or the like by the order reception means 3902, and thus used.

After being activated by the order reception means 3902, the printing data creating means 3903 extracts records for creating printing data from the order management table 3907, creates printout order data enabling printing processing at the printout servers 2350 or 2351 according to the record, and saves this to a later-described printing spool 3908.

Reference numeral 3904 denotes printing control means for controlling printing by transmitting printout orders to printout servers 2350 or 2351 to realize the printing processing of the printout order data within the printing spool 2808, and receiving the state of progress of the printing processing from the printout servers 2350 or 2351. The printing control means 3904 is an application program which is rendered to the RAM 2402 from within the HDD 2409 or the like, and thus used. Activation of the printing control means 3904 occurs at the time of activation of the printing data creating means 3903, or at an arbitrary timing set by the operator of the printout service provider computer 2330 or automatically at set intervals by a timer.

The contents provider management table 3905 has the data structure described later with reference to FIG. 42, and stores the contents provider code which identifies the contents provider, the address of the contents provider computer or data center, and so forth.

The printout service management table 3906 is a table storing all printout service settings provided by the printout service provider computer 2330, and stores type of printer, printing conditions (sheet size, number of copies, paper quality, print quality, position, enlargement/reduction, two-side printing, binding direction and other layout information, post-printing work such as binding, laminating, covering, etc.), information regarding printing prices, and so forth.

Note that the printers registered in the printout service management table 3906 must be printers capable of performing printing processing according to printout orders received by the printout service provider computer 2330. The registered printout servers are the printout servers 2350 and 2351 connected to the network 2300, and the printers connected to the servers are registered by printer type.

The order management table 3907 has the data structure described with reference to FIG. 31 as described with the fifth embodiment, stores the printout order and accompanying information, and the state of progress of the order. The printing spool 3908 stores actual contents for realizing the printing of the printout order and other data necessary for printing.

<Configuration of Printout Server>

FIG. 37 is a configuration diagram illustrating the processing means and the management data within the printout server 2350. The printout server 2351 is of the same configuration. There is no difference here with the description made regarding the fifth and sixth embodiments, so description here will be omitted.

<Contents Printout Information>

Next, a description will be given regarding the contents printout information stored in the contents printout information storing means 3903 of the contents provider computer 2320 and data center computer 2340.

As described earlier, contents printout information is data describing information necessary for printout ordering and printing processing at the time of printing the contents which the contents provider has. Though the present invention does not particularly specify a particular data format or description format for the data, contents stored in the contents storing means 3902 that can be printed by the present invention must have contents printout information corresponding to the contents. Also, the present invention does not particularly stipulate the transfer method of contents printout information to the printout service provider. In order to describe the present invention in an even clearer manner, the present embodiment will be described as having one text file describing contents printout information corresponding to each of the printable contents, and the files are stored in the contents printout information storing means 3903.

Also, in the event that actual contents exist in the data center 2340, the contents printout information will also be understood to exist within the data center 2340. The contents printout information storing means 3903 within the contents provider computer 2321 in this case has one text file for each set of contents, the text file describing the location of the contents printout information storing means 3903 in the data center 2340, thereby indicating the location of the actual contents printout information. Further, in the event that the actual contents exist within the data center 2340, the present invention can also be carried out by having the actual contents printout information in the contents provider computer 2321.

As described in the fifth embodiment, information described in the contents printout information comprises the following, and possibly others, described as information relating to contents, as necessary:

① A contents code uniquely specifying contents within at least the range of the contents provider;
② Contents type, such as document, image, etc.;
③ The location of the actual contents;
④ The location of the viewing data;
⑤ Price information;
⑥ Overlay information, which is information to be overlaid at the time of printing the contents, e.g., copyright display, serial No., etc.; and
⑦ Overlay position information representing the overlay position of the overlay information.

The following, and possibly others, are described as restriction information relating to printing out of the contents, as necessary:

① Size restriction information restricting the minimum and maximum size of the contents at the time of printing;
② Sheet size restriction information restricting the size of the printing sheet;
③ Sheet quality restricting information restricting the quality of the printing sheet;
④ Restriction information for the number of copies, restricting the maximum number of copies which can be printed; and
⑤ Printer restriction information restricting the type of printer to print out the contents.

The following, and possibly others, are described as other contents printout information, as necessary:

① Default specified for printout settings;
② Settlement information for contents;
③ Settlement information for material printed out;
④ Identification information of users; and
⑤ Identification information of printout ordering managed by the contents provider.

FIG. 29 is a diagram illustrating an example of contents printout information according to the present embodiment, stored in the contents provider computer 2320 and contents printout information storing means 3903 in the data center 2340, as with the fifth and sixth embodiments. Detailed description will be omitted in the present embodiment.

Of course, with the present embodiment as well, information in the printout information space 2902 is not the only information which might be omitted; information in the contents information space 2901 and miscellaneous information space 2903 can also be omitted as long as this does not interfere with printout ordering and printing out.

<Contents Printout Information Position Data>

FIG. 41 is a schematic diagram of the contents printout information position data in the contents provider computer 2321 used with the present embodiment and the later-described fourth embodiment.

In FIG. 41, reference numeral 4100 denotes contents printout information location data in the contents provider computer 2321, and with the present embodiment, is supplied as a text data file. The contents printout information location data 4100 starts with an index item between the parentheses [ ] as shown in the figure, and is listed in "settings name=settings value" fashion following the index item.

The first index item "[DATACENTER]" indicates that the actual contents and the contents printout information does not exist on this computer, but rather exists on an external computer such as the data center 2340. There are two settings shown in FIG. 41.

"CONTENTSCODE=DEF0001" indicates that the object of the contents printout information location data 4100 is the contents specified by the contents code "DEF0001".

"ADDRESS=http://www.hanbai_Stock/printinfo/DEF0001.inf" indicates the location of the actual contents printout information. This is listed using a URL with the present embodiment.

In the event of receiving a printout order for contents represented by the contents code "DEF0001" with the contents provider computer 2321, first, reference is made to the contents printout information location data within the contents printout information storing means 3903 in the computer, described with reference to FIG. 41, and the actual contents printout information is obtained from the data center 2340 with the location in the contents printout information.

<Contents Provider Management Table>

Next, description will be made regarding a contents provider management table 4005 which the printout service provider computer 2330 has.

The contents provider management table 4005 stores and manages contents provider code uniquely defining contents providers, and the position where the contents provider computers 2320 and 2321 exist. This table is stored in the HDD 2409. Using a database system or the like can realize a suitable configuration.

The contents provider management table 4005 is searched at the time of the order reception means 4002 performing order reception processing, and reception processing of printout orders for contents existing in external computers is realized by making reference to the search results.

FIG. 42 is a schematic diagram of a contents provider management table according to the present embodiment and the later-described eighth embodiment.

The contents provider management table 4005 manages two items, denoted by reference numerals 4201 and 4202 as a single record (hereafter referred to as "contents provider management record"). Reference numeral 4201 denotes a contents provider code issued beforehand for each contents provider, and stored, for identifying contents providers. Reference numeral 4202 denotes a base address representing the location of the contents provider computers 2320 and 2321 on the network. With the present embodiment as well, the base address 4202 describes the locations URLs.

Thus, the contents provider code is determined by the parameters provided at the time of activating the order reception means 4002, the URL of the transmission originator is obtained, and comparison is made with the base address 4202, so it can be determined that the order is from a contents provider computer 2320 or 2321.

<Order Management Table>

The schematic diagram of the order management table 4007 is the same as FIG. 31 described with reference to the fifth and sixth embodiments, so description thereof will be omitted here.

With the present embodiment, records are generated by printout order information transmitted together with printout order commission issued from the contents provider computers 2320 and 2321.

<Printout Order Information>

Printout order information is generated by the order creating means 3905 within the contents provider computers 2320 or 2321, and is transmitted to the printout service provider computer 2330. The transmitted printout order information is analyzed by the order reception means 4002 within the printout service provider computer 2330, and a new record is created in the order management table 4007 based on the analysis results, thereby establishing the printout order, and printing data is created by the printing data creating means based on this record.

Figure 43:
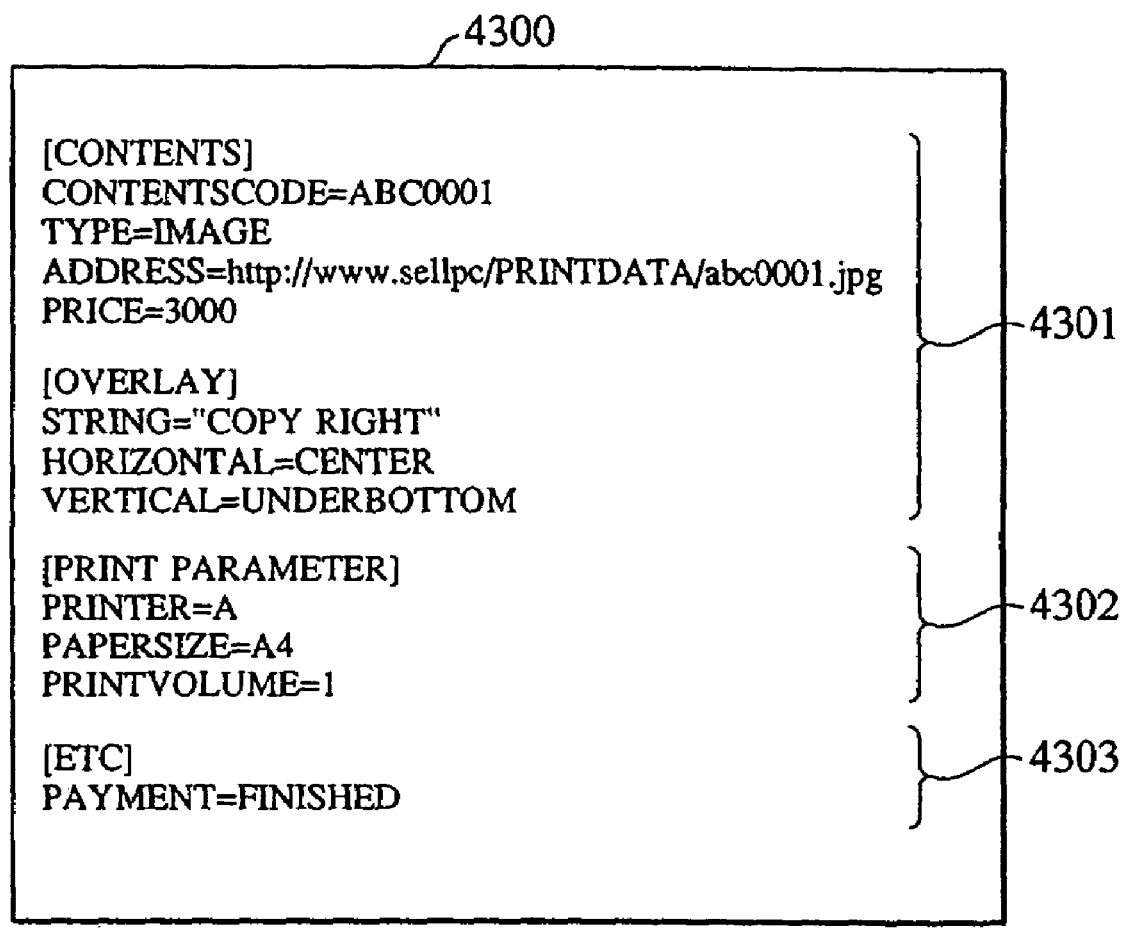
FIG. 43 is a schematic diagram of printout order information according to the seventh and eighth embodiments.

FIG. 43 is a schematic diagram illustrating printout order information according to the present embodiment.

In FIG. 43, reference numeral 4300 denotes printout order information, and with the present embodiment, this is supplied as a text data file. As with the contents printout information, the printout order information 4300 starts with an index item between the parentheses [ ] as shown in the figure, and is listed in "settings name=settings value" fashion following the index item.

Reference numeral 4301 denotes a contents information space listing information relating to the contents. There are two index items with the present embodiment indicating the contents information space 4301. The first index item "[CONTENTS]" lists contents code and the like, and the second index item "[OVERLAY]" lists overlay text strings which are printed along with the contents by overlaying at the time of printing contents, and the positions thereof. In FIG. 43, there are four settings under the first index item. The same items as with the contents information space 2901 can be set for the contents information space, and the order creating means 3905 in the contents provider computer 2320 generates this space based on contents printout information.

"CONTENTSCODE=ABC0001" indicates that the object of the contents printout information 4300 is the contents specified by the contents code "ABC0001"

"TYPE=IMAGE" indicates the type of contents, such as image or document, and in this case indicates that "ABC0001"is an image.

"ADDRESS=http://www.sellpc/PRINTDATA/abc000.jpg" indicates that the location of the file "abc0001.jpg" which is the actual contents is "http://www.sellpc/PRINTDATA/abc0001.jpg".

The last settings item belonging to the index item "[CONTENTS]", which is "PRICE=3000", means that the price of the contents is 3,000 Yen. Note that though the present embodiment omits currency units, currency units may be included to handle cases wherein multiple currencies exist.

The other index item "[OVERLAY]" of the contents information space 4301 lists the added data to be printed out along with the contents at the time of making the contents printout, and the position thereof.

"STRING="COPYRIGHT"" indicates added data. The text string in the quotes " " for the setting value is the text string that will be printed out along with the contents.

"HORIZONTAL=CENTER",
"VERTICAL=UNDERBOTTOM" define the position for the added data, and in the case in FIG. 43 means that the horizontal position is at the center and the vertical position is at the bottommost position.

Reference numeral 4302 denotes a printout information settings space listing printout conditions set based on the printout service information transmitted to the contents provider computer 2320 from the printout service provider computer 2330.

The printout information space 4302 according to the present embodiment is indicated by "[PRINT PARAMETER]".

In FIG. 43, there are the following three setting items in "[PRINT PARAMETER]". Though items other than these three shown in FIG. 43 can be set for the printout information settings space 4302 with the present embodiment, such as printing on both sides, printing quality, etc., information regarding which settings have been omitted is handled as having no restrictions or default values set to the printout service provider computer 2330 beforehand are applied.

"PRINTER=A" indicates that printer "A" is to perform the printout.

"PAPERSIZE=A4" indicates that the sheet size used for printing is to be A4.

"PRINTVOLUME=1" indicates that the number of printouts to be made order is 1.

Reference numeral 4303 denotes a miscellaneous information space for other contents printout information according to the present embodiment that does not belong to either contents-related information or contents printout-related restriction information. With the present embodiment, the miscellaneous information space 4303 is indicated by the index item "[ETC]".

In FIG. 43, "PAYMENT=FINISHED" means that the bill for the contents has already been settled.

The above has been a description of the contents printout information according to the present embodiment, with reference to FIG. 43. Of course, information in the printout information settings space 4302 is not the only information which might be omitted; information in the contents information space 4301 and miscellaneous information space 4303 can also be omitted as long as this does not interfere with printout ordering and printing out.

<Flow of the Present System>

Next, the flow of processing with the present embodiment will be described with reference to FIG. 44.

Figure 44:
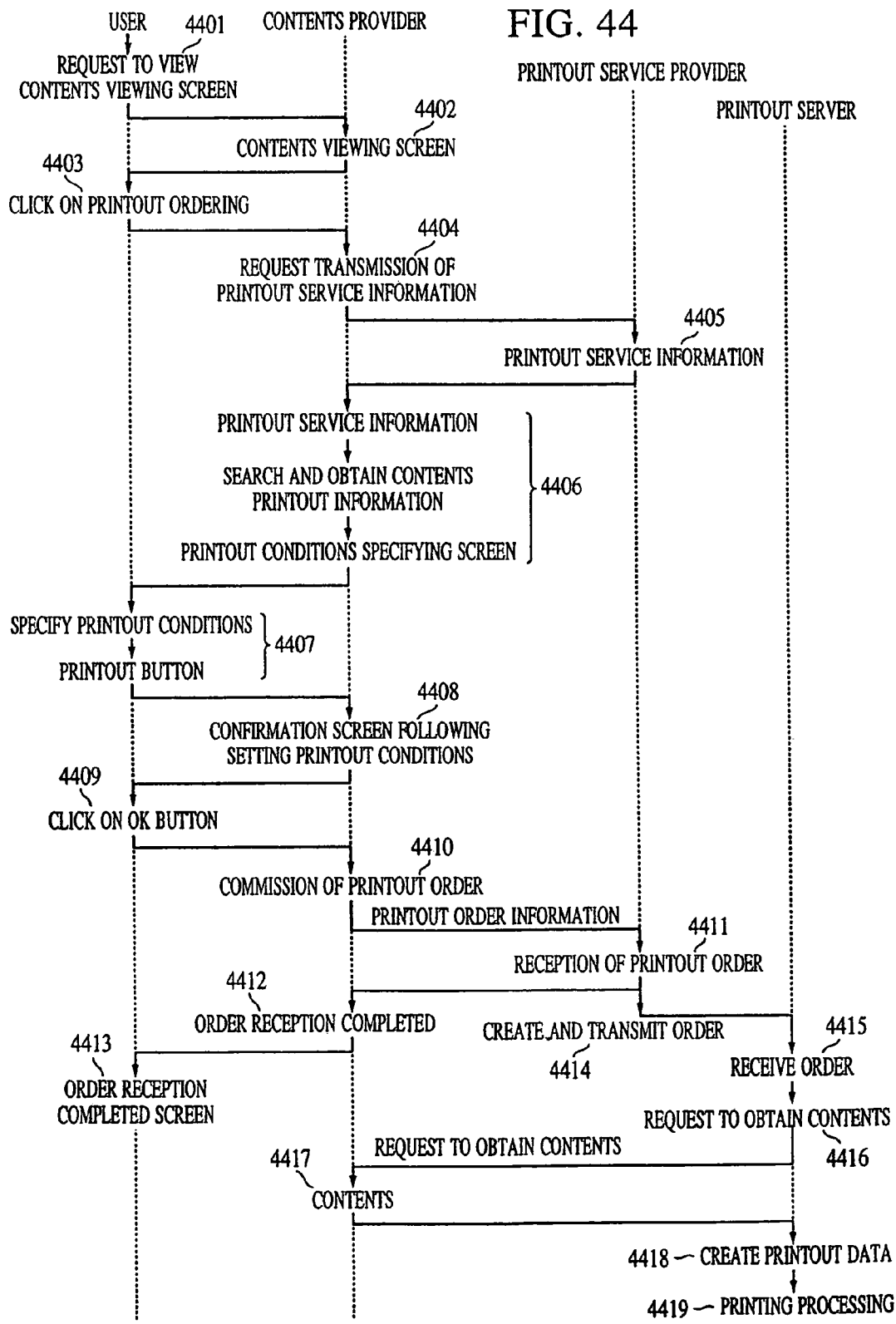
FIG. 44 is a flowchart of the processing occurring between the user computer, contents provider computer, printout service provider, and printout server, according to the seventh embodiment.

FIG. 44 is a processing flowchart for describing the flow occurring between the user computer 2310, contents provider computer 2320, the printout service provider 2330, and the printout server 2350. In the following description, the user uses the user computer 2310 to view the contents viewing screen within the contents provider computer 2320, makes printout orders to the contents provider computer 2320, and commissions the printout orders from the contents provider computer 2320 to the printout service provider 2330.

First, the user uses the document viewing means 2601 in the user computer 2310 to make a contents viewing screen display request to the contents provider computer 2320. The contents viewing screen display request specifies the URL of a contents viewing screen that the user desires to view, based on HTTP protocol. The URL is specified by the user using the KB 2408 to directly make input to the document viewing means 2601, or using some other means to this end such as selecting a link on the screen which is displayed by the document viewing means 2601 based on the HTML document. This processing is denoted by reference numeral 4401 in the figure.

The contents viewing screen display request issued by the user computer 2310 is received over the network 2300 by the document providing means 2701 in the contents provider computer 2320 via the NETIF 2404. Upon receiving the contents viewing screen display request, the document providing means 2701 transmits to the requesting user computer 2310 an HTML document stored in the contents viewing screen storing means 2704 corresponding to the specified URL, as well as viewing data stored in the contents storing means 2702 which is linked to in the HTML document. This processing is denoted by reference numeral 4402 in the figure.

The document viewing means 2601 within the user computer 2310, upon receiving the HTML document and the viewing data, performs display of the contents viewing screen based on the HTML document.

Now, a description will be given of the contents viewing screen, with reference to FIGS. 45A and 45B.

Figure 45A:
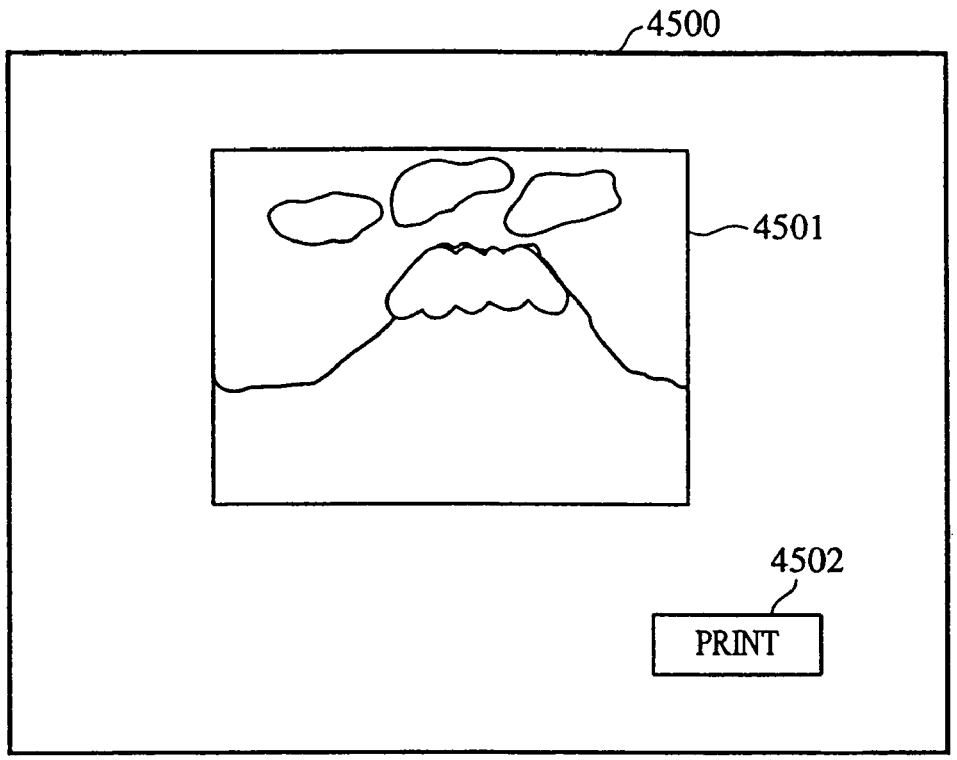
FIG. 45A is an example of a contents viewing screen according to the seventh and eighth embodiments.
Figure 45B:
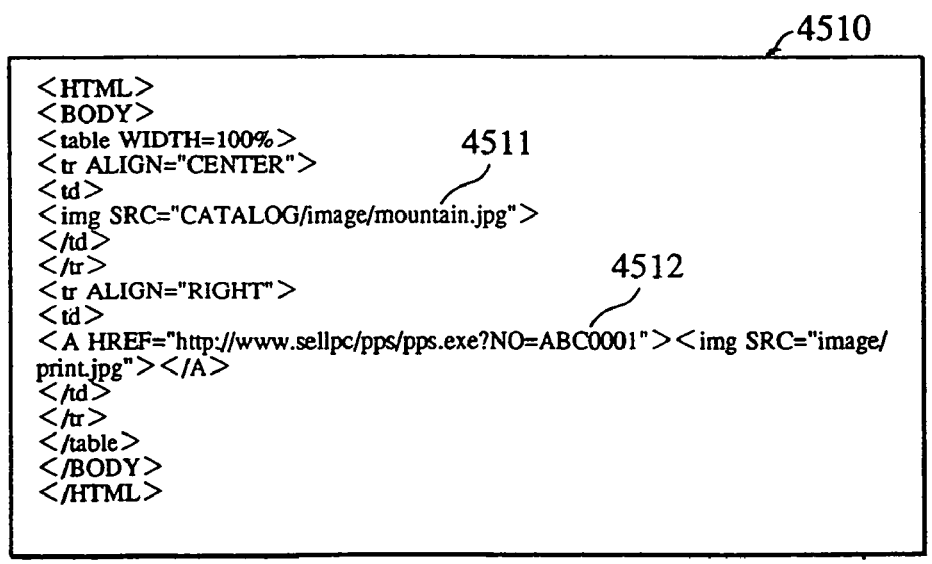
FIG. 45B is an example of an HTML document described so as to display the viewing screen, transmitted from the contents provider computer.

FIG. 45A is an example of a contents viewing screen, and FIG. 45B is an example of an HTML document described so as to display this contents viewing screen, transmitted from the contents provider computer 2320.

In FIG. 45A, reference numeral 4500 denotes a contents viewing screen to be displayed on the user computer 2310 in the preset embodiment. Reference numeral 4501 denotes a viewing screen using the contents viewing data displayed on the screen, with the contents viewing data being transmitted from the contents storing means 3902 within the contents provider computer 2320, and the document viewing device 2601 performing display on the main screen. Reference numeral 4502 denotes a printout commissioning button for commissioning a printout of the contents displayed on this screen to the printout service provider computer 2330. In FIG. 45B, reference numeral 4510 denotes an HTML document describing the display form of the contents viewing screen 4500, links, etc., and reference numeral 4511 denotes a viewing display instruction statement described so as to display images, which has described therein the location of the viewing data according to the present embodiment and the image file name.

Reference numeral 4512 denotes a print button display instruction statement describing displaying of the print button and action instructions given to the document viewing means 2601 in the event that an action instruction such as clicking the print button has been performed. The description "http://www.sellpc/pps/pps.exe" in the print button display/action instruction statement is the activation instruction part for the CGI program which is the order creating means 3905 of the contents provider computer 2320, instructing the printout service provider computer 2330, and "NO=ABC001" is the first parameter for activating the order creating means 3905. Multiple parameters can be specified using "&", but the present embodiment only uses the first parameter. The first parameter of the present embodiment is configured of the contents code stored in the contents printout information 2900.

Returning to FIG. 44, in the state that the contents viewing screen 4500 is displayed, in the event that the user desires a printout of the actual contents of the viewing screen 4501 displayed on the screen, the user makes instructions to the printout commissioning button on the screen from the KB 2408. In response to the instructions to the printout commissioning button 4502, the document viewing means 2601 transmits an activation request for the order creating means 3905 to the contents provider computer 2320 as described in the print button display/action instruction statement 4512. This processing is denoted by reference numeral 4403 in the figure.

The document providing means 3901 within the contents provider computer 2320 activates the order creating means 3905 in the event that the order creating means 3905 activating instructions and the parameters have been received, and hands the parameters to the order creating means 3905.

The order creating means 3905 temporarily stores the parameters in the work area of the HDD 2409.

Next, the order creating means 3902 issues a printout service transmission request to the printout service provider computer 2330, to transmit printout service information to the printout service provider computer 2330. This processing is denoted by reference numeral 4404 in the figure.

The document providing device 4001 within the printout service provider computer 2330 which has received the transmission request for the printout service information activates the order reception means 4002. The order reception means 4002 transmits the printout service information within the printout service management table 4006 to the contents provider computer 2320. This processing is denoted by reference numeral 4405 in the figure.

The order creating means 3905, upon reception of the printout service information, stores the printout service information in the RAM 2402 or the HDD 2409. Next, the contents code is determined from the first parameter stored in the HDD 2409 in 4404, the contents printout information storing means 3903 is searched, and the contents printout information which is the search results is obtained and stored to the work area in the HDD 2409.

Next, the printout information 2902 within the contents printout information 2900 is obtained, setting items matching the restriction range listed in the information is obtained from the printout service information stored in the RAM 2402 or the HDD 2409, and described in an HTML document for making display of the printout conditions specifying screen which is the output of order information.

Next, viewing data is obtained with the viewing data address listed in the contents information space 2901, and in the event that information relating to overlays exists therein, synthesizing is performed according to the information, and this is saved in the work area of the HDD 2409 as a preview image for display on a later-described print conditions specifying screen, along with adding the saved location thereof in a predetermined position in the HTML document for displaying the printout conditions specifying screen. Then, the HTML document described so as to display the printout conditions specifying screen on the user computer 2310 is transmitted to the user computer 2310 via the document providing means 3901. This processing is denoted by reference numeral 4406 in the figure.

The document viewing means 2601 in the user computer 2310 displays the printout conditions specifying screen based on the received HTML document, as shown in FIG. 34 described with the fifth embodiment.

The user uses the printout conditions specifying screen which the document viewing means 2601 in the user computer 2310 displays to set the output destination printer, sheet size, and number of copies. Also, if necessary, the user uses the detailed settings link button to call up the detailed settings screen and makes detailed settings thereby, and then returns to the main screen to make printout conditions settings.

Once the user has confirmed the settings, clicking on the printout ordering button causes the document viewing means 2601 to transmit an activation instruction to the order generating means 3905 within the contents provider computer 2320 which is the link destination listed in the HTML document. The printout conditions specifications are transmitted together as parameters at the time of transmitting the activation instructions. This processing is denoted by reference numeral 4407 in the figure.

The document providing means 3901 within the contents provider computer 2320 activates the order generating means 3905 again. The order generating means 3905 stores the printout conditions which are parameters to the work area of the HDD 2409, and then transmits a confirmation screen HTML document, for displaying a confirmation screen whereby the user confirms the intent to execute the printout under the printout conditions which the user has set, to the user computer 2310 via the document providing means 3901. This processing is denoted by reference numeral 4408 in the figure.

The document viewing means 2601 within the user computer 2310, upon receiving the confirmation screen HTML document, displays the confirmation screen, as shown in FIG. 35 described with the fifth embodiment.

Following making confirmation of the preview image and the printout conditions, the user clicks the button so as to confirm the printout order, thereby giving order confirming instructions to execute printing out, to the printout order generating means 3905. This processing is denoted by reference numeral 4409 in the figure.

Based on the order confirmation instructions, the document providing means 3901 within the contents provider computer 2320 generates printout order information described with reference to FIG. 43 from the contents information space 2601 within contents printout information 2600 stored in the HDD 2409 in 4406, the printout conditions stored in 4408, and so forth.

Next, an activation instruction is given to the order reception means 4002 so as to make a printout order request to the printout service provider computer 2330. At the time of the activation instruction, the contents provider code, the generated printout order information, and the URL which is a return destination, are transmitted as parameters. The return destination is the CGI application activation instruction with the present embodiment. This processing is denoted by reference numeral 4410 in the figure.

The document providing means 4001 within the printout service provider computer 2330 activates the order reception means 4002 by an activation instruction for the order reception means 4002. The order reception means 4002 first searches within the contents provider management table 4005 for a record having the contents provider code handed as a parameter, and obtains the base address 4202 of the record as the results of the search. Next, confirmation is made to the document providing means 4002 regarding the transmission originator of the activation instruction is the contents provider computer 2320 for the inquiring transmission originator.

Next, the order reception means 4002 issues an order code, and creates a new record for the order management table 4007 with the order code 3101, the contents provider code 3102 receiving an order by the parameters, the contents address 3103 obtained from the received printout order information, and the status 3104 as "Ordering", as with the order management record example 3114. Also, in the event that overlay information exists within the printout order information, this is given a file name searchable by order code or order management table 4007, and saved in the printing spool 4008.

Then, the order reception means 4002 makes an activation instruction to the printout order generating means 3905 within the contents provider computer 2320 which is the return destination URL handed over as a parameter. At the time of the activation instruction, the order code is transmitted as a parameter.

The order reception means 4002 sets the "gathering image" for the status 3104 within the order management record, activates the printing data creating means 4003, and finishes processing. This processing is denoted by reference numeral 4411 in the figure.

The document providing means 3901 of the contents provider computer 2320 activates the printout order creating means 3905 with a printout order creating means 3905 activation instruction transmitted from the printout service provider computer 2330 in 4411 above. The printout order generating means generates an HTML document containing the order code handed over as a parameter, and transmits this to the user computer 2310. This processing is denoted by reference numeral 4412 in the figure.

The document viewing means 2601 of the user computer 2310 displays the order reception completion screen based on the HTML document received from the contents provider computer 2320. The order reception completion screen displays order code and the like to the effect that the printout order has been received, a link for continuing viewing contents with the contents provider computer 2320, and so forth. This processing is denoted by reference numeral 4413 in the figure.

On the other hand, at the printout service provider computer 2330, the printing data creating means 4003 activated in the processing in 4411 receives the order code as a parameter at the time of activation, and accordingly searches the order management table 4007 by order code, sets "creating data" to the status 3104 of the record which is the results of the search, obtains the contents address 3103 from the record and creates printout order data 3800, and stores this in the spool 2808. Next, the status 3104 of the corresponding record in the order management table 2807 is set to "Standby", a request is made to the printing control means 2804 to transmit printout order data to the printout server, and the processing ends.

The printing control means 2804 first searches for the records within the order management table 2807 wherein the status 3104 is "Standby", and obtains as the search results, the order code string. Next, one order code is extracted from the order code string according to predetermined rules, printout order data corresponding to the code is obtained from the printing spool 2808, and the printout order data is transmitted along with the order code to the printout server corresponding to the output destination printout server 3105. Next, the status 3104 is set to "Standby". This processing is denoted by reference numeral 4414 in the figure.

The order managing means 3701 within the printout server 2350, upon receiving the printout order data, saves the received printout order data and the order code in the HDD 2409, and notifies the printing means 3702. This processing is denoted by reference numeral 4415 in the figure.

The printing means 3702 reads the printout order data from the notified location into the RAM 2402, extracts the location of the actual contents from the data, and makes a request for obtaining the actual contents to the contents provider computer 2320 where the actual contents exist. This processing is denoted by reference numeral 4416 in the figure.

Upon receiving the request for obtaining the actual contents from the printout server 2350, the document providing device 3710 within the contents provider computer 2320 obtains the contents regarding which the request was made from the contents storing means 2702, and transmits the contents to the printout server 2350. This processing is denoted by reference numeral 4417 in the figure.

The printing means 3702 of the printout server 2350, upon receiving the contents, creates printout data from the printout order data read into the RAM 2402 and the received contents. This processing is denoted by reference numeral 4418 in the figure.

Next, the printing means 3702 transmits the printout data to the printer which is the output destination thereof, and thus printing is performed. Once the printing has been completed, notification of completion is made to the location of the printout order data within the HDD 2409 and the order managing means 3701, and the processing ends.

The order management means 3701 makes notification to the printout service provider 2330 along with the order code corresponding to the location of the printout order data. This processing is denoted by reference numeral 4419 in the figure.

Upon receiving the notification of completion of printing, the printing control means 2804 in the printout service provider 2330 searches the order management table 2807 with the order code which has been received, and the status 3104 of the found record is set to "Printing completed".

Thus, a printout of the actual contents within the contents provider computer 2320 is realized by printout instructions from a contents viewing screen stored in the contents provider computer 2320.

Eighth Embodiment

Next, as the eighth embodiment, a description will be made regarding the procedures for the user computer 2311 described with reference to FIG. 23 to display a contents viewing screen stored in the contents provider computer 2321, and issuing a printout order from this contents viewing screen. A major difference between the eighth embodiment and the seventh embodiment is that the actual contents and the contents printout information are not stored in the contents provider computer but in a data center 2340, and are distributed to a printout service provider. The following is a description thereof with reference to FIG. 46 and other drawings.

<Processing Flow in the Eighth Embodiment>

Figure 46:
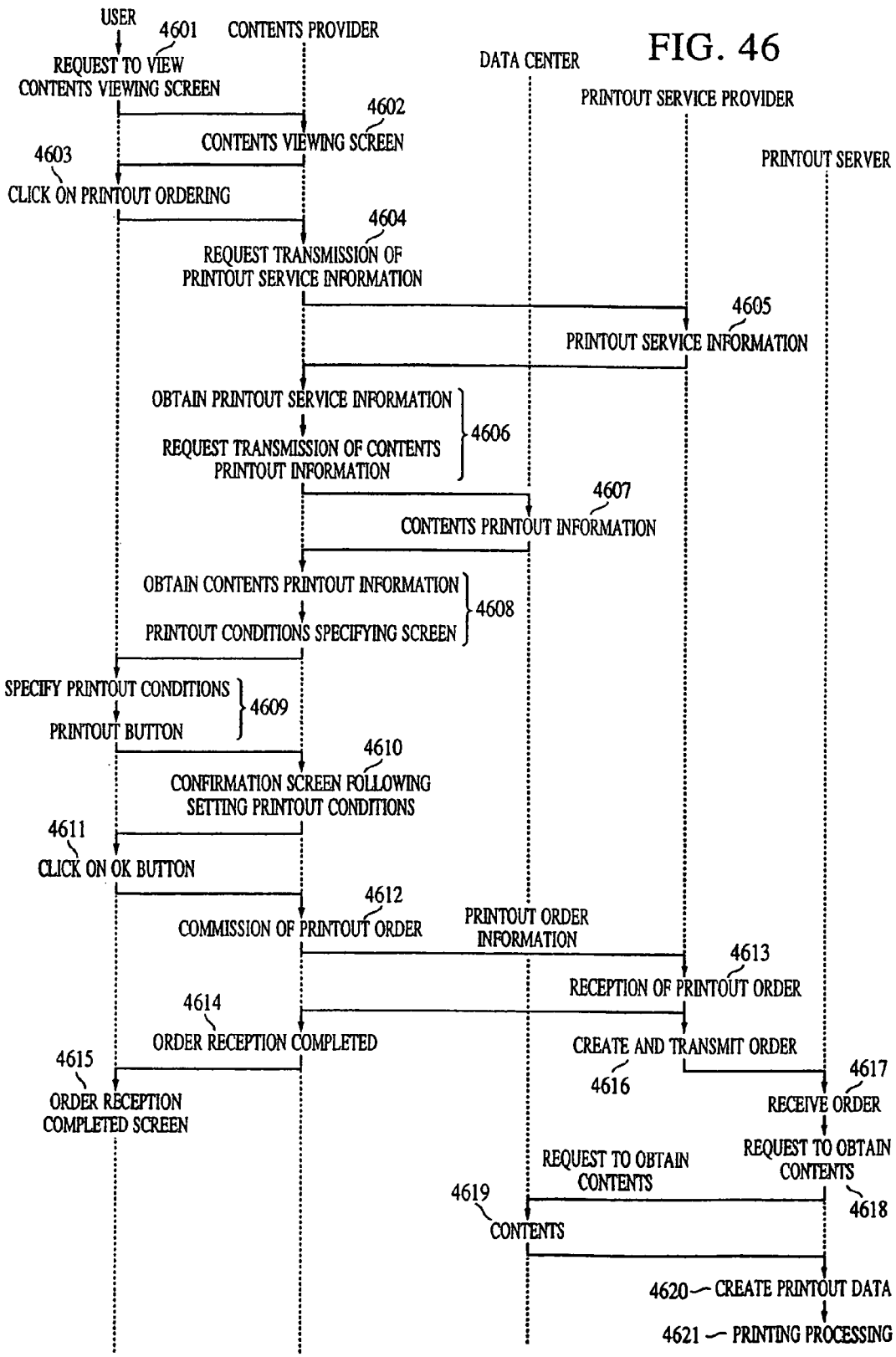
FIG. 46 is a flowchart of the processing occurring between the user computer, contents provider computer, data center, printout service provider, and printout server, according to the eighth embodiment.

FIG. 46 is a processing flowchart for describing the flow occurring between the user computer 2311, the contents provider computer 2321, the data center 2340, and the printout service provider 2330, according to the present embodiment. In the following description, the user uses the user computer 2311 to view the contents viewing screen within the contents provider 2321, and makes printout orders to the contents provider computer 2321.

First, the user uses the document viewing means 2601 in the user computer 2311 to make a contents viewing screen display request to the contents provider computer 2321. The contents viewing screen display request specifies the URL of a contents viewing screen that the user desires to view, based on HTTP protocol. The URL is specified by the user using the KB 2408 to directly make input to the document viewing means 2601, or using some other means to this end such as selecting a link on the screen which is displayed by the document viewing means 2601 based on the HTML document. This processing is denoted by reference numeral 4601 in the figure.

The contents viewing screen display request issued by the user computer 2311 is received over the network 2300 by the document providing means 3901 in the contents provider computer 2321 via the NETIF 2404. Upon receiving the contents viewing screen display request, the document providing means 3901 transmits to the requesting user computer 2311 an HTML document stored in the contents viewing screen storing means 3904 corresponding to the specified URL, as well as viewing data which is linked to in the HTML document. This processing is denoted by reference numeral 4602 in the figure.

In the state that the contents viewing screen is displayed, in the event that the user desires a printout of the actual contents of the viewing image displayed on the screen, the user clicks the printout commissioning button on the screen. In response to clicking the printout commissioning button, the document viewing means 2601 transmits an activation request for the order reception means to the contents provider computer 2321 as described in the print button display/action instruction statement. This processing is denoted by reference numeral 4403 in the figure.

The document providing means 3901 within the contents provider computer 2321 activates the order creating means 3905 in the event that the order creating means 3905 activating instructions and parameters have been received, and hands the parameters to the order creating means 3905. The order creating means 3905 temporarily stores the parameters in the work area of the HDD 2409. Next, the order creating means 3905 issues a printout service information transmission request to the printout service provider computer 2330, to transmit printout service information to the printout service provider computer 2330. This processing is denoted by reference numeral 4604 in the figure.

The document providing device 4001 within the printout service provider computer 2330, upon receiving the printout service information transmission request, activates the order reception means 4002. The order reception means 4002 transmits the printout service information within the printout service management table 4006 to the contents provider computer 2321. This processing is denoted by reference numeral 4605 in the figure.

The order creating means 3905, upon receiving the printout service information, stores the printout service information in the RAM 2402 or in the HDD 2409.

Next, the contents provider code is determined from the first parameter stored in the HDD 2409 in 4604, the contents printout information storing means 3903 is searched, and contents printout information location data 4100, which is the results of the search, is obtained.

The contents printout information location data 4100 lists a first index item "[DATACENTER]" indicating that the actual contents printout information exists in the data center 2340, so the order generating means 2206 issues a request for obtaining contents printout information to the data center 2340 with "ADDRESS=http://www.hanbai_Stock/printinfo/ DEF0001.inf" which indicates the location of the contents printout information. This processing is denoted by reference numeral 4606 in the figure.

The document providing means 3901 within the data center 2340 obtains the desired contents printout information from within the contents printout information storing means 3903 in accordance with the contents printout information obtaining request, and transmits this to the contents provider computer 2321. This processing is denoted by reference numeral 4607 in the figure.

The order creating means 3905 of the contents provider computer 2321 which has obtained the contents printout information stores the obtained contents printout information in the HDD 2409, and also obtains printout information within the contents printout information, obtains setting items matching the restriction range listed in the information from the printout service information stored in the RAM 2402 or HDD 2409, and described in an HTML document for making display of the printout conditions specifying screen which is the output of order information.

Next, viewing data is obtained with the viewing data address listed in the contents information space, and in the event that information relating to overlays exists therein, synthesizing is performed according to the information, and this is saved in the work area of the HDD 2409 as a preview image for display on a later-described print conditions specifying screen, along with adding the saved location thereof in a predetermined position in the HTML document for displaying the printout conditions specifying screen. Then, the HTML document described so as to display the printout conditions specifying screen on the user computer 2311 is transmitted to the user computer 2311 via the document providing means 3901. This processing is denoted by reference numeral 4608 in the figure.

The document viewing means 2601 in the user computer 2311 displays the printout conditions specifying screen based on the received HTML document, as shown in FIG. 34 described with the seventh embodiment.

The user uses the printout conditions specifying screen which the document viewing means 2601 in the user computer 2311 displays to set the output destination printer, sheet size, and number of copies. Also, if necessary, the user uses the detailed settings link button to call up the detailed settings screen and makes detailed settings thereby, and then returns to the main screen to make printout conditions settings.

Once the user has confirmed the settings, clicking on the printout ordering button causes the document viewing means 2601 to transmit an activation instruction to the order generating means 3905 within the contents provider computer 2321 which is the link destination listed in the HTML document. The printout conditions specifications are transmitted together as parameters at the time of transmitting the activation instructions. This processing is denoted by reference numeral 4609 in the figure.

The document providing means 3901 within the contents provider computer 2321 activates the order generating means 3905 again. The order generating means 3905 stores the printout conditions which are parameters to the work area of the HDD 2409, and then transmits a confirmation screen HTML document, for displaying a confirmation screen whereby the user confirms the intent to execute the printout under the printout conditions which the user has set, to the user computer 2311 via the document providing means 3901. This processing is denoted by reference numeral 4610 in the figure.

The document viewing means 2601 within the user computer 2311, upon receiving the confirmation screen HTML document, displays the confirmation screen, as shown in FIG. 35 described with the seventh embodiment. Following making confirmation of the preview image and the printout conditions, the user clicks the button so as to confirm the printout order, thereby giving order confirming instructions to execute printing out, to the order generating means 3905. This processing is denoted by reference numeral 4611 in the figure.

Based on the order confirmation instructions, the document providing means 3901 within the contents provider computer 2321 generates, as described with reference to FIG. 43, printout order information from the contents information space within the contents printout information stored in the HDD 2409 in 4608, the printout conditions stored in 4610, and so forth.

Next, an activation instruction is given to the printout order reception means 4002 so as to make a printout order request to the printout service provider computer 2330. At the time of activation instruction, the contents provider code, the generated printout order information, and the URL which is a return destination, are transmitted as parameters. The return destination is the CGI application activation instruction with the present embodiment. This processing is denoted by reference numeral 4612 in the figure.

The document providing means 4001 within the printout service provider computer 2330 activates the order reception means 4002 by an activation instruction for the order reception means 4002. The order reception means 4002 first searches within the contents provider management table 4005 for a record having the contents provider code handed as a parameter, and obtains the base address 4202 of the record as the results of the search. Next, confirmation is made to the document providing means 4002 regarding the transmission originator of the activation instruction is the contents provider computer 2321 for the inquiring transmission originator.

Next, the order reception means 4002 issues an order code, and creates a new record for the order management table 4007 with the order code 3011, the contents provider code 3012 receiving an order by the parameters, the contents address 3103 obtained from the received printout order information, and the status 3104 as "Ordering", as with the order management record example 3114. Also, in the event that overlay information exists within the printout order information, this is given a file name searchable by order code or order management table 4007, and saved in the printing spool 4008.

Then, the order reception means 4002 makes an activation instruction to the printout order generating means 3905 within the contents provider computer 2321 which is the return destination URL handed over as a parameter. At the time of the activation instruction, the order code is transmitted as a parameter.

The order reception means 4002 sets "gathering image" for the status 3104 within the order management record, activates the order printing data creating means 4003, and finishes processing. This processing is denoted by reference numeral 4613 in the figure.

The document providing means 3901 of the contents provider computer 2321 activates the printout order generating means 3905 with the activation instruction for the printout order generating means 3905 transmitted from the printout service provider computer 2330 in 4613. The printout order generating means generates an HTML document containing the order code handed over by the parameters, and transmits this to the user computer 2311. This processing is denoted by reference numeral 4614 in the figure.

The document viewing means 2601 of the user computer 2311 displays the order reception completion screen based on the HTML document received from the contents provider computer 2321. The order reception completion screen displays an order code or the like to the effect that the printout order has been received, a link for continuing viewing contents with the contents provider computer 2321, and so forth. This processing is denoted by reference numeral 4615 in the figure.

On the other hand, at the printout service provider computer 2330, the printing data creating means 4003 activated in the processing in 4613 receives the order code as a parameter at the time of activation, and accordingly searches the order management table 4007 by order code, sets "Standby" to the status 3104 of the record found as a result of the search, a request is made to the printing control means 4004 to transmit printout order data to the printout server, and the processing ends.

The printing control means 4004 first searches for the records within the order management table 4007 wherein the status 3104 is "Standby", and obtains as the search results, the order code string. Next, one order code is extracted from the order code string according to predetermined rules, printout order data corresponding to the code is obtained from the printing spool 4008, and the printout order data is transmitted along with the order code to the printout server corresponding to the output destination printout server 3105. Next, the status 3104 is set to "Standby". This processing is denoted by reference numeral 4614 in the figure.

The order managing means 3701 within the printout server 2350, upon receiving the printout order data, saves the received printout order data and the order code in the HDD 2409, and notifies the printing means 3702. This processing is denoted by reference numeral 4615 in the figure.

The printing means 3702 reads the printout order data from the notified location into the RAM 2402, extracts the location of the actual contents from the data, and makes a request for obtaining the actual contents to the contents provider computer 2320 where the actual contents exist. This processing is denoted by reference numeral 4616 in the figure.

Upon receiving the request for obtaining the actual contents from the printout server 2350, the document providing means 3910 within the contents provider computer 2320 obtains the contents regarding which the request was made, and transmits the contents to the printout server 2350. This processing is denoted by reference numeral 4617 in the figure.

The printing means 3702 of the printout server 2350, upon receiving the contents, creates printout data from the printout order data read into the RAM 2402 and the received contents. This processing is denoted by reference numeral 4618 in the figure.

Next, the printing means 3702 transmits the printout data to the printer which is the output destination thereof, and thus printing is performed. Once the printing has been completed, notification of completion is made to the location of the printout order data within the HDD 2409 and the order managing means 3701, and the processing ends.

The order management means 3701 makes notification to the printout service provider 2330 along with the order code corresponding to the location of the printout order data. This processing is denoted by reference numeral 4619 in the figure.

Upon receiving the notification of completion, the printing control means 4004 in the printout service provider 2330 searches the order management table 4007 with the order code which has been received, and the status 3104 of the found record is set to "Printing completed".

According to the above embodiments, a printing control system can be provided wherein the load on the printout service provider is reduced as much as possible, and time required for throughput of user printing requests can be reduced.

Other Embodiments

Though the above embodiments have been described with reference to cases wherein programs are held in control memory (ROM), the present invention is by no means restricted to such arrangements, and may be realized using arbitrary storage media, such as external memory. Also, the present invention may be realized by circuits effecting the same actions.

Also, note that the present invention may be applied to a system configured of multiple devices, or a stand-alone device. Also, it is needless to say that the functions of the above-described embodiments can be achieved by an arrangement wherein a recording medium recording the software program code for realizing the functions of the above embodiments is supplied to a system or device, and a computer (CPU or MPU) of the system or device reading out and executing program code stored in a recording medium.

In this case, the program code itself read out from the recording medium realizes the functions of the above-described embodiments, and the recording medium storing the program code comprises the present invention.

Examples of recording mediums which can be used for storing the program code include floppy disks, hard disks, optical disks, magneto-optical disks, CD-ROMs, CD-Rs, magnetic tape, non-volatile memory cards, ROM, and so forth.

Also, it is needless to say that the present invention encompasses cases not only where the computer executing the program code read out from the recording medium realizes the functions of the above embodiments, but also where the operating system or the like running on the computer carries out all or part of the processing, based on the instructions of the program code, and the processing thereof realizes the functions of the above embodiments.

Further, it is needless to say that the present invention encompasses cases wherein the program code read out of the recording medium is stored to memory provided in function expansion boards inserted into the computer or function expansion units connected to the computer, following which a CPU or the like provided to the function expansion board or function expanding unit performs all or part of the actual processing based on instructions of the program code, so as to realize the functions of the above embodiments thereby.

As described above, according to the present invention, contents providers can provide contents printout services without having own printing solutions.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A print processing apparatus, enabling to communicate with a content providing apparatus via a network, comprising:
   a first obtaining unit adapted to obtain print restriction information for content data from said content providing apparatus;
   a screen generating unit adapted to generate information of print conditions specifying screen based on the print restriction information;
   a second obtaining unit adapted to obtain print conditions data, which is set in accordance with the print conditions specifying screen;
   a third obtaining unit adapted to obtain content data from said content providing apparatus;
   a print data generating unit adapted to generate print data by using the content data and the print condition data; and
   a transmitting unit adapted to transmit the print data to a printer.

2. An apparatus according to claim 1, wherein the print restriction information comprises at least print size of content, printing sheet size, printing sheet quality, number of printing and type of printer.

3. An apparatus according to claim 1, further comprising a display control unit adapted to control to display the print conditions specifying screen with preview image of the content data.

4. A storage medium having stored thereon a computer program executable to perform the steps of:
   obtaining print restriction information for content data;
   generating information of print conditions specifying screen based on the print restriction information;
   obtaining print conditions data, which is set in accordance with the print conditions specifying screen;
   obtaining content data; and
   outputting the print conditions data and content data to print data creating program, which lets said computer creating print data and transmit the print data to a printer.

5. A print processing method comprising the steps of:
   communicating with a content providing apparatus via a network;
   obtaining print restriction information for content data from said content providing apparatus;
   generating information of print conditions specifying screen based on the print restriction information;
   obtaining print conditions data, which is set in accordance with the print conditions specifying screen;
   obtaining content data from said content providing apparatus;
   generating print data by using the content data and the print condition data; and
   transmitting the print data to a printer.

* * * * *

UNITED STATES PATENT AND TRADEMARK OFFICE
CERTIFICATE OF CORRECTION

PATENT NO. : 7,196,811 B2  Page 1 of 1
APPLICATION NO. : 11/418006
DATED : March 27, 2007
INVENTOR(S) : Naito et al.

It is certified that error appears in the above-identified patent and that said Letters Patent is hereby corrected as shown below:

TITLE PAGE:
(56) U.S. Patent Documents, "6,714,314 B1 3/2004 Ueda" should read -- 6,714,317 3/2004 --.

COLUMN 1:
Line 19, "has" should read -- have --.

COLUMN 49:
Line 24, "size" should read -- size, --; and
Line 25, "example" should read -- example, --.

COLUMN 58:
Line 42, "made order" should read -- made to order --.

COLUMN 63:
Line 11, "the-user" should read -- the user --.

COLUMN 89:
Line 16, "own" should read -- their own --.

COLUMN 90:
Line 24, "and" should be deleted.

Signed and Sealed this

Twenty-ninth Day of April, 2008

JON W. DUDAS
*Director of the United States Patent and Trademark Office*